(12) United States Patent
Matsushima

(10) Patent No.: US 7,743,162 B2
(45) Date of Patent: Jun. 22, 2010

(54) IMAGE FORMING APPARATUS, WITH CONNECTION REQUEST MEDIATION, HAVING WEB SERVICE FUNCTIONS

(75) Inventor: Hiroyuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1804 days.

(21) Appl. No.: 10/490,978

(22) PCT Filed: Mar. 25, 2003

(86) PCT No.: PCT/JP03/03651

§ 371 (c)(1),
(2), (4) Date: Mar. 26, 2004

(87) PCT Pub. No.: WO03/081443

PCT Pub. Date: Oct. 2, 2003

(65) Prior Publication Data

US 2004/0267808 A1    Dec. 30, 2004

(30) Foreign Application Priority Data

| Mar. 25, 2002 | (JP) | ............................ 2002-084552 |
| Mar. 25, 2002 | (JP) | ............................ 2002-084553 |
| Mar. 25, 2002 | (JP) | ............................ 2002-084554 |
| Mar. 19, 2003 | (JP) | ............................ 2003-076611 |
| Mar. 24, 2003 | (JP) | ............................ 2003-081244 |
| Mar. 24, 2003 | (JP) | ............................ 2003-081245 |
| Mar. 24, 2003 | (JP) | ............................ 2003-081246 |

(51) Int. Cl.
*G06F 15/16*    (2006.01)
(52) U.S. Cl. ...................... 709/232; 709/230
(58) Field of Classification Search .............. 709/230, 709/232
See application file for complete search history.

(56) References Cited

U.S. PATENT DOCUMENTS

2003/0225894 A1 * 12/2003 Ito .............................. 709/227

(Continued)

FOREIGN PATENT DOCUMENTS

CN    1254226 A    5/2000

(Continued)

OTHER PUBLICATIONS

Takase et al., "The Technology of Transformation of XML Document," Research Laboratory, Dainippon Screen Mfg., Co., Ltd., Mar. 14, 2001, pp. 9-16.

(Continued)

*Primary Examiner*—Nathan Flynn
*Assistant Examiner*—Mohamed Wasel
(74) *Attorney, Agent, or Firm*—Dickstein Shapiro LLP

(57) ABSTRACT

The object of the present invention is to provide an image forming apparatus that can transmit and receive data without any process part of an application corresponding to various communication protocols and easily add a communication protocol and an application. An image forming apparatus according to the present invention includes connection request mediation means for, in response to a connection notice from a plurality of communication protocol daemons to transmit and receive data in accordance with respective different communication protocols, mediating connection instead of the communication protocol daemons by informing the application that a connection request is provided to the communication protocol daemons and a shared memory being used for delivery of received data and transmitted data between the application and the plurality of communication protocol daemons and being shared by the communication protocol daemon.

9 Claims, 46 Drawing Sheets

U.S. PATENT DOCUMENTS

| | | | |
|---|---|---|---|
| 2004/0236862 A1* | 11/2004 | Ito et al. | 709/230 |
| 2006/0164683 A1* | 7/2006 | Motoyama et al. | 358/1.15 |
| 2007/0247453 A1* | 10/2007 | Shoji et al. | 345/418 |
| 2008/0275909 A1* | 11/2008 | Ferlitsch | 707/103 R |
| 2009/0103126 A1* | 4/2009 | Park | 358/1.15 |

FOREIGN PATENT DOCUMENTS

| | | |
|---|---|---|
| EP | 0 874 306 A2 | 10/1998 |
| EP | 0 915 601 A2 | 5/1999 |
| EP | 1 612 691 A1 | 1/2006 |
| JP | 7-200201 | 8/1995 |
| JP | 10-173890 | 6/1998 |
| JP | 11-088591 | 3/1999 |
| JP | 11-112775 | 4/1999 |
| JP | 2001-345979 | 12/2001 |
| JP | 2002-032263 | 1/2002 |
| JP | 2002-32331 | 1/2002 |
| WO | WO 98/22892 | 5/1998 |

OTHER PUBLICATIONS

K. Scribner, et al., "Understanding SOAP: The Authoritative Solution," Jun. 25, 2001. p. 3, p. 22, p. 24, p. 37-38, p. 115-120, p. 191, p. 193, p. 421, p. 423-431, p. 443.

Supplementary Search Report (5 pages).

* cited by examiner

FIG.21

XML SCHEMA 601

```
<simpleType name="SomeValueEnum">      ~602
    <restriction base="xs:string">     ~603
        <enumeration value="VALUE1"/>  ⎫
        <enumeration value="VALUE2"/>  ⎬ 604
        <enumeration value="VALUE3"/>  ⎭
    </restriction>
```

C CODE 701

```
typedef enum _SomeValueEnum {          ~702
    SomeValueEnum_VALUE1,   ⎫
    SomeValueEnum_VALUE2,   ⎬ 704
    SomeValueEnum_VALUE3    ⎭
} SomeValueEnum;
          ~705
```

FIG.22

XML SCHEMA 611

```
<complexType name="SomeStruct">  ~612
    <sequence>  ~613
614~ <element name="strParam" type="xs:string"/>
615~ <element name="intParam" type="xs:int"/>
    </sequence>
</complexType>
```

C CODE 711

```
typedef struct _SomeStruct {  ~712
    char *strParam;  ~714
    int  intParam;  ~713
} SomeStruct;
         ~715
```

FIG.23

XML SCHEMA 621

```
<complexType name="ArrayOfString">  ~622
  <complexContent>
    <restriction base="soapEnc:Array">  ~624
      <sequence>  ~625
626 ~ <element name="item" type="xs:string"
                 minOccurs="0" maxOccurs="unbounded"/ >
      </sequence>
627 ~ <attribute ref="soapEnc:arrayType"
                 wsdl:arrayType="xs:string[]" />
    </restriction>
  </complexContent>
</complexType>
```

C CODE 721

```
typedef struct _ArrayOfString {   ~722
    int length;        ~723
    char **array;      ~724
} ArrayOfString;
              ~725
```

FIG.24

SERIALIZER 801

```
Element *SomeValueEnum_serialize
    (Document *doc, char *tagName, SomeValueEnum value);
```

DESERIALIZER 811

```
SomeValueEnum SomeValueEnum_deserialize
                        (Element *element);
```

FIG.25

CONSTRUCTOR 821

```
SomeStruct *SomeStruct_create
        (char *strParam, int intParam);
```

DESTRUCTOR 831

```
void SomeStruct_free(SomeStruct *st);
```

SERIALIZER 841

```
Element *SomeStruct_serialize
    (Document *doc, char *tagName, SomeStruct *st);
```

DESERIALIZER 851

```
SomeStruct *SomeStruct_deserialize(Element *element);
```

FIG.26

CONSTRUCTOR 861

```
ArrayOfString *ArrayOfString_create
                (int length, char **array);
```

DESTRUCTOR 871

```
void ArrayOfString_free(ArrayOfString *st);
```

SERIALIZER 881

```
Element *ArrayOfString_serialize
        (Document *doc, char *tagName, ArrayOfString *st);
```

DESERIALIZER 891

```
SomeStruct *SomeStruct_deserialize(Element *element);
```

FIG.29

```
<?xml version="1.0" encoding="UTF-8"?>
<definitions xmlns:tns="http://foo.bar.com/netdoc/"
  xmlns="http://schemas.xmlsoap.org/wsdl/"
  xmlns:sb="http://schemas.xmlsoap.org/wsdl/soap/"
  xmlns:xs="http://www.w3.org/2001/XMLSchema"
  targetNamespace="http://foo.bar.com/netdoc/">
  <import location="http://foo.bar.com/types.wsd"          ⎫
    namespace="http://foo.bar.com/types">                  ⎬ 40
  </import>                                                ⎭
  <message name="printInput">        ⎯ 41                  ⎫
    <part name="fileId" type="xs:unsignedInt"/>            ⎬ 42
    <part name="count" type="xs:unsignedInt"/>             ⎭
  </message>
  <message name="printOutput">⎯ 43                         ⎫ 44
    <part name="requestId" type="xs:unsignedInt"/>         ⎬
  </message>                                          ⎯ 45 ⎭
  <portType name="netdocPortType">                         ⎫
    <operation name="print">⎯ 47                      ⎫    ⎬ 46
      <input message="tns:printInput"/>               ⎬ 48 ⎪
      <output message="tns:printOutput"/>             ⎭    ⎪
    </operation>                                           ⎪
  </portType>                                              ⎭
```

FIG.30

```
<binding name="netdocHttpBinding" type="tns:netdocPortType">       — 49
  <sb:binding transport="http://schemas.xmlsoap.org/soap/http"
              style="rpc"/>                                         — 52
  <operation name="print">                                          — 53
    <sb:operation soapAction="http://foo.bar.com/netdoc/print"/>
    <input>                                                         — 54
      <sb:body encodingStyle="http://schemas.xmlsoap.org/soap/encoding/"
               use="literal" namespace="http://foo.bar.com/netdoc/"/>
    </input>                                                        — 56
    <output>
      <sb:body encodingStyle="http://schemas.xmlsoap.org/soap/encoding/"
               use="literal" namespace="http://foo.bar.com/netdoc/"/>
    </output>
  </operation>
</binding>
<service name="netdoc">                                             — 58
  <port name="netdocPort" binding="tns:netdocHttpBinding">          — 60
    <sb:address location="http://printer.foo.bar.com/netdoc/"/>
  </port>
</service>
</definitions>
```

Brackets: 50 (whole block), 51, 55, 57, 59

FIG.32

```
    SERVICE NAME  OPERATION NAME
    ⌒‿⌒     ⌒‿⌒
    SoapFault netdoc_print(Netdoc_printInput *in,
                            ‿‿‿‿‿‿‿ ‿‿‿‿‿‿‿
                            SERVICE NAME  INPUT
                                          MESSAGE NAME Netdoc_printOutput *out);
                   ‿‿‿‿‿‿‿‿ ‿‿‿‿‿‿‿‿‿
             SERVICE NAME    OUTPUT
                             MESSAGE NAME
```

FIG.33

```
typedef struct _Netdoc_printInput {
```
           SERVICE NAME   INPUT MESSAGE NAME unsigned int fileId;

PARAMETER TYPE   PARAMETER NAME unsigned int count;

```
} Netdoc_printInput;
```

FIG.34

```
typedef struct _Netdoc_printOutput {
         ╰──┬──╯ ╰──────┬──────╯
       SERVICE NAME  INPUT MESSAGE NAME unsigned int  requestId;
        ╰─────┬────╯  ╰────┬───╯
        PARAMETER TYPE  PARAMETER NAME } Netdoc_printOutput;
```

FIG.35

```
Document *netdoc_print_handler(Document *d) {          ~901
    Netdoc_printInput *in;
    Netdoc_printInput *out;
    SoapFault fault;
    Document *responseDocument;

ACQUIRE ROOT ELEMENT—>Envelope ELEMENT                              ~S120
      ACQUIRE CHILD NODE LIST                                           ~S121
      SEARCH FOR AND ACQUIRE ELEMENT HAVING TAG NAME OF Body—>Body ELEMENT ~S122
      ACQUIRE FIRST CHILD NODE—>print ELEMENT                           ~S123
      ACQUIRE CHILD NODE LIST                                           ~S124
      LOOP (ACQUIRE TAG NAMES FROM CHILD NODE LIST SEQUENTIALLY) {      ~S125, S132
        if( f i l e I d ) {                                             ~S126
          ACQUIRE FIRST CHILD NODE—>TEXT NODE                           ~S127
          EXTRACT TEXT DATA AND CONVERT INTO INTEGER—>FILE ID PARAMETER ~S128
        }
902{    if( c o u n t ) {                                               ~S129
          ACQUIRE FIRST CHILD NODE—>TEXT NODE                           ~S130    ,S131
          EXTRACT TEXT DATA AND CONVERT INTO INTEGER—>COPY QUANTITY PARAMETER
        }
      }
      in = STRUCTURE DATA;                    ~S133 fault = netdoc_print(in,out);           ~S134 if(fault) {
         responseDocument = SOAPFault         ~S135
      } else {
         GENERATE Envelope ELEMENT                                      ~S140
         GENERATE Body ELEMENT                                          ~S141
         CONNECT Body ELEMENT TO Envelope ELEMENT                       ~S142
         GENERATE printResponse ELEMENT                                 ~S143
         CONNECT printResponse ELEMENT TO Body ELEMENT                  ~S144
         GENERATE requestId ELEMENT                                     ~S145
    903{ CONNECT requestId ELEMENT TO printResponse ELEMENT             ~S146
         GENERATE TEXT NODE FROM RESULTING REQUEST ID                   ~S147
         CONNECT TEXT NODE TO requestId ELEMENT                         ~S148
      }
      return responseDocument;           ~S149
   }
```

FIG.39

```
POST /netdoc HTTP/1.0
Content-Type: text/xml; charset=UTF-8
Content-Length: nnnn
SOAPAction: "http://foo.bar.com/netdoc/print"

<SOAP-ENV:Envelope ~21
  xmlns:SOAP-ENV = "http://schemas.xmlsoap.org/soap/envelope/"
  xmlns:ns = "http://foo.bar.com/netdoc/"
  SOAP-ENV:encodingStyle = "http://schemas.xmlsoap.org/soap/encoding/"
>
  <SOAP-ENV:Header/> ~22
  <SOAP-ENV:Body> ~23
    <ns:print>   ~24
25 ~  <fileId>123</fileId>  ~27
26 ~  <count>2</count>
    </ns:print> ~28
  </SOAP-ENV:Body>
</SOAP-ENV:Envelope>
```

20 HTTP BODY

```
                                                         ┌─29
struct Netdoc_printInput {
                                        ┌─S128
    unsigned int fileId;      ←123

┌─S131
    unsigned int count;       ←2
};
```

```
                                                         ┌─301
PRINT FUNCTION                          30
                                  ┌─────┴─────┐
SoapFault netdoc_print(Netdoc_printInput *in, Netdoc_printOutput *out);
              └─────────────┬─────────────┘
                            31
```

```
struct Netdoc_printOutput {
    unsigned int requestId;;   ←100
};
```
⟵ 39

PRINT FUNCTION                          301

SoapFault netdoc_print(Netdoc_printInput *in,
                       Netdoc_printOutput *out);
                       ⎵⎵⎵⎵⎵⎵⎵⎵⎵⎵⎵⎵⎵⎵⎵⎵⎵⎵⎵⎵⎵⎵
                                  30
                                  31

FIG.46

```
HTTP/1.0 200 OK
Content-Type: text/xml; charset=UTF-8
Content-Length: nnnn

<SOAP-ENV:Envelope                              ~32
  xmlns:SOAP-ENV = "http://schemas.xmlsoap.org/soap/envelope/"
  xmlns:ns = "http://foo.bar.com/netdoc/"
  SOAP-ENV:encodingStyle = "http://schemas.xmlsoap.org/soap/encoding/"
>
  <SOAP-ENV:Body>                ~33
    <ns:printResponse>           ~34
      <requestId>100</requestId> ~36
    </ns:printResponse>
   35
  </SOAP-ENV:Body>
</SOAP-ENV:Envelope>
```

32 HTTP BODY

IMAGE FORMING APPARATUS, WITH CONNECTION REQUEST MEDIATION, HAVING WEB SERVICE FUNCTIONS

TECHNICAL FIELD

The present invention relates to an image forming and processing apparatus having a plurality of communication protocols, and more particularly, an object of the present invention is to provide an image forming and processing apparatus that can transmit and receive data even if an application does not have respective process parts corresponding to various communication protocols and easily add a communication protocol and an application. Also, another object of the present invention is to provide an image forming apparatus in which an application to provide a Web service can be easily developed and added. In addition, another object of the present invention is to provide a program that can automatically generate a program to convert a description format of request and response messages of a Web service into a data format processable for a program of the Web service.

BACKGROUND ART

Recently, image forming apparatuses, each of which accommodates respective functions of various devices such as a printer, a copier, a facsimile and a scanner in one housing thereof, are widely known. Such a compound type image forming apparatus includes a displaying part, a printing part and an imaging part in one housing but also respective applications corresponding to a printer device, a copy device, a scanner device and a facsimile device, and by switching the applications, the image forming apparatus can be made to operate as a printer device, a copy device, a scanner device and a facsimile device.

However, as the Internet is widely used and a variety of communication protocols are designed, the market requires that a conventional compound type image forming apparatus having a printer function as mentioned above be able to meet printing requests delivered from various types of interfaces. In such a conventional compound type image forming apparatus, whenever a new interface is added, the image forming apparatus is individually capacitated to meet such a market need. In the case of individual capacitation, it is necessary to modify installed applications so that these applications can deal with a newly added interface. On the other hand, if an application is newly developed and installed, there is a problem that the application has to be developed to have compatibility with a plurality of interfaces.

Also, since the recent development and popularization of the Internet make such a conventional compound type image forming apparatus having a printer function that can communicate via a network connectable to other devices via the network, the image forming apparatus is expected to provide a Web service that can be served under communication control in accordance with a communication protocol for the Internet, that is, HTTP (Hypertext Transfer Protocol). In addition to the communication control in accordance with HTTP, furthermore, it is required to cause each application of a conventional compound type image forming apparatus to perform operations caused by differences of methods specified in HTTP and XML descriptive operations so that the applications to execute image forming operations can communicate messages under a tendency to widen the coverage of connected devices by describing a general-purpose description format such as XML (extensible Markup Language) in the body part of HTTP. Accordingly, developers that develop an application corresponding to a Web service are required to develop a function-by-function program.

In the conventional compound type image forming apparatus, if each application provides an image forming process as a Web service via a network, it is necessary to modify the installed application so that the description format of messages communicated in accordance with a network protocol can be interpreted. Also, in a case where the description format of the messages is XML (eXtensible Markup Language), if applications developed in accordance with a conventional development method are modified corresponding to a Web service or if an application corresponding to a Web service is newly added to the conventional compound type image forming apparatus, it is difficult to develop an application in accordance with a conventional development method because of requirement of XML knowledge to the developers.

As mentioned above, since the data format of a message in accordance with XML is different from the data format processable in a program language for a Web service function, it is necessary to provide a scheme to absorb the difference between the two data formats in each Web service function. In the development of such a scheme to absorb the data format difference, a large number of simple and similar codes have to be repeated, and there is a problem in that bugs due to simple errors may be contained easily.

DISCLOSURE OF INVENTION

An object of the present invention is to provide an image forming and processing apparatus having a mediation process part to mediate a plurality of applications to perform respective different kinds of image formation with various communication protocols by controlling transmission and receipt of print data and image data between a device connected via various types of interfaces that can realize easy addition of a communication protocol and an application.

Also, another object of the present invention is to provide an image forming and processing apparatus configured to include a plurality of applications for respective different types of image formation and enable the plurality of applications to share a process part required to provide a Web service by modularizing the process part in order to easily develop and add an application to provide the Web service.

Furthermore, another object of the present invention is to provide an image forming apparatus in which an application workable as a Web service can be developed without dependence on description formats of messages communicated between the image forming apparatus to provide a plurality of Web services and a device connected to the image forming apparatus.

Also, another object of the present invention is to provide a program that can realize easy program development of a plurality of Web services without dependence on description formats of messages communicated between the image forming apparatus to provide the plurality of Web services and a device connected to the image forming apparatus and automatically generate a program to convert data formats processable for development programs of the Web services and the description formats.

These objects can be solved by the means described below.

According to the present invention, an image forming apparatus is configured to include an application executing a process related to image formation, a plurality of communication protocol daemons transmitting and receiving data in accordance with respective different communication protocols, and connection request mediation means for, in response to a connection notice from each of the communication protocol daemons, mediating connection instead of the communication protocol daemon by informing the application that a connection request is provided to the communication protocol daemon. Also, the image forming apparatus can be configured to include a shared memory being shared by the plurality of communication protocol daemons, the shared memory storing received data and transmitted data and being used for delivery of the received data and the transmitted data between the application and the plurality of communication protocol daemons.

In such an image forming apparatus, a protocol control daemon 9 to use connection request mediation means (request mediation daemon 7) for mediating connection between various communication protocols and an application for executing a process related to image formation control and a shared memory (99) to control transmission and receipt of data is configured. As a result, interfaces of the plurality of communication protocols and each application do not have to be conscious each other. Thus, it is possible to easily add a communication protocol and an application to such an image forming apparatus.

According to the present invention, an image forming apparatus is configured to include a plurality of method process means for performing a predefined process in accordance with a method, and a Web service execution means for, in response to a process request, executing a Web service by distributing the process request to the method process means corresponding to the method designated in the process request. In addition, the image forming apparatus can be configured to include a plurality of Web service applications sharing a process in a same method and performing a process related to image formation as the Web service.

According to such an image forming apparatus, since a process is modularized for each method, a plurality of Web service applications can share a process specific to a method.

According to the present invention, an image forming apparatus is configured to include Web service process means for executing a process based on a request message from a device connected via a network and providing a process result of the process as a Web service and conversion means for converting the request message received in accordance with a predefined message communication protocol into a process request processable by the Web service process means and converting the process result supplied from the Web service process means into a response message in accordance with the message communication protocol.

According to such an image forming apparatus, since a request message prescribed in a message communication protocol is converted into a process request processable by the Web service process means and a process result of the Web service process means is converted into a response message prescribed in a message communication protocol, it is possible to develop the Web service process means without knowledge of such a message communication protocol.

According to the present invention, a computer readable program is configured for causing a computer to execute an element tree generation step of analyzing an interface definition to define an interface of a Web service and generating a first element tree indicative of an association between a plurality of elements configuring the interface definition and a conversion program generation step of generating a conversion program to perform conversion between a request message and a response message regarding the Web service described in an input and output data format processable by a Web service function to execute the Web service and a predefined description format based on the first element tree.

In a computer device in which such a program is installed, it is possible to generate a program (for example, a handler process part in an embodiment) to perform conversion between request and response messages in accordance with a predefined description format (such as XML (extensible Markup Language)) and input and output data formats of Web service functions from interface definitions (such as WSDL (Web Service Description Language)) to define interfaces of Web services. Thus, since a large number of simple and similar codes can be generated, it is possible to eliminate the problem that bugs may be included due to simple mistakes of developers. Also, since program generation time can be reduced, it is possible to lessen workloads on developers.

BRIEF DESCRIPTION OF DRAWINGS

FIG. 21 is a diagram to explain a enumeration type definition generation process in a source code generation process;

FIG. 22 is a diagram to explain a structure type definition generation process in a source code generation process;

FIG. 23 is a diagram to explain an array type definition generation process in a source code generation process;

FIG. 24 is a diagram to explain an enumeration type function declaration process in a source code generation process;

FIG. 25 is a diagram to explain a structure function declaration process in a source code generation process;

FIG. 26 is a diagram to explain an array function declaration process in a source code generation process;

FIG. 29 is a diagram illustrating an exemplary description of an interface definition in accordance with WSDL;

FIG. 30 is a diagram illustrating an exemplary description of an interface definition in accordance with WSDL;

FIG. 32 is a diagram to explain function declaration of a Web service function;

FIG. 33 is a diagram to explain a structure definition of an input message;

FIG. 34 is a diagram illustrating a structure definition of an output message;

FIG. 35 is a diagram illustrating an exemplary automatically generated handler source code;

FIG. 39 is a diagram illustrating an exemplary description of an HTTP request in accordance with SOAP using XML;

FIG. 46 is a diagram illustrating an exemplary description of an HTTP response in accordance with SOAP using XML converted from an element tree.

BEST MODE FOR CARRYING OUT THE INVENTION

In the following, embodiments of the present invention are explained with reference to the accompanying drawings.

First Embodiment

Figure 1:
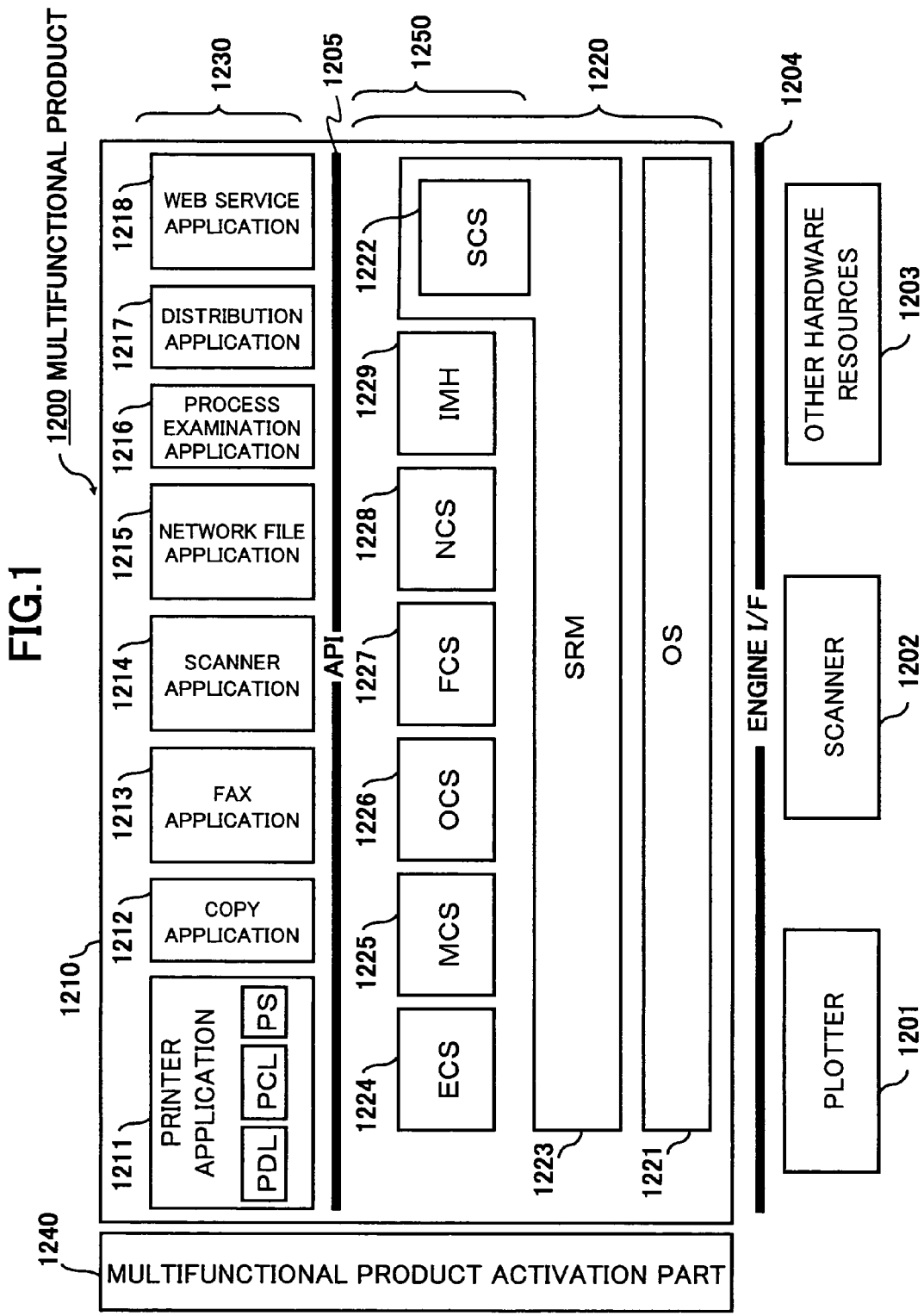
FIG. 1 is a block diagram illustrating a functional structure of a multifunctional product collectively having various image formation functions according to one embodiment of the present invention.

An image forming apparatus having various image formation functions (hereinafter which is referred to as a multifunctional product) according to the first embodiment of the present invention has a functional structure, for example, as illustrated in FIG. 1. FIG. 1 is a block diagram illustrating a functional structure of a multifunctional product having various image formation functions according to one embodiment of the present invention.

In FIG. 1, a multifunctional product 1200 has not only a plotter 1201, a scanner 1202 and other hardware resources 1203 but also a software set 1210, which is configured from a platform 1220 and an application 1230, and a multifunctional product activation part 1240.

When the multifunctional product 1200 is powered ON, the multifunctional product activation part 1240 is first executed to activate the platform 1220 and the application 1230.

The platform 1220 has a control service 1250, which is described below, to interpret a process request from the application 1230 and issue an acquisition request for a hardware resource and one or more hardware resources, a system resource manager (SRM) 1223 to manage one or a plurality of hardware resources and arbitrate an acquisition request from the control service 1250, and OS (Operating System) 1221.

The control service 1250 is configured from a plurality of service modules, specifically including SCS (System Control Service) 1222, ECS (Engine Control Service) 1224, MCS (Memory Control Service) 1225, OCS (Operation panel Control Service) 1226, FCS (FAX Control Service) 1227, NCS (Network Control Service) 1228 and IMH (Imaging Memory Handler) 1229. Here, the platform 1220 has an application program interface that enables a process request to be received from the application in accordance with a predefined function.

OS 1221 is an operating system such as UNIX (registered trademark) and executes individual software items of the platform 1220 and the application 1230 as respective processes in parallel. When UNIX (registered trademark), which is an open source, is used, it is possible to not only ensure security of programs but also obtain source codes easily because of network availability. In addition, royalty of OS and TCP/IP is unnecessary, and outsourcing is made easy.

SRM 1223 together with SCS 1222 is engaged in system control and resource management, arbitrates hardware resources of an engine part including a scanner, a plotter and other devices, a memory, a HDD file and a host I/O (a centronics I/F, a network I/F, an IEEE1394 I/F, an RS232C I/F and so on) in accordance with requests from an upper layer that uses the hardware resources, and conducts execution control.

Specifically, SRM 1223 determines whether a requested hardware resource is available (whether the requested hardware resource is in service for other requests), and if the hardware resource is available, SRM 1223 reports availability of the requested hardware resource to the upper layer. Also, SRM 1223, in response to a request from the upper layer, may schedule the hardware resources and directly fulfill request contents (for example, a paper carry operation and an image forming operation performed by a printer engine, memory reservation and file creation).

SCS 1222 carries out a plurality of functions of application management (function 1), operation part control (function 2), system screen displaying (job list screen, a counter display screen and so on) (function 3), LED displaying (function 4), resource management (function 5), interrupt application control (function 6) and so on. Specifically, in the application management (function 1), an application is registered and the information is reported to other applications. In operation part control (function 2), the right of an application to use the operation part is exclusively controlled. In the system screen displaying (function 3), in response to request contents from an application having the right of use to the operation part, an alarm screen is displayed corresponding to statuses of the engine part. In the LED displaying (function 4), displaying of a system LED such as an alarm LED and an application key is controlled. In the resource management (function 5), during job execution of an application using ECS, exclusive control over the engine resources (a scanner, a staple and so on) that have to be excluded is served. In the interrupt application control (function 6), control and service to preferentially operate a certain application are performed.

ECS 1224 controls the engine part of the plotter 1201, the scanner 1202 and other hardware resources 1203 and performs image reading operations, printing operations, status report operations and jam recovery operations.

MCS 1225 controls a memory. Specifically, MCS 1225 acquires and releases an image memory, uses a hard disk device (HDD), and scales image data.

OCS 1226 is a module to control an operation panel as communication means between an operator and a body control part of the apparatus and performs operations to inform the body control part that a key manipulation event is generated by an operator, operations to provide a library function that each application uses to construct GUI, operations to manage constructed GUI information with respect to each application, and display reflection operations on an operation panel.

FCS 1227 provides an API (Application Program Interface) to perform facsimile transmission and receipt using a PSTN/ISDN network from each application layer of a system controller, registration/citation of sorts of facsimile data managed in BKM (backup SRAM), facsimile reading, facsimile receiving and printing, and compound transmission and receipt.

NCS 1228 is a module set to provide a service that applications requiring a network I/O can commonly use. NCS 1228 distributes data received from the network side by each protocol to individual applications and serves as an intermediary to send data from an application to the network side.

In this embodiment, NCS 1228 uses a http (Hypertext Transfer Protocol) daemon, which is one of a plurality of protocols, to control data communication to a network device connected via the Internet in accordance with HTTP (Hypertext Transfer Protocol), starts a plurality of Web services required for processes designated by an HTTP request header by calling functions, and reports process results of the plurality of Web services to the network device as HTTP responses. The Web services are processed, for example, in accordance with messages described in XML (extensible Markup Language).

IMH 1229 maps image data from a virtual memory area (user virtual space) to a physical memory. In response to activation of a process, IMH 1229 calls the system, maps the virtual memory area for a process, and releases the mapped virtual memory area at process completion time.

The application 1230 has a printer application 1211 being an application for a printer having page descriptive language (PDL), PCL and postscript (PS), a copy application 1212 being an application for copying, a FAX application 1213 being an application for FAX, a scanner application 1214 being an application for a scanner, a network file application 1215 being an application for a network file, a process examination application 1216 being an application for process examination, a distribution application 1217 being an application for distribution, and a Web service application 1218 for providing results of execution as Web services. Since the individual applications 1211 through 1218 can use processes on the platform 1220 to perform operations, a screen display control program to conduct screen control, key manipulation control, job generation and so on plays a main role. Here, a new application can be installed via a network connected by NCS 1228. Also, each application can be added or removed per application.

Here, the Web service application 1218 is an application to execute a process corresponding to an HTTP request reported by NCS 1228, and the process result is provided as an HTTP response to the network device that issues the HTTP request by NCS 1228.

In this fashion, the multifunctional product 1200 collectively performs processes commonly necessary for individual applications in the platform 1220.

Figure 2:
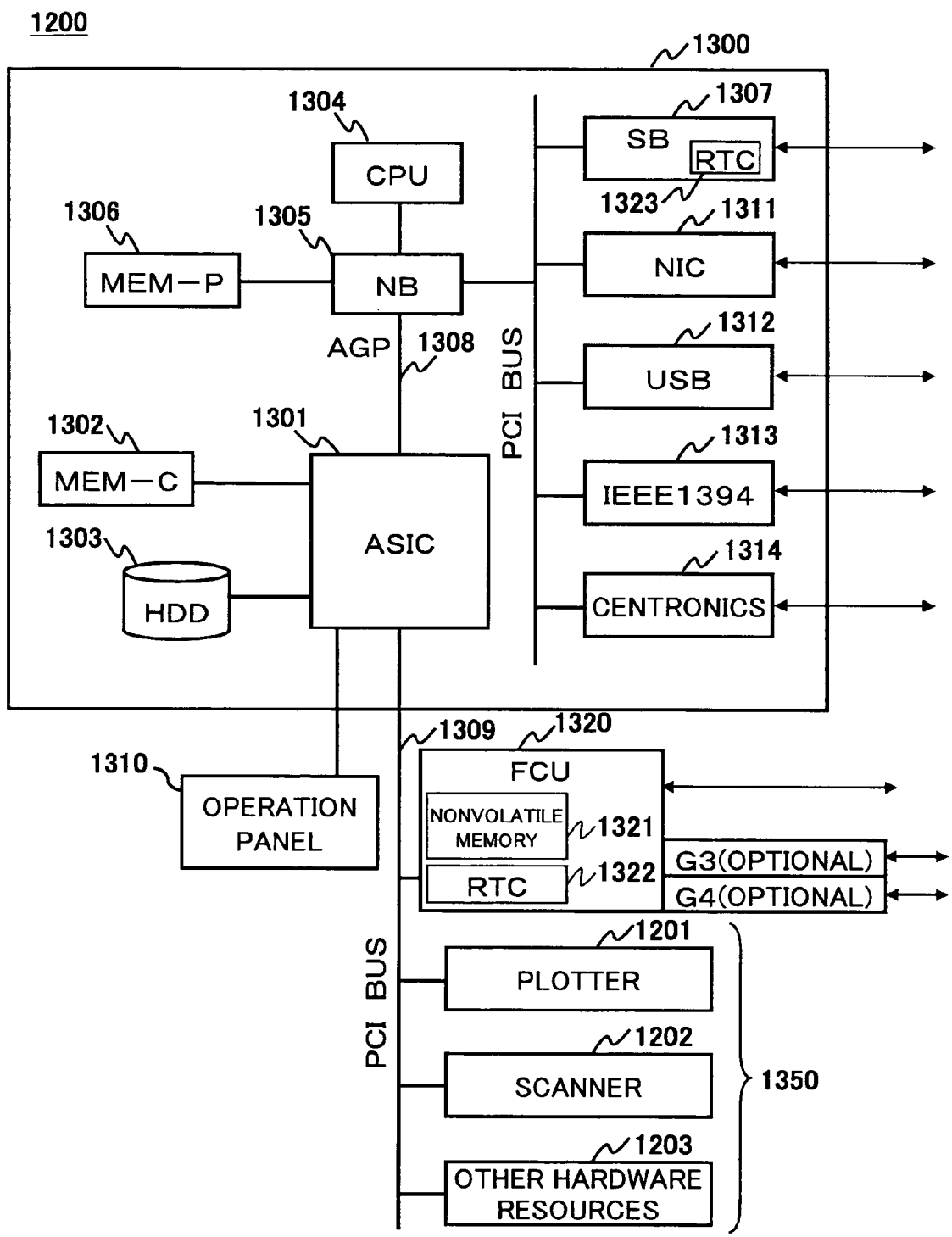
FIG. 2 is a block diagram illustrating a hardware structure of the multifunctional product shown in FIG. 1.

Next, a hardware configuration of the multifunctional product 1200 is explained. FIG. 2 is a block diagram illustrating a hardware structure of the multifunctional product shown in FIG. 1. As shown in FIG. 2, the multifunctional product 1200 is configured by connecting an operation panel 1310, FCU (FAX Control Unit) 1320, an engine part 1350 composed of the plotter 1201, the scanner 1202 and other hardware resources, and ASIC 1301 of the controller 1300 via a PCI (Peripheral Component Interconnect) bus or the like. FCU 1320 has a nonvolatile memory 1321 for storing received FAX data and RTC (Real Time Clock) 1322 for measuring the time in FCU 1320. FCU 1320 usually transmits and receives FAX data in accordance with G3 standard. FCU 1320 may further include both G3 standard and G4 standard.

In the controller 1300, MEM-C 1302, HDD (Hard Disk Drive) 1303 and other components are connected to ASIC 1301, and furthermore, ASIC 1301 is connected to CPU 1304 via NB 1305 of the CPU chip set. Since the interface of CPU 1304 is not disclosed, ASIC 1301 is connected to CPU 1304 via NB 1305 as mentioned above.

Here, ASIC 1301 is connected to NB 1305 not simply via PCI but via AGP 1308. The reason that ASIC 1301 is connected to NB 1305 via AGP 1308 in this fashion is why the connection using a low-speed PCI may reduce the performance because the multifunctional product 1200 controls execution of a plurality of processes configuring the platform 1220 and the application 1230.

CPU 1304 totally controls the multifunctional product 1200. Specifically, CPU 1304 starts and executes SCS 1222, SRM 1223, ECS 1224, MCS 1225, OCS 1226, FCS 1227 and NCS 1228, which compose the platform 1220 on OS 1221, as respective processes. In addition, CPU 1304 starts and executes the printer application 1211, the copy application 1212, the FAX application, the scanner application 1214, the network file application 1215, the process examination application 1216, the distribution application 1217, and the Web service application 1218, which compose the application 1230.

NB 1305 is a bridge to connect CPU 1304 to MEM-P 1306, SB 1307 and ASIC 1301. MEM-P 1306 is a system memory used as a drawing memory of the multifunctional product. MEM-C 1302 is a local memory used as a copy image buffer and a code buffer. ASIC 1301 is an image processing specific IC having an image processing hardware element.

NB 1305 is connected to SB 1307 via a PCI bus. In addition, NB 1305 is connected to NIC (Network Interface Card) 1311 to control network communication, USB (Universal Serial Bus) 1312 and IEEE1394 1313 to enable transmission and receipt of large-sized image data in connection with a personal computer, and a centronics 1314 connectable via a parallel cable. SB 1307 is a bridge to connect NB 1305 to ROM, a PCI device and a peripheral device. SB 1307 has RTC (Real Time Clock) 1323 to measure time in the controller 1300.

HDD 1310 is a storage to store image data, programs, font data and forms. An operation panel 1310 is an operation part to accept input manipulation from an operator and display messages for an operator.

Accordingly, a RAM interface for connection with MEM-C 1302 and a hard disk interface for connection with HDD 1310 are provided to ASIC 1301. When image data are input/output to/from these memory parts, the input/output destination is switched into the RAM interface or the hard disk interface.

AGP 1308 is an interface for a graphic accelerator card presented to increase the processing speed of a graphic process. By directly accessing a system memory at a high throughput, it is possible to improve the processing speed of the graphics accelerator card.

Next, data transmission and receipt control between the application 1230 and NCS 1228 is described.

Figure 3:
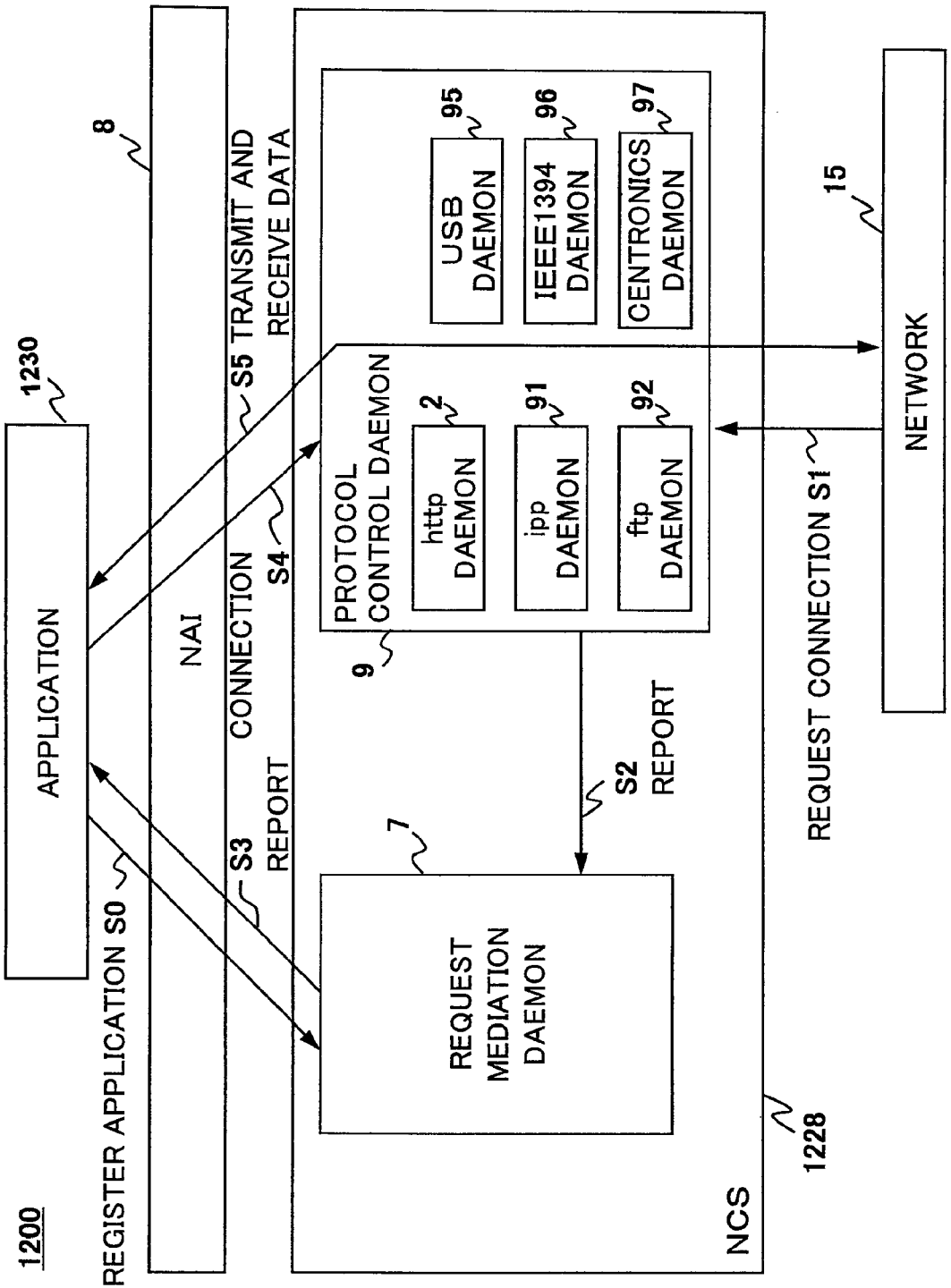
FIG. 3 is a diagram illustrating an outline of a process for mediation between a communication control process and an application.

FIG. 3 is a diagram illustrating an outline of an operation of a process to mediate between a communication control process and an application. In FIG. 3, only main functional components of the multifunctional product 1200 are illustrated, and the other functional components are omitted. In FIG. 3, the multifunctional product 1200 has the application 1230 to execute various image formation processes, NCS 1228 having a plurality of communication control daemons to control various communication protocols, and NAI 8 to take an interface between NCS 1228 and the application 1230. The multifunctional product 1200 is connected to a network 15. NCS 1228 has a request mediation daemon 7 to mediate between the daemon 9 and the application 1230, and a protocol control daemon 9 configured from various communication protocol daemons. The protocol control daemon 9 has an http daemon 2, an ipp daemon 91, a ftp daemon 92, a USB daemon 93, an IEEE1394 daemon 94 and a centronics daemon 95.

The http daemon 2 controls communication, for example, in accordance with HTTP (Hypertext Transfer Protocol). The http daemon 2 sets a network, monitors for a status of the device, transmits and receives a device control command in XML in cooperation with an application. The ipp daemon 91 controls receipt of print data in accordance with IPP (Internet Printing Protocol) being an HTTP-based printing protocol. The ftp daemon 92 controls to provide a service in accordance with FTP (File Transfer Protocol).

The USB daemon 93 controls receipt of print data from a device directly connected via a USB cable. The IEEE1394 daemon 94 controls receipt of print data from a device directly connected via an IEEE1394 cable. The centronics daemon 95 controls receipt of print data from a device directly connected via a parallel cable.

Referring to FIG. 3, the application 1230 registers an application in the request mediation daemon 7 of NCS 1228 via NAI 8 (step S0). In response to receipt of a connection request via the network 15 (step S1), the protocol control daemon 9 of NCS 1228 informs the request mediation daemon 7 (step S2). The request mediation daemon 7 reports the connection request to the application 1230 via NAI 8 (step S3). The application 1230 performs connection with the protocol control daemon 9 via NAI 8 (step S4). The protocol control daemon 9 transmits and receives data to/from the application 1230 via the network 15 in connection with the application 1230 (step S5).

From the above description, it will be understood that NCS 1228 differs from other services of the control service 1250 in that communication takes place through two processes of the protocol control daemon 9 and the protocol control daemon 9.

NCS 1228 uses a shared memory as means for communicating a large amount of data between processes. The shared memory is a memory area to which a plurality of different processes are allowed to access. NCS 1228 is a standard function provided to NetBSD (registered trademark). In order to exclusively access the shared memory from a plurality of processes, it is necessary to communicate information on reading and writing of data each other.

A detailed description is given, with reference to FIG. 4 through FIG. 8, of a sequence to communicate a large amount of data between NCS 1228 and the application 1230 in the process outline shown in FIG. 3.

Figure 4:
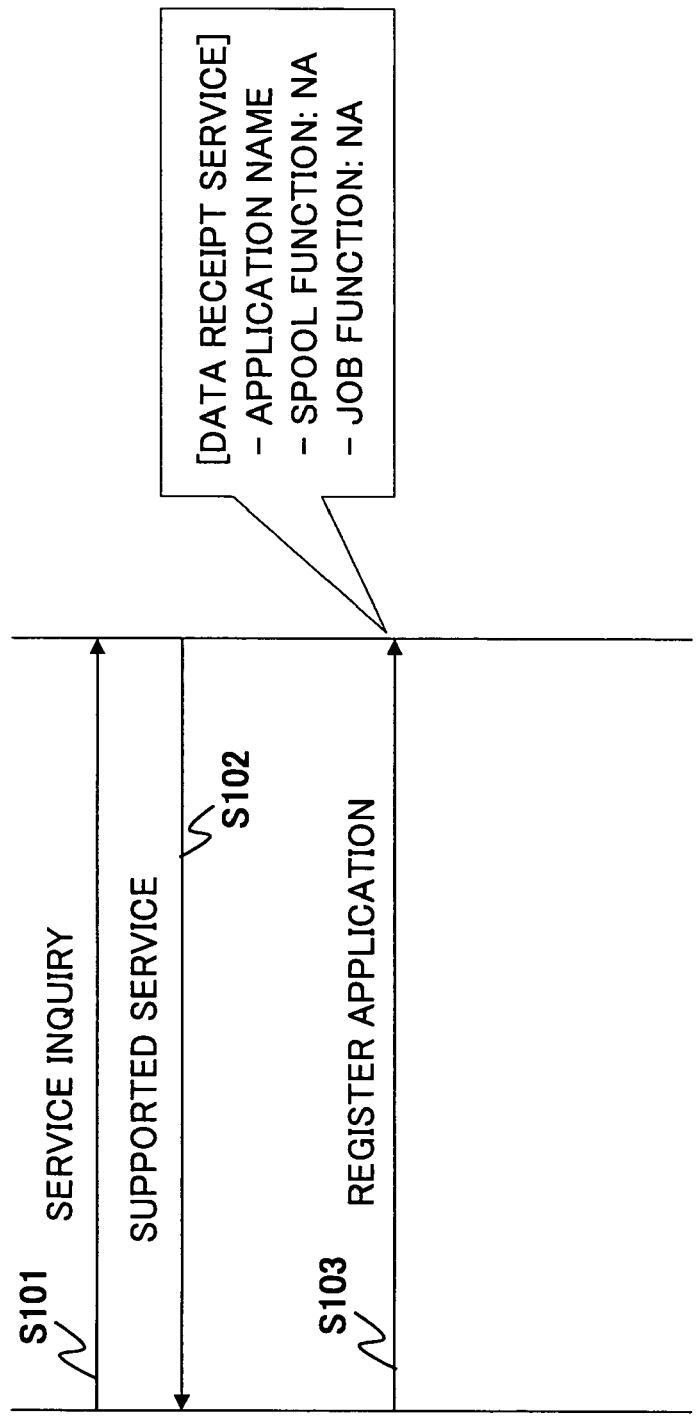
FIG. 4 is a diagram illustrating a registration sequence to register an application.

FIG. 4 is a diagram illustrating a registration sequence to register an application. Referring to FIG. 4, the application 1230 makes an inquiry to the request mediation daemon 7 (step S101). In response to receipt of a report on supported services from the request mediation daemon 7 (step S102), the application 1230 registers an application to the request mediation daemon 7 by reporting service contents of the application 1230 (step S103). For example, the application, a spool function (not available), a job function (not available) and so on are registered.

This registration makes it possible for the request mediation daemon 7 to obtain information to indicate which application the request mediation daemon 7, in response to receipt of a connection notice from the protocol control daemon 9, should mediate to connect to which communication protocol daemon.

Figure 5:
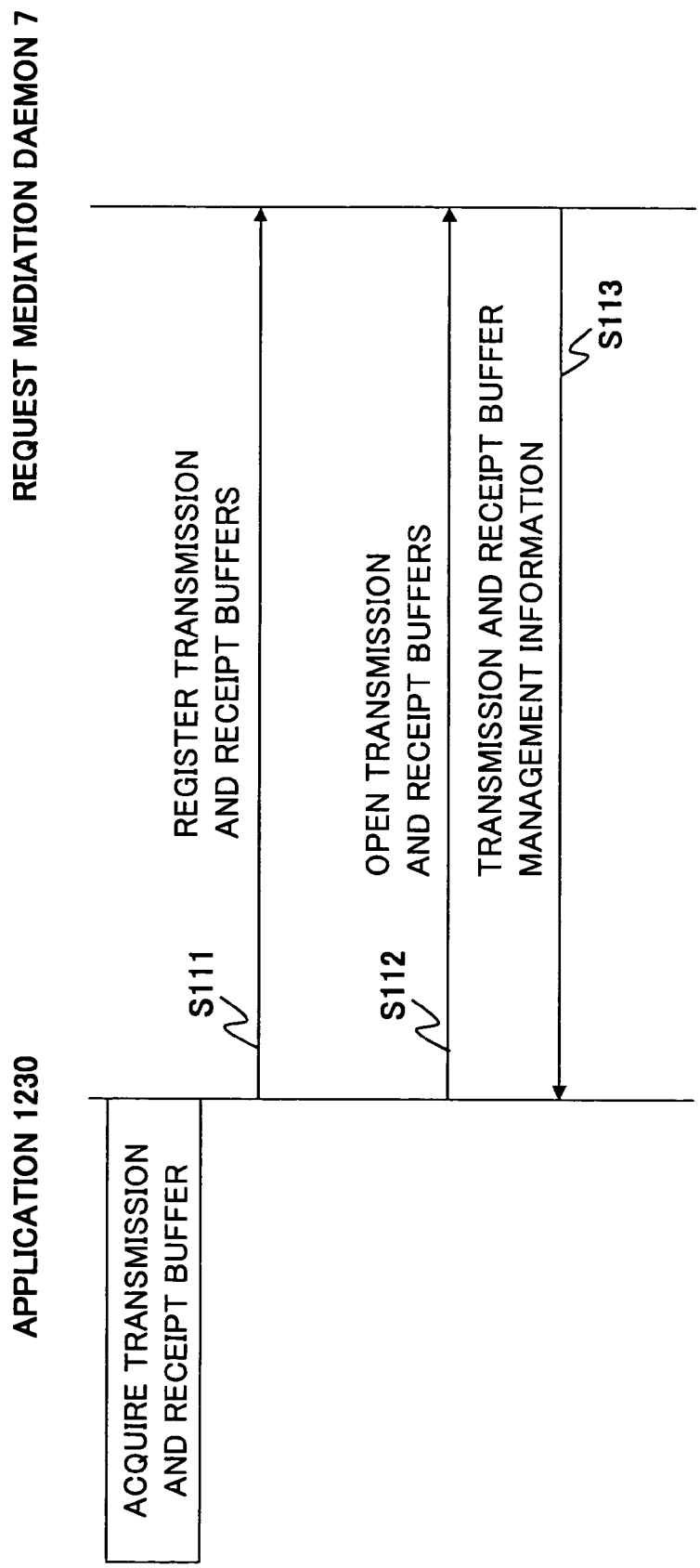
FIG. 5 is a diagram illustrating a buffer registration sequence to register an application buffer.

FIG. 5 is a diagram illustrating a buffer registration sequence to register an application buffer. Referring to FIG. 5, the application 1230 executes a transmission and receipt buffer acquisition process. The application 1230 registers a plurality of transmission and receipt buffers for the application 1230 to the request mediation daemon 7 (step S111). In addition, the application 1230 opens the registered transmission and receipt buffers (step S112) and obtains transmission and receipt buffer management information from the request mediation daemon 7 (step S113). At this time, the application 1230 reserves a plurality of transmission and receipt buffers for itself in the shared memory.

Figure 6:
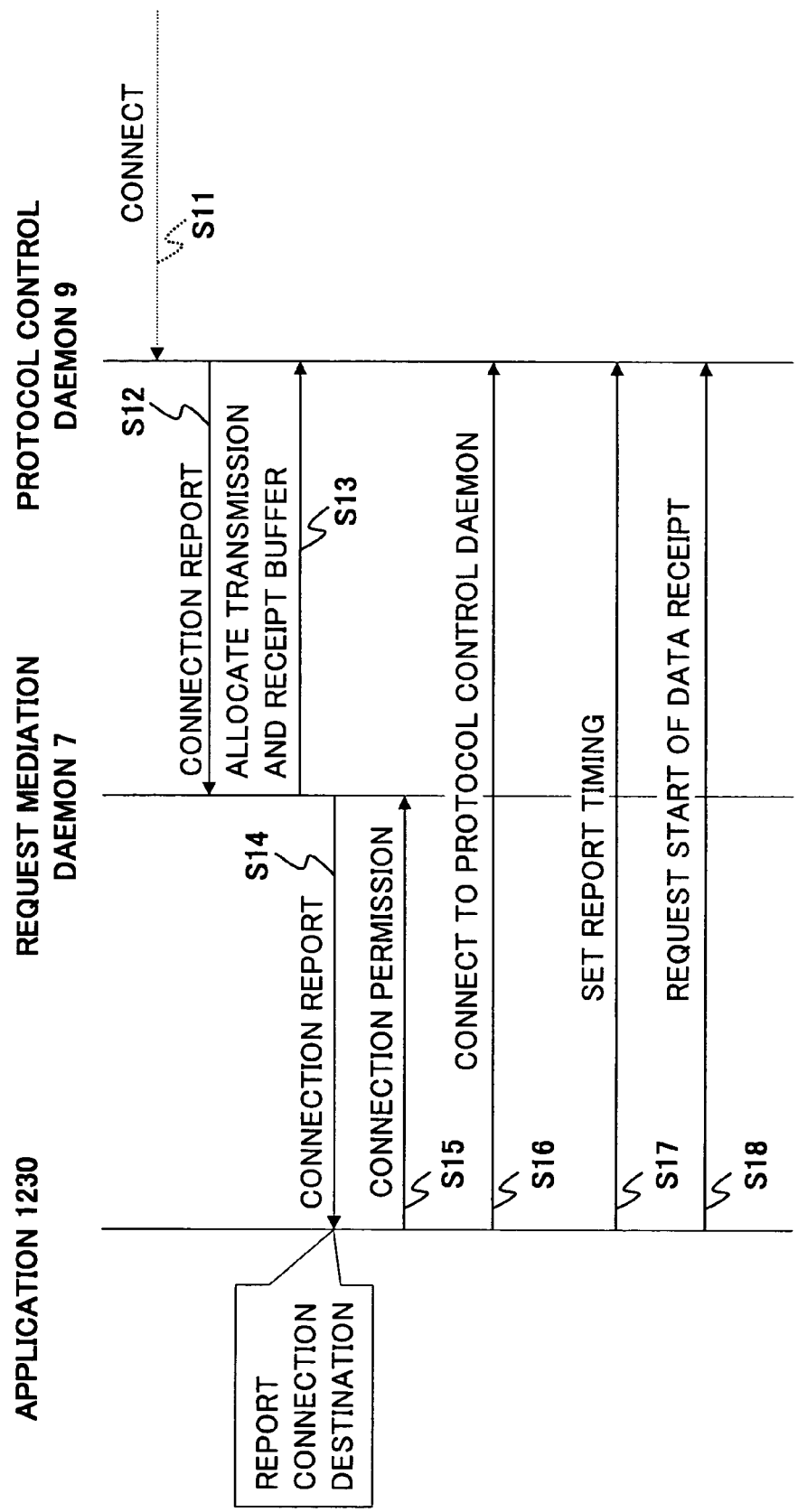
FIG. 6 is a diagram illustrating a request report sequence to report a request to an application.

FIG. 6 is a diagram illustrating a request report sequence to report a request to an application. Referring to FIG. 6, in response to receipt of a connection notice via the network 15 (step S11), the protocol control daemon 9 reports the connection notice to the request mediation daemon 7 (step S12). In response to receipt of the connection notice from the protocol control daemon 9, the request mediation daemon 7 assigns one of the plurality of the transmission and receipt buffers that the application 1230 has registered and then informs the protocol control daemon 9 (step S13).

In addition, the request mediation daemon 7 provides a connection notice to the application 1230 to report a connection destination (step S14). In response to the connection notice, the application 1230 provides a connection permission to the request mediation daemon 7 (step S15). Then, the application 1230 establishes a connection with the protocol control daemon 9 (step S16). The protocol control daemon 9 connected to the application 1230 is one of daemons 2 and 91 through 95 as shown in FIG. 3. In addition, the application 1230 sets report timing to the protocol control daemon 9 (step S17) and requests the protocol control daemon 9 to start data receipt from the connection destination (step S18).

Figure 7:
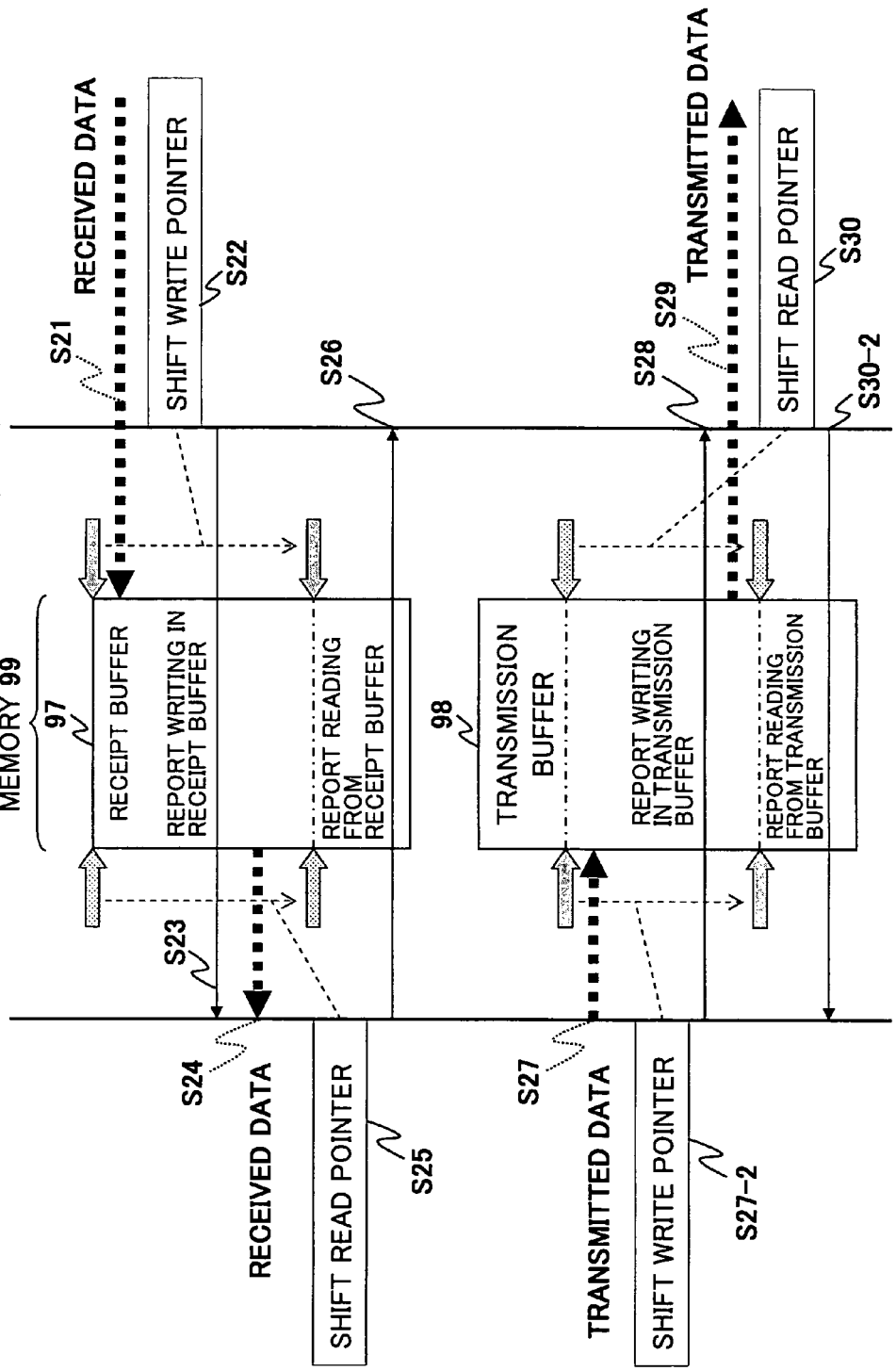
FIG. 7 is a diagram illustrating a data transmission and receipt sequence.

FIG. 7 is a diagram illustrating a data transmission and receipt sequence. Referring to FIG. 7, when the protocol control daemon 9 of NCS 1230 writes received data in a receipt buffer 97 in a shared memory 99 (step S21), the protocol control daemon 9 shifts a write pointer by the amount of received data (step S22). The protocol control daemon 9 informs the application 1230 that the data have been written in the receipt buffer (step S23). Through the report, a start pointer at which the writing is started and an end pointer at which the writing is ended are reported.

In response to receipt of the notice from the protocol control daemon 9, the application 1230 reads the received data from the shared memory 99 (step S24) and shifts the read pointer by the amount of the received data (step S25). Then, the application 1230 informs the protocol control daemon 9 that the received data have been read from the receipt buffer (step S26).

A description is given of a case where data are transmitted from the application 1230 to the network 15. When the application 1230 writes transmitted data in a transmission buffer 98 in the shared memory 99 (step S27), the application 1230 shifts the write pointer by the amount of the transmitted data (step S27-2). The application 1230 informs the protocol control daemon 9 that the transmitted data have been written in the transmission buffer (step S28). Through this report, a start pointer at which the writing is started and an end pointer at which the writing is ended are reported.

In response to receipt of the report from the application 1230, the protocol control daemon 9 reads the transmitted data from the shared memory 99 and transmits the read data to the connection destination (step S29). Then, the protocol control daemon 9 shifts the read pointer (step S30). The protocol control daemon 9 informs the application 1230 that the data have been read from the transmission buffer (step S30-2).

In description with reference to FIG. 7, for convenience, the reading is performed after received data have been written. However, the reading and the writing may be performed simultaneously. The writing and the reading of transmitted data may be also similarly performed.

Figure 8:
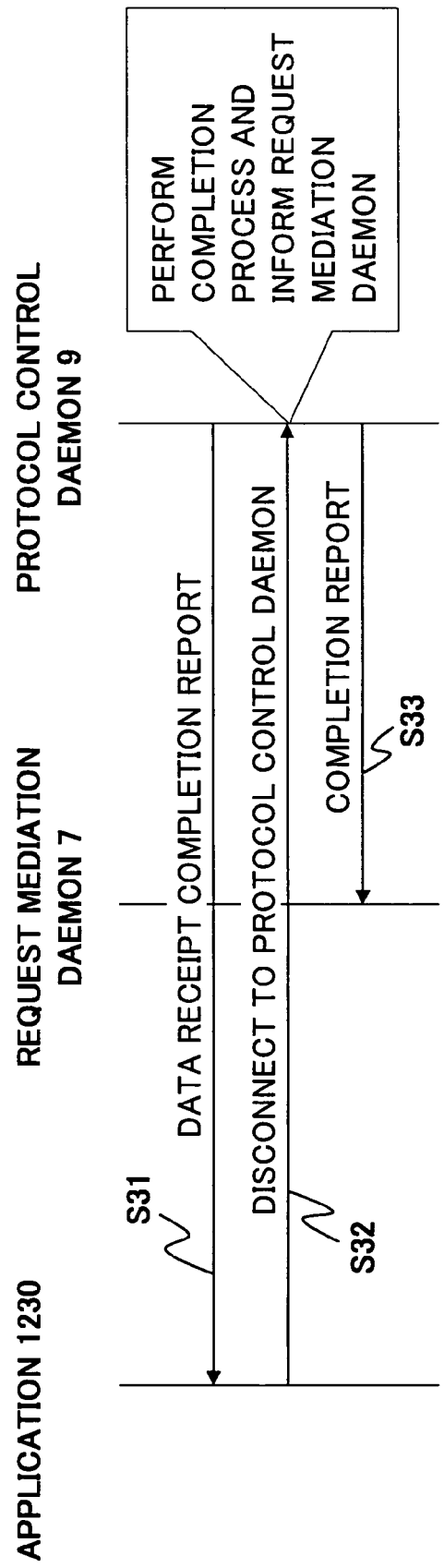
FIG. 8 is a diagram illustrating a disconnection sequence to disconnect an application.

FIG. 8 is a diagram illustrating a disconnection sequence to disconnect an application. Referring to FIG. 8, the protocol control daemon 9 informs the application 1230 that data have been received (step S31). This notice is provided, for example, when the network is disconnected. In response to receipt of the notice, the application 1230 determines the current status as a disconnection status and requests the protocol control daemon 9 to break the connection with the daemon that has received the data (step S32). The protocol control daemon 9 performs a termination process and reports the termination to the request mediation daemon 7 (step S33).

In this fashion, it is possible to exclusively access the shared memory 99 from a plurality of processes through mutual communication of information on writing and reading of data between the application 1230 and the protocol control daemon 9.

In this fashion, according to the present invention, by controlling transmission and receipt of print data and image data between devices connected via various interfaces, the protocol control daemon 9 of the multifunctional product 1200 can be configured to use the request mediation daemon 7 and the shared memory to mediate connection between various communication protocols and a plurality of applications for different types of image processing to control data transmission and receipt. As a result, interfaces of the communication protocols and the individual applications do not have to be considered each other. Thus, it is possible to easily add a communication protocol and an application to the multifunctional product 1200.

As described in the first embodiment, according to the present invention, since a mediation processing part to mediate between various communication protocols and a plurality of applications to perform distinct image formation processes is provided in an image forming apparatus by controlling transmission and receipt of print data and image data between devices connected via various interfaces, the interfaces of the communication protocols and the individual applications do not have to be considered each other. As a result, it is possible to easily add a communication protocol and an application to an image forming apparatus according to the present invention.

In the present invention, connection request mediation means for mediating connection between various communication protocols and applications to execute operations related to image formation can be configured to have registration means for, in response to a registration request from an application, registering the application and buffer registration means for, in response to a registration request of a transmission and receipt buffet from the application, registering a receipt buffer and a transmission buffer specific to the application to make the receipt buffer and the transmission buffer available.

Also, the connection request mediation means can be configured to have transmission and receipt buffer allocation means for, in response to receipt of a connection notice from the communication protocol daemons, allocating a receipt buffer and a transmission buffer, which are used during connection, in the shared memory and informing the communication protocol daemon.

In addition, the application 1230 can be configured to have connection process means for, in response to receipt of a connection notice from the connection request mediation means, reporting connection permission to the connection request mediation means and establishing connection with the communication protocol daemon and data receipt start request means for requesting the communication protocol daemon to start data receipt.

In addition, each communication protocol daemon can be configured to have received data write means for writing data received by the communication protocol daemon in the receipt buffer allocated by the transmission and receipt buffer allocation means and shifting the write start position by the length of the data and receipt write report means for informing the application that the received data have been written in the receipt buffer and reporting writing of the received data in designated write start position and write end position.

In addition, the application 1230 can be configured to have received data read means for, in response to receipt of a write notice of the received data from the communication protocol daemon, reading the received data from a range between the write start position and the write end position, which are designated in the write notice, in the receipt buffer and shifting the read start position to the write end position and receipt read report means for informing the communication protocol daemon that the received data have been read from the receipt buffer.

In addition, the application 1230 can be configured to have transmitted data write means for writing transmitted data in the transmission buffer registered by the buffer registration means and shifting the write start position by the length of the data and transmission write report means for informing the communication protocol daemon that the transmitted data have been written in the transmission buffer and reporting that the transmitted data have been written in designated write start position and write end position.

In addition, each communication protocol daemon can be configured to have transmitted data read means for, in response to receipt of a write notice to write the transmitted data from the application, reading the transmitted data from a range between the write start position and the write end position, which are designated in the write notice, in the transmission buffer and causing the communication protocol daemon connected to the application to transmit the transmitted data, start read position shift means for shifting the read start position to the write end position and transmission read report means for informing the application that the transmitted data have been read from the transmission buffer.

Second Embodiment

The multifunctional product 1200 according to a second embodiment of the present invention has the same functional structure and hardware configuration as those of the multifunctional product 1200 according to the first embodiment, and the description thereof is omitted.

In addition to the functional structure and hardware configuration according to the first embodiment, furthermore, since operations on data transmission and receipt between NCS 1228 and the application 1230 are unified as a sequence control library and similar processes are performed for implementation of Web service functions, a method of modularizing and unifying such similar processes can be considered.

Figure 9:
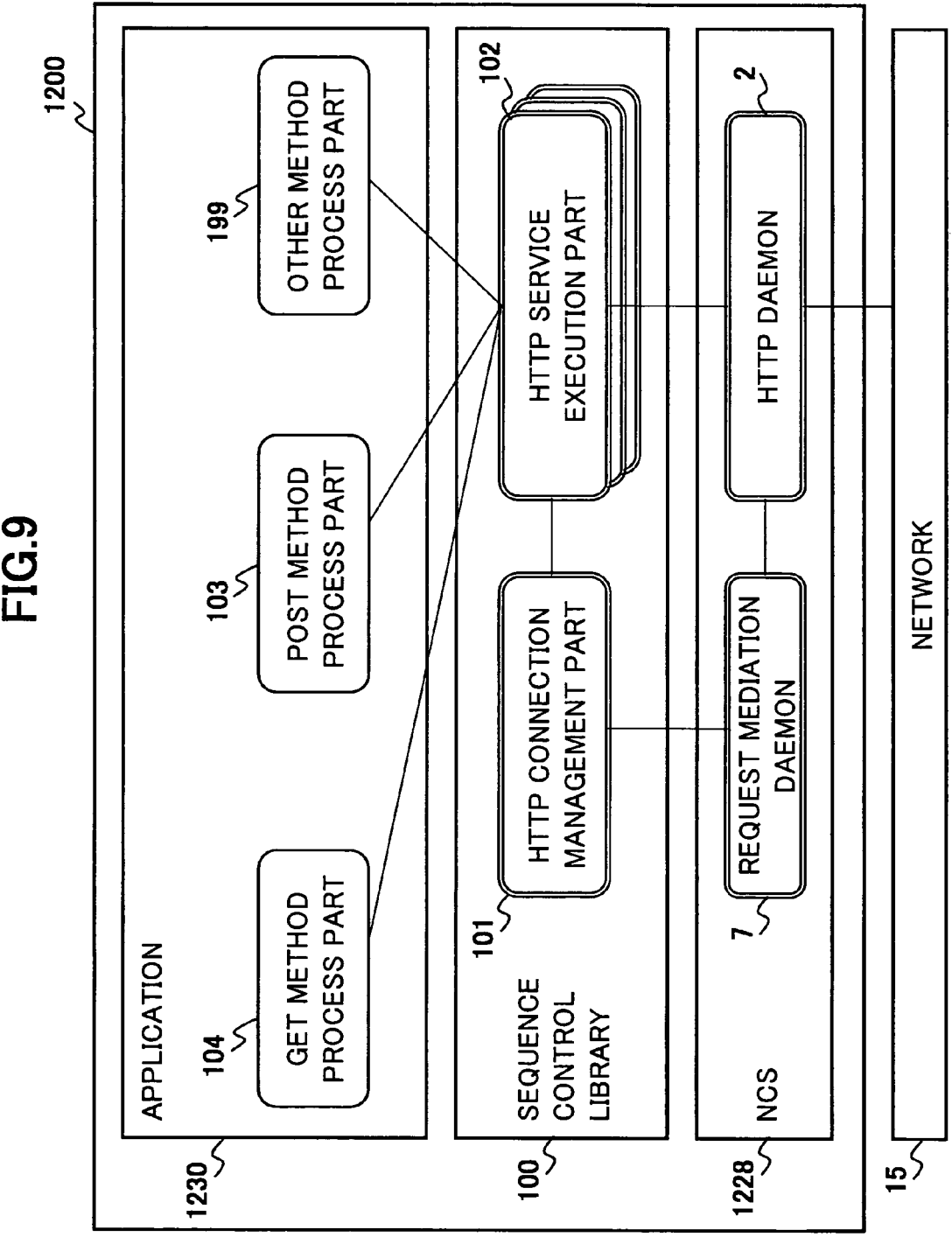
FIG. 9 is a diagram illustrating an exemplary fundamental structure of a multifunctional product that can develop and add an application easily.

A description is given, with reference to FIG. 9, of a fundamental structure of the multifunctional product 1200 in the case where such similar processes are unified as a sequence control library. FIG. 9 is a diagram illustrating an exemplary fundamental structure of a multifunctional product whereby an application can be developed and added easily. In FIG. 9, only main functional components of the multifunctional product 1200 are illustrated, and the description of the other functional components is omitted. Referring to FIG. 9, the application 1230 and NCS 1228 communicate received data and transmitted data to each other via a sequence control library 100 as an intermediate layer. Here, a case where an HTTP daemon 2 controls the communication is described. The sequence control library 100 is used also in cases where other daemons control the communication.

The application 1230 has a process part for each method to designate a data transmission manner. For example, the application 1230 has a POST method process part 103 operating in POST method, a GET method process part 104 operating in GET method, and other method process part 199 operating in a method other than the POST method and the GET method. Each of the process parts 103, 104 and 199 not only performs an analysis process specific to respective methods but also executes an operation in accordance with a process request and provides the process result as a Web service.

The sequence control library 100 has an HTTP connection management part 101 to manage connection in accordance with HTTP and an HTTP service execution part 102 to execute a service by transmitting and receiving data in accordance with HTTP.

Since connection is established for each request of an HTTP service, a plurality of the HTTP execution parts 102 are generated as threads (or processes). The HTTP service execution part 102 distributes processes to the GET method process part 104, the POST method process part 103 and the other method process part 199 in accordance with a method to designate data transmission manner designated in an HTTP header.

NCS 1228 has an HTTP daemon 2 to control communication for data transmission and receipt via the network 15 in accordance with HTTP and a request mediation daemon 7, in response to a connection or disconnection notice from the HTTP daemon 2, to establish and break connection with the HTTP connection management part 101.

In response to receipt of the first connection notice from the request mediation daemon 7, the HTTP connection management part 101 initializes the shared memory 99 and registers a connectable number of the receipt buffers 97 and the transmission buffers 98 so that data can be transmitted and received. Also, this initialization allows a plurality of connection requests to be accepted. For each connection, the HTTP service execution part 102 is generated as a thread. Then, an HTTP service can be provided for each connection.

For example, it is supposed that the HTTP daemon 2 can accept at most three connection requests simultaneously. In this case, it is possible to improve the process performance in all time presence of three threads. On the other hand, one thread may be generated for each connection, and the thread may be terminated at time of the process completion.

Each of the process parts 103, 104 and 199 of the application 1230 does not communicate data with the HTTP daemon 2 and the request mediation daemon 7 directly. Each process part, in response to receipt of a process request from the HTTP service execution part 102, reports the process result to the HTTP service execution part 102 via the shared buffer 99.

Each of the process parts 103, 104 and 199, for example, after receipt of a process request from the HTTP service execution part 102, reads print data to be processed (MB-order data) from the shared buffer 99, writes the execution result of the process corresponding to the process request on the print data in the shared buffer 99, provides the process result as a Web service to the request source via the HTTP service execution part 102. The process result is image data (MB-order data) generated by performing an image formation operation on the print data or status information indicative of a status on the image formation operation, for example.

Thus, each of the process parts 103, 104 and 199 of the application 1230 has only to be a process part to which the HTTP service execution part 102 can distribute process requests.

Similarly, it is also possible to easily add various applications, that is, to add a process part corresponding to a method to the multifunctional product 1200.

The exemplary fundamental structure that can easily add a process part for each method to provide a Web service has been described with reference to FIG. 9. In such a method-by-method process part, however, if different Web services are provided in one method, a process specific to the method necessary prior to execution of a process to provide a Web service has to be provided for each Web service. It is considered to unify such processes specific to a method.

Figure 10:
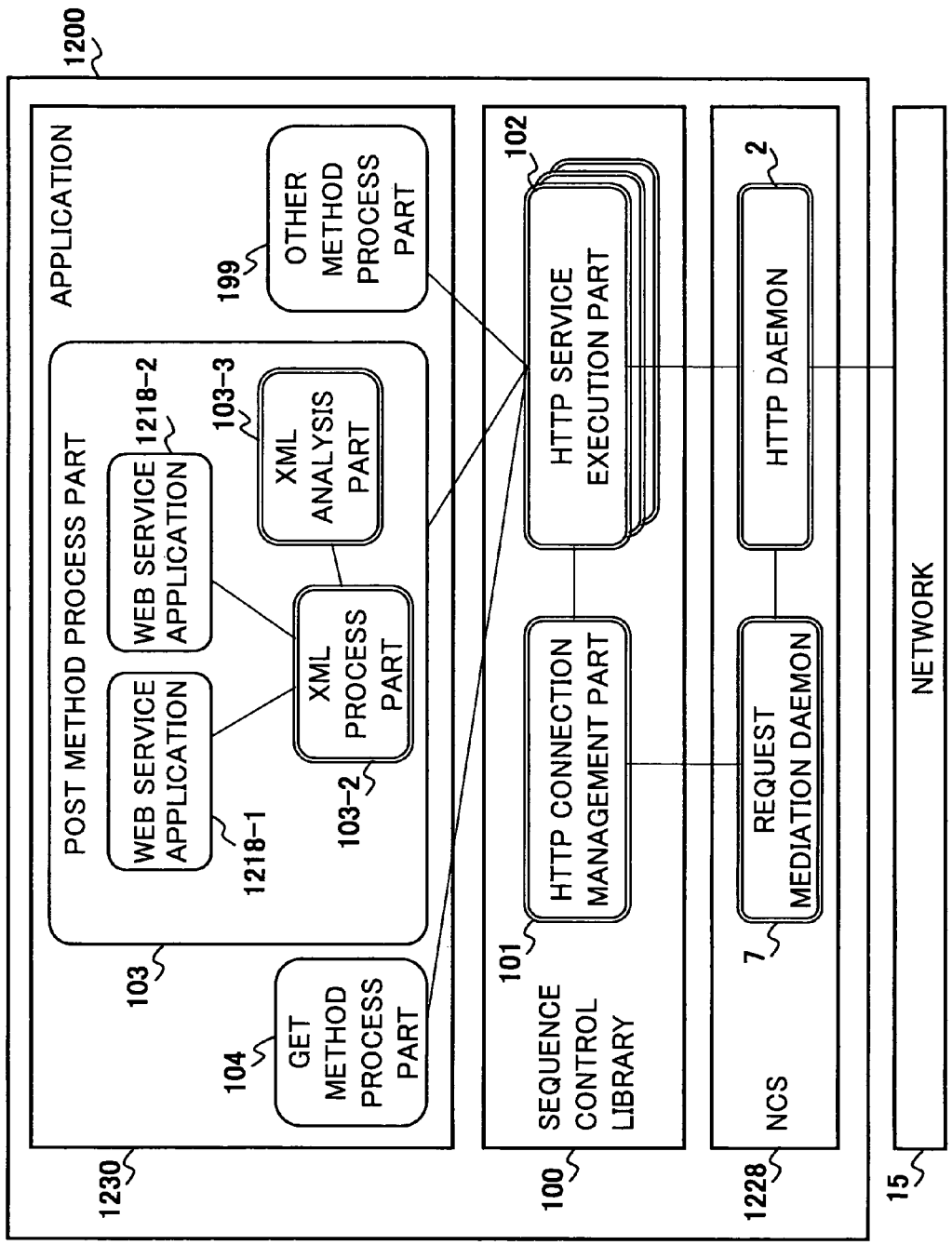
FIG. 10 is a diagram illustrating a first exemplary structure of a multifunctional product that can develop and add an application easily.

A description is given, with reference to FIG. 10, of a case where processes on data transmission and receipt between NCS 1228 and the application 1230 are unified as a sequence control library and further processes specific to each method are unified. In addition, the process flow is described in detail with reference to FIG. 11 and FIG. 12.

FIG. 10 is a diagram illustrating a first exemplary structure of a multifunctional product that can make the development and addition of an application easy. In FIG. 10, only main functional components of the multifunctional product shown in FIG. 1 are illustrated, and the other functional components are omitted. In FIG. 10, the same process parts as those in FIG. 9 are designated by the same reference numerals, and the description thereof is omitted.

The fundamental structure shown in FIG. 10 differs from that shown in FIG. 9 in that in the POST method process part 103 of the application 1230, Web service applications 1218-1 and 1218-2 share an XML process part 103-2 to analyze XML messages specific to the POST method and generate messages in accordance with XML and an XML analysis part 103-3 having parts required to analyze and generate XML.

When the HTTP service execution part 102 distributes a process to the POST method process part 103, the POST method process part 103, in a case where a process request is described in an XML message, causes the XML process part 103-2 to uniformly analyze the XML message and describe a response from the Web service applications 1218-1 and 1218-2, which actually perform a process corresponding to the request as a Web service, in form of an XML message. The XML process part 103-2 operates the XML analysis part 103-3 as needed and analyzes and generates XML messages.

In the first exemplary structure, since each of the Web service applications 1218-1 and 1218-2 does not have to analyze and generate any XML message, developers have to develop only a process part to actually provide a Web service in the POST method. As a result, it is possible to easily add a new Web service application to the multifunctional product 1200.

Figure 11:
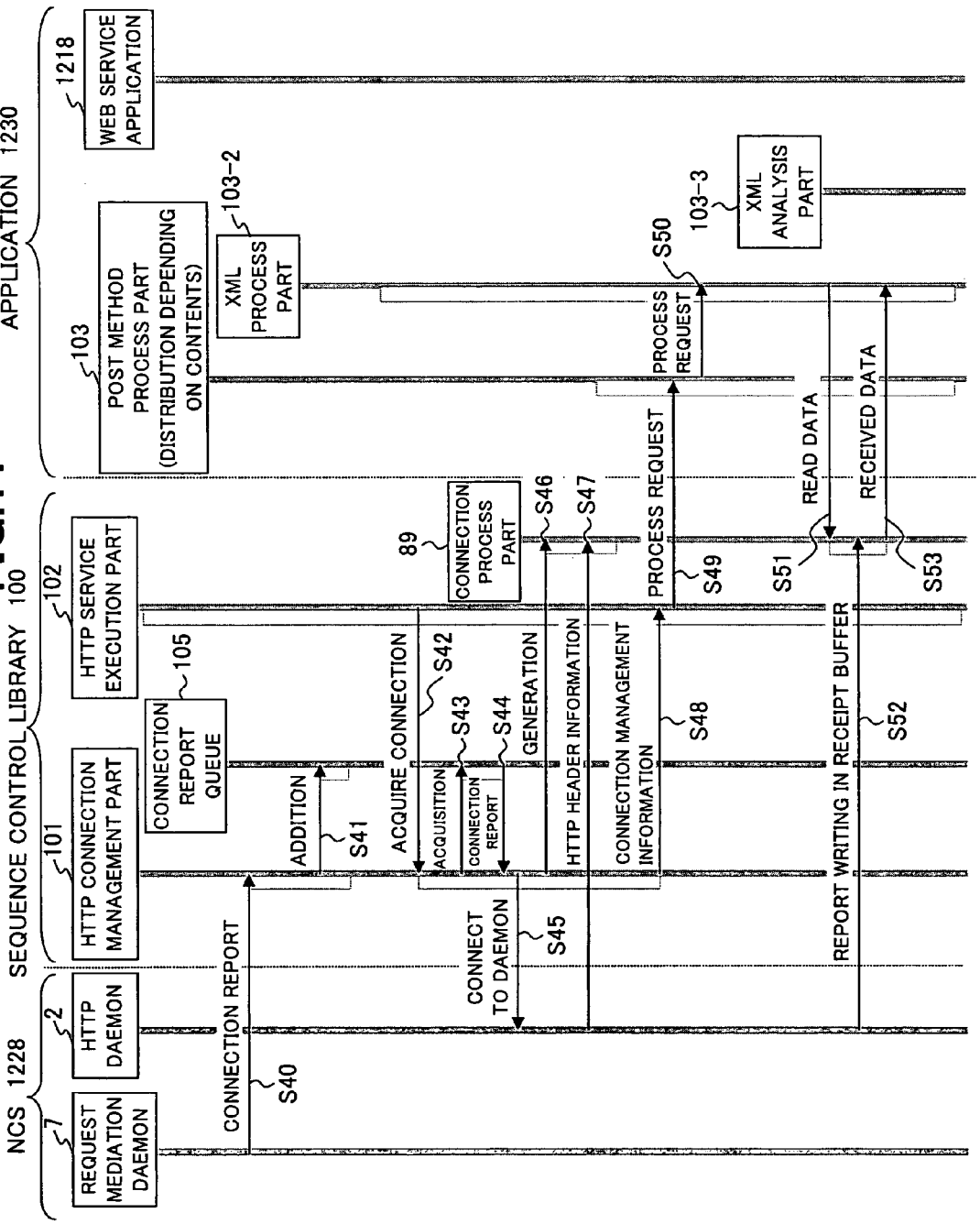
FIG. 11 is a diagram illustrating a process flow of the first exemplary structure of FIG. 10.
Figure 12:
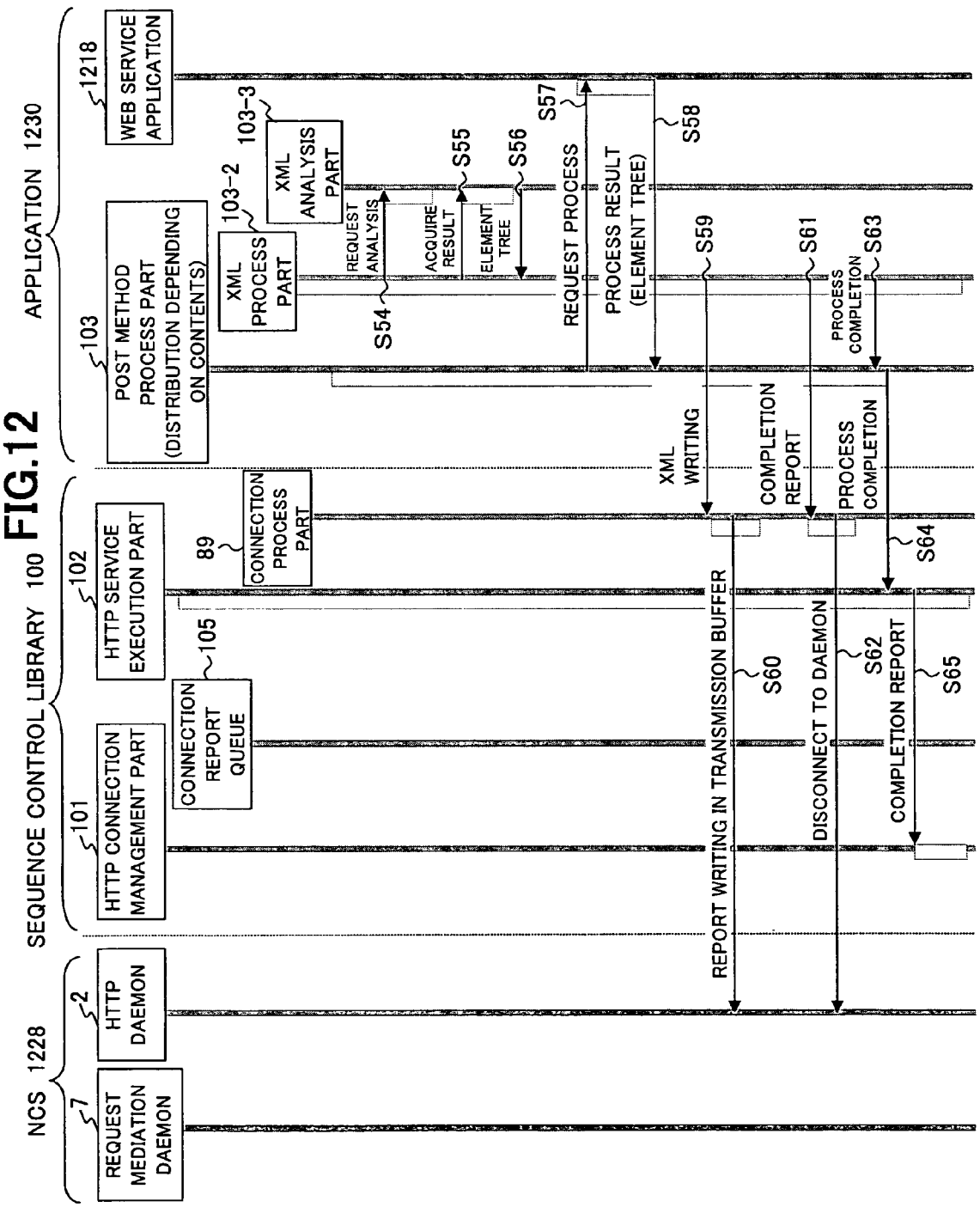
FIG. 12 is a diagram illustrating a process flow of the first exemplary structure of FIG. 10.

A description is given, with reference to FIG. 11 and FIG. 12, of a process flow between execution of the Web service application 1218 as a Web service and notification of the process result to the HTTP daemon 2 in the first exemplary structure shown in FIG. 10. FIG. 11 and FIG. 12 are diagrams illustrating a process flow in the first exemplary structure shown in FIG. 10. Referring to FIG. 11, when the request mediation daemon 7 reports a connection notice to the HTTP connection management part 101 (step S40), the HTTP connection management part 101 adds the notice to a connection notice queue 105 (step S41). The HTTP service execution part 102 requests the HTTP connection management part 101 to acquire connection (step S42). In response to the request, the HTTP connection management part 101 requests the connection notice queue 105 to acquire the notice (step S43) and acquires a connection notice from the connection notice queue 105 (step S44).

Based on the connection notice acquired from the connection notice queue 105, the HTTP connection management part 101 establishes connection with the HTTP daemon 2. Also, the HTTP connection management part 101 generates connection management information and stores the connection management information in a connection process part 89 (step S46). The connection process part 89 is a part of processes performed in the HTTP service execution part 102. On the other hand, in response to connection from the HTTP connection management part 101, the HTTP daemon 2 stores HTTP header information in the connection process part 89 (step S47).

The HTTP connection management part 101 informs the HTTP service execution part 102 of the connection management information (step S48). If the connection management information designates the POST method, the HTTP service execution part 102 requests the POST method process part 103 to perform a process (step S49). The POST method process part 103, if "text/xml" is designated as "Content-Type", requests the XML process part 103-2 to analyze an XML message (step S50).

The XML process part 103-2 requests the connection process part 89 to read data (step S51). The HTTP daemon 2 informs the connection process part 89 that received data have been written in the receipt buffer 97 (step S52). The connection process part 89 reports the received data to the XML process part 103-2 (step S53).

The XML process part 103-2 requests the XML analysis part 103-3 to analyze an XML message portion of the received data (step S54). Then, when the XML process part 103-2 requests the XML analysis part 103-3 to acquire the result, the XML analysis part 103-3 informs the XML process part 103-2 of an element tree as the result of syntax analysis on the XML message (step S56).

The XML process part 103-2 requests the Web service application 1218 to perform a process corresponding to the element tree reported from the XML analysis part 103-3 (step S57). Depending on the request, the Web service application 1218 executes the process and informs the XML process part 103-2 of the process result by using an element tree (step S58).

Based on the reported element tree, the XML process part 103-2 generates an XML message by writing the process result of the Web service application 1218 in the connection management part 87 in accordance with XML (step S59). Then, the connection process part 89 writes the XML message in the transmission buffer 98 and informs the HTTP daemon 2 that the message has been written in the transmission buffer 98 (step S60).

Also, the XML process part 103-2 provides a termination notice to the connection process part 89 (step S61). In response to the termination notice, the connection process part 89 disconnects to the HTTP daemon 2 (step S62). Furthermore, the XML process part 103-2 informs the connection process part 89 that the process has been completed (step S63). The connection process part 89 informs the HTTP service execution part 102 that the process has been completed (step S64). Then, the HTTP service execution part 102 informs the HTTP connection management part 101 that the process has been completed (step S65).

In the above-mentioned process flow, the Web service application 1218 performs the process mutually with only the XML process part 103-2 at steps S57 and S58. In this fashion, it is possible to make the development of a Web service application in accordance with new POST method by using the sequence control library 100 and the process part modularized and unified process part composed of the XML process part 103-2 and the XML analysis part 103-3 in the POST method process part 103 of the application 1230.

Figure 13:
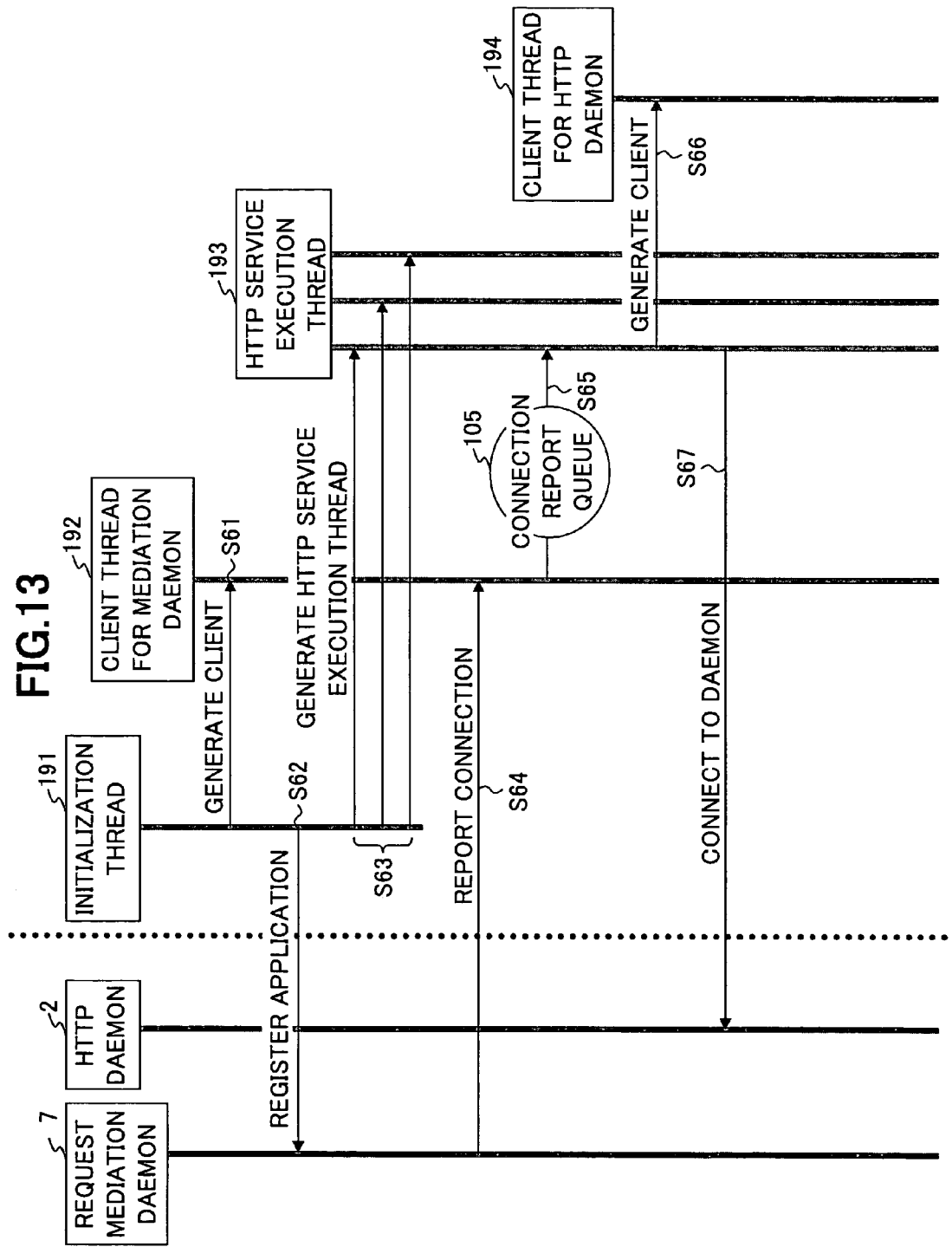
FIG. 13 is a diagram illustrating an exemplary thread structure of a sequence control library.
Figure 14:
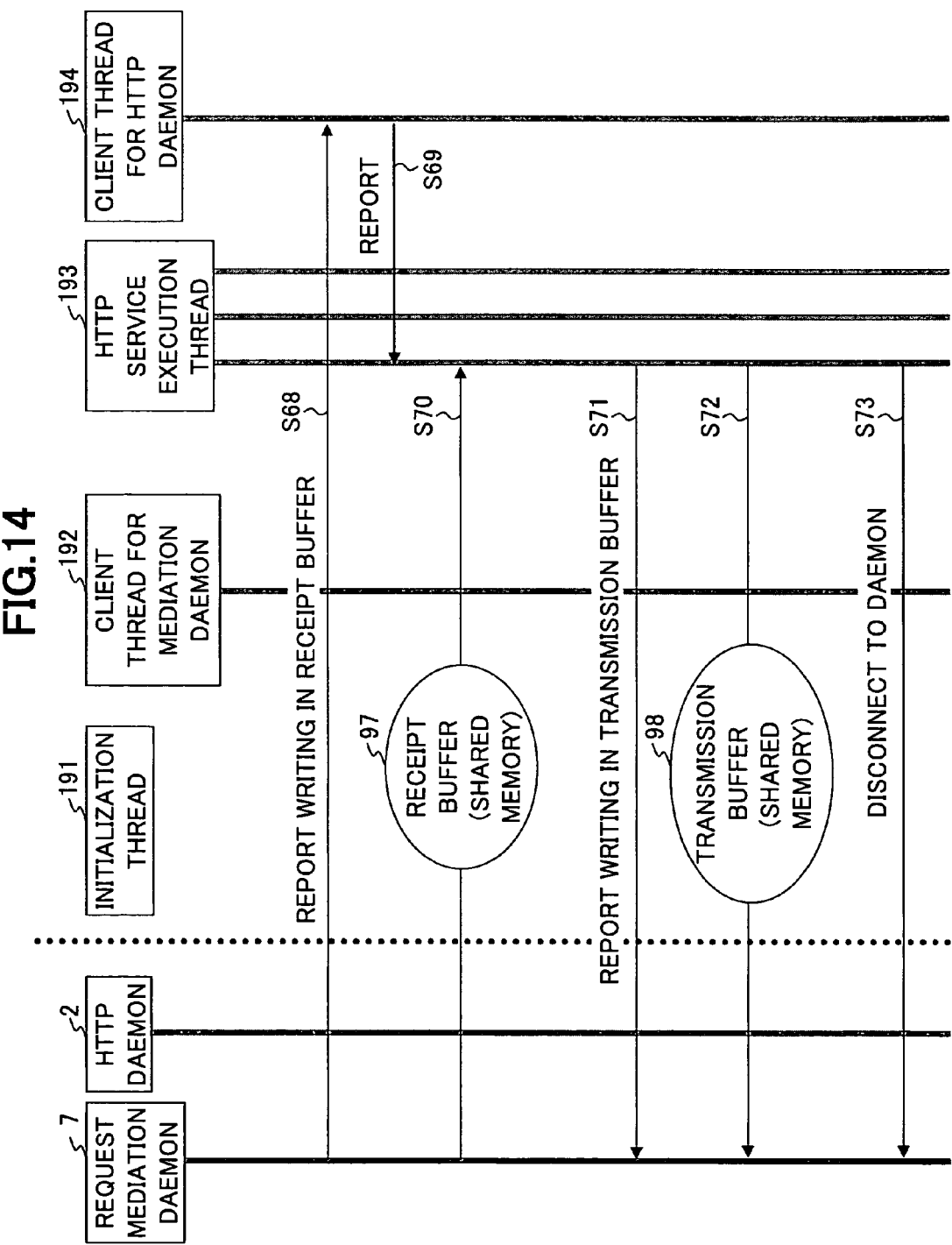
FIG. 14 is a diagram illustrating an exemplary thread structure of a sequence control library.

A further description is given, with reference to FIG. 13 and FIG. 14, of a thread structure generated by a sequence control library that implements communication of transmitted and received data using the shared memory 99. FIG. 13 and FIG. 14 are diagrams illustrating an exemplary thread of a sequence control library.

Referring to FIG. 13, an initialization thread 191, which is generated in response to activation of the multifunctional product 1200, generates a mediation daemon client thread 192 (step S61). The mediation daemon client thread 192 is a process unit of the HTTP connection management part 101 and works as the HTTP connection management part 101. Then, the initialization thread 191 registers an application in the request mediation daemon 7 (step S62). In addition, the initialization thread 191 generates at least one HTTP service execution thread 193 (step S63). The HTTP service execution thread 193 is a unit of the HTTP service execution part 102 and works as the HTTP service execution part 102.

In response to a connection notice from the request mediation daemon 7 (step S64), the mediation daemon client thread 192 adds the connection notice to the connection notice queue 105 and reports connection to one of the HTTP service execution threads 193 (step S65). In response to receipt of the connection notice, the HTTP service execution thread 193 generates an HTTP daemon client thread 194 (step S66). The HTTP service execution thread 193 is connected to the HTTP daemon 2 (step S67).

The request mediation daemon 7 informs the HTTP daemon client thread 194 that received data have been written in the receipt buffer 97 (step S68). Then, the HTTP daemon client thread 194 informs the HTTP service execution thread 193 that the received data have been written (step S69). The HTTP service execution thread 193 reads the received data, which have been written by the request mediation daemon 7, from the receipt buffer 97 (step S70).

The HTTP service execution thread 193 writes transmitted data in the transmission buffer 98 and provides a write notice in the transmission buffer to the request mediation daemon 7 (step S71). The request mediation daemon 7 fetches the transmitted data from the transmission buffer 98 (step S72). The HTTP service execution thread 193 breaks connection with the request mediation daemon 7 (step S73).

Through the thread process in the sequence control library 100, a large amount of data can be accessed by using the shared memory 99. In addition, the thread process can be realized as a process separate from the Web service application 1218 actually executing a Web service function implemented in the application 1230. Also, the above description holds for a Web service application actually executing a Web service function in the GET method process part 104 and the other method process part 199 shown in FIG. 10. As a result, developers of a Web service function can develop a Web service function without knowledge on the process flow of data transmission and receipt between NCS 1228 and the application 1230.

Figure 15:
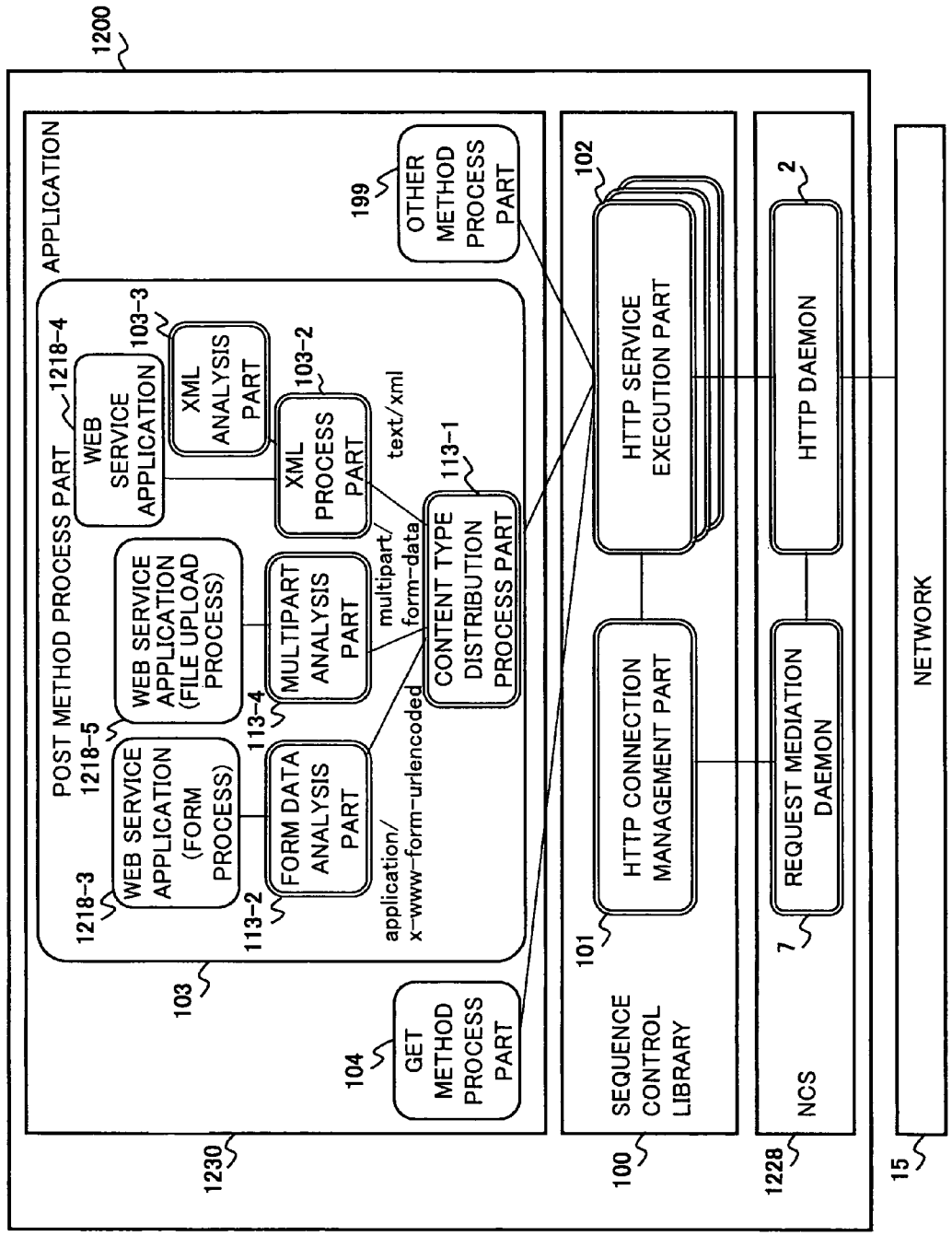
FIG. 15 is a diagram illustrating a second exemplary structure of a multifunctional product that can develop and add an application easily.

In the first exemplary structure shown in FIG. 10, the case where XML messages are used for process requests and responses in accordance with the POST method has been described. However, the POST method includes various process types depending on content types. A description is given, with reference to FIG. 15, of a case where process parts are integrated for each process type in the POST method. FIG. 15 is a diagram illustrating the second exemplary structure of a multifunctional product that makes the development and addition of an application easy. In FIG. 15, the same process parts as those in FIG. 10 are designated by the same reference numerals, and the description thereof is omitted.

Referring to FIG. 15, the POST method process part 103 has, in addition to the process parts 103-2, 103-3 and 1218-4 corresponding to the process parts 103-2, 103-3 and 1218-1 and 1218-2, respectively, as unified process parts, a content type distribution process part 113-1 to distribute processes based on content types, a FORM data analysis part 113-2 to analyze such a process request that FORM is designated in the content type, and a multipart analysis part 113-4 to analyze such a process request that a multipart is designated in the content type. In addition, the POST method process part 103 has as process parts to provide a Web service a Web service application 1218-3 to actually process data set in FORM and a Web service application 1218-5 to perform a process to upload a data file designated by the multipart.

The content type distribution process part 113-1, if "application/x-www-form-urlencoded" is designated as the content type, assigns a process request to the FORM data analysis part 113-2. Also, the content type distribution process part 113-1, if "multipart/form-data" is designated as the content type, assigns a process request to the multipart analysis part 113-4. Also, the content type distribution process part 113-1, if "text/xml" is designated as the content type, assigns a process request to the XML process part 103-2.

In response to receipt of process requests, the FORM data analysis part 113-2, the multipart analysis part 113-4 and the XML process part 103-2 perform respective analysis processes and then cause the Web service applications 1218-3, 1218-5 and 1218-4 to perform processes corresponding to the process requests.

In this fashion, by sharing predefined analysis processes corresponding to content types handled in the POST-method, a developer can develop a new Web service application 1218 without knowledge on the predefined analysis processes and also easily adds such a new Web service application 1218 to the multifunctional product 1200.

Figure 16:
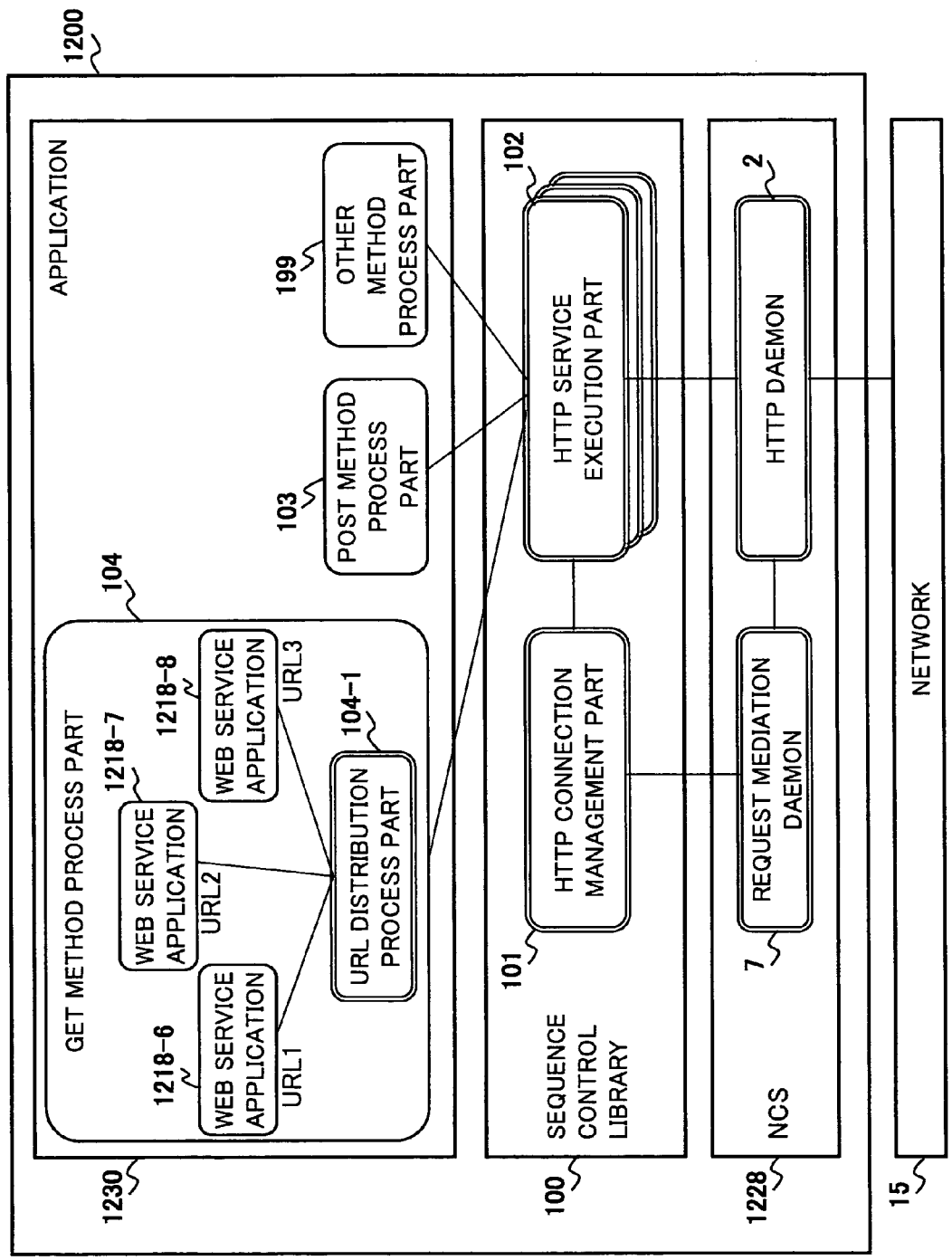
FIG. 16 is a diagram illustrating a third exemplary structure of a multifunctional product that can develop and add an application easily.

A description is given, with reference to FIG. 16, of a structure to share processes specific to the GET method in the GET method process part 104. FIG. 16 is a diagram illustrating the third exemplary structure of a multifunctional product that makes the development and addition of an application easy. In FIG. 16, the same process parts as those in FIG. 9 are designated by the same reference numerals, and the description thereof is omitted.

Referring to FIG. 16, the GET method process part 104 has a URL distribution process part 104-1 to distribute process requests based on URLs (Uniform Resource Locator) to identify Web services as a unified process part and a plurality of Web service applications 1218-6 through 1218-8 corresponding to the URLs as process parts to provide Web services.

In this fashion, by sharing predefined analysis processes of URLs handled in the GET method, a developer can develop a new Web service application without knowledge on the predefined analysis processes of URLs and also easily add such a new Web service application to the multifunctional product 1200.

In addition, when the multifunctional product 1200 is configured to have the POST method process part 103 as shown in FIG. 15 and the GET method process part 104 as illustrated in FIG. 16, it is possible to easily develop and add a Web service application 1218 even in either of the POST method and the GET method.

According to the present invention, the multifunctional product 1200 can be configured to modularize process parts necessary to provide Web services and share the process parts in a plurality of applications. As a result, since similar functions necessary to provide Web services are collectively modularized and the modularized functions (process parts) can be reused by implementation applications, it is possible to easily develop an application and add the application to the multifunctional product 1200.

As mentioned in the second embodiment, according to the present invention, since an image forming apparatus has such a structure that process parts necessary to provide Web services are modularized and the modularized process parts are shared in a plurality of applications, it is possible to provide the image forming apparatus whereby an application to provide a Web service can be easily developed.

In the present invention, connection process means for generating the connection management information and performing a connection process, in response to receipt of a process notice from the method process part to which the process request is assigned, can be configured to break connection with the Web communication protocol daemon.

Also, the connection process means inform the Web service execution means that a process corresponding to the process request has been completed and can be configured to report the process completion to the Web connection management means.

In addition, a program can be configured to have a method process step of processing a plurality of methods to perform predefined processes in accordance with methods and a Web service execution step of, in response to a process request, executing Web services by distributing the process request to the method process step corresponding to the method designated by the process request.

Third Embodiment

Figure 17:
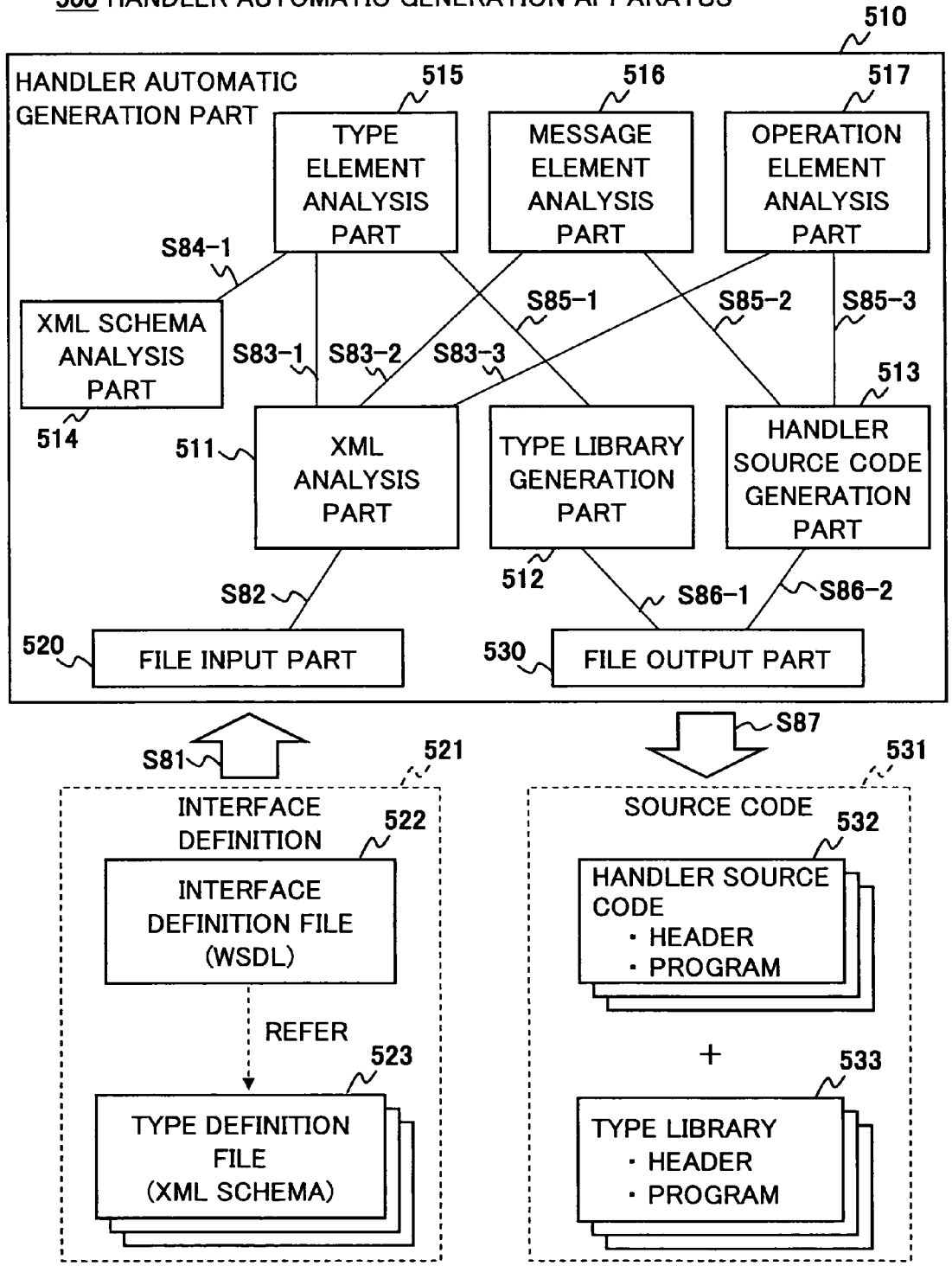
FIG. 17 is a block diagram illustrating a functional structure of a handler automatic generation apparatus according to one embodiment of the present invention.

A handler automatic generation apparatus according to one embodiment of the present invention has a functional structure as illustrated in FIG. 17. FIG. 17 is a block diagram illustrating a functional structure of a handler automatic generation apparatus according to one embodiment of the present invention. Referring to FIG. 17, a handler automatic generation apparatus 500, which is a computer device, has a recording medium (for example, a hard disk drive (HDD)) for storing a handler automatic generation part 510 to generate a program for absorbing a difference between data format of a message and data format processable in a program language of a Web service function, an interface definition 521 in accordance with WSDL (Web Service Description Language), and a source code 531 required to execute a handler.

The handler automatic generation part 510 is a process part to input the interface definition 521 in accordance with WSDL (Web Service Description Language), generate an element tree through analysis of the syntax of a request message described in XML (extensible Markup Language), set an argument for function call of a Web service function (WSF) based on the element tree, and generate and output a source code of the handler process part to generate an element tree to describe an XML response message including a return value from the Web service function.

The handler automatic generation part 510 has an XML analysis part 511, a type library generation part 512, a handler source code generation part 513, an XML schema analysis part 514, a type element analysis part 515, a message element analysis part 516, an operation element analysis part 517, a file input part 520 to input the interface definition 521, and a file output part 530 to output the source code 531.

The interface definition 521 defines what interface makes it possible to provide a Web service. The interface definition 521 is configured from an interface definition file 522 in accordance with WSDL and a type definition file 523 fetched through import from the interface definition file 522. If the type definition file 523 is not fetched in the interface definition file 522 through import, the type definition file 523 does not exist.

The source code 531 is, for example, a C language source code. The source code 531 is configured from a handler source code 532 composed of a header file and a program file of the handler process part and a type library 533 referred to by the handler source code 532. The type library 533 is configured from a header file and a program file.

The file input part 520 supplies the interface definition 521 designated by a user to the handler automatic creation part 510 (step S81) and informs the XML analysis part 511 (step S82). The XML analysis part 511 generates an element tree through analysis on the XML syntax based on the interface definition 521 received from the file input part 520. Then, the XML analysis part 511 reports the element tree to the type element analysis part 515 (step S83-1), the message element analysis part 516 (step S83-2) and further the operation element analysis part 517 (step S83-3).

The type element analysis part 515, which is a process part to analyze a types element in an element tree for the purpose of generating a type library, detects a types element indicative of a type definition through analysis of an element tree and causes the XML schema analysis part 514 to analyze the detected types element (step S84-1). Then, the type element analysis part 515 informs the type library generation part 512 of the analysis result of the XML schema analysis part 514 (step S85-1).

The message element analysis part 516, which is a process part to analyze a message element in an element tree for the purpose of generating a handler source code, reports the analysis result to the handler source code generation part 513 (step S85-2). The operation element analysis part 517, which is a process part to analyze an operation element in an element tree for the purpose of generating a handler source code, reports the analysis result to the handler source code generation part 513 (step S85-3).

The type library generation part 512 is a process part to generate a type library based on the analysis result reported from the type element analysis part 515, and the generated type library is reported to the file output part 530 (step S86-1). The handler source code generation part 513 generates a source code based on the analysis result reported from the message element analysis part 516 and the operation element analysis part 517, and reports the generated source code to the file output part (step S86-2). The file output part 530 outputs the source code 531 by considering the source code reported from the handler source code generation part 513 as a handler source code 532 and the type library reported from the type library generation part 512 as the type library 533 (step S87).

In this fashion, the handler automatic generation apparatus 500, when the interface definition 521 to define a Web service is input, can automatically output the source code 531 of the handler process part.

Figure 18:
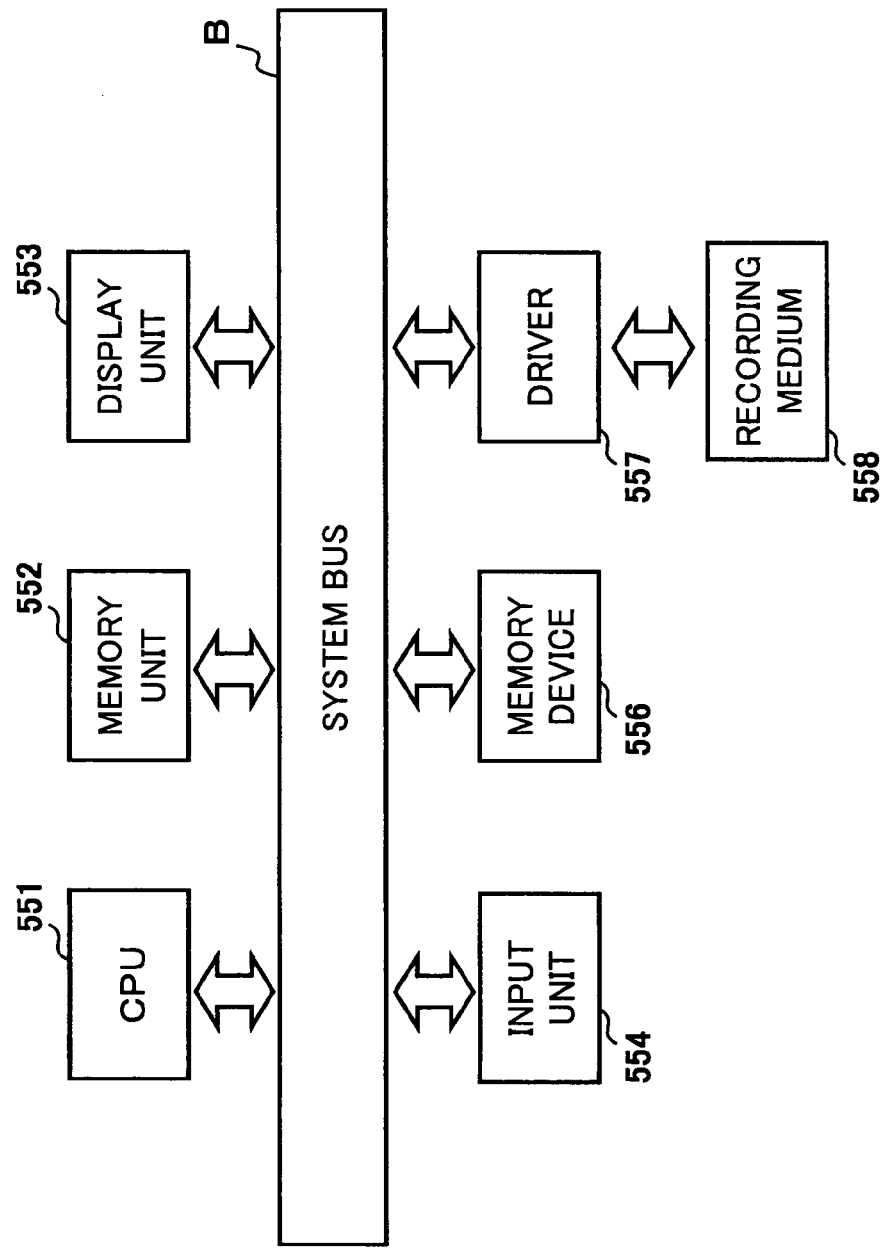
FIG. 18 is a block diagram illustrating a hardware structure of a handler automatic generation apparatus according to one embodiment of the present invention.

Such a handler automatic generation apparatus 500 has a hardware structure as illustrated in FIG. 18. FIG. 18 is a block diagram illustrating a hardware structure of a handler automatic generation apparatus according to one embodiment of the present invention.

Referring to FIG. 18, a handler automatic generation apparatus 500, which is an apparatus to execute the handler automatic generation part 510 under control of a computer, has a CPU (Central Processing Unit) 551, a memory unit 552, a display unit 553, an input unit 554, a storage device 556 and a driver 557, and is connected to a system bus B.

CPU 551 controls the handler automatic generation apparatus 500 in accordance with programs stored in the memory unit 552. The memory unit 552, which is configured as RAM, ROM and so on, stores programs executed by CPU 551, data necessary for processes in CPU 551, and data obtained in processes of CPU 551. In addition, a partial area of the memory unit 552 is allocated as a work area used for processes in CPU 551.

The display unit 553 displays various kinds of necessary information under control of CPU 551. The input unit 554, which includes a mouse, a keyboard and so on, is used to enable a user to input various kinds of information necessary for the handler automatic generation apparatus 500 to perform processes. The storage device 556, for example, which is configured in a hard disk unit, stores the interface definition 521 and the source code 531, which are illustrated in FIG. 17, and data required to generate the handler process part.

A program to implement an automatic generation process of the handler automatic generation part 510 in the handler automatic generation apparatus 500 is provided to the handler automatic generation apparatus 500, for example, through a recording medium 558 such as CD-ROM. Specifically, when the recording medium 558 having the program is set in the driver 557, the driver 557 reads the program from the recording medium 558, and the read program is installed in a recording device 556 via the system bus B. Then, in response to activation of the program, CPU 551 starts a process in accordance with the program installed in the recording device 556.

Here, such a medium for storing the program is not limited to CD-ROM, and may be any medium as long as the medium can be read by a computer.

Figure 19:
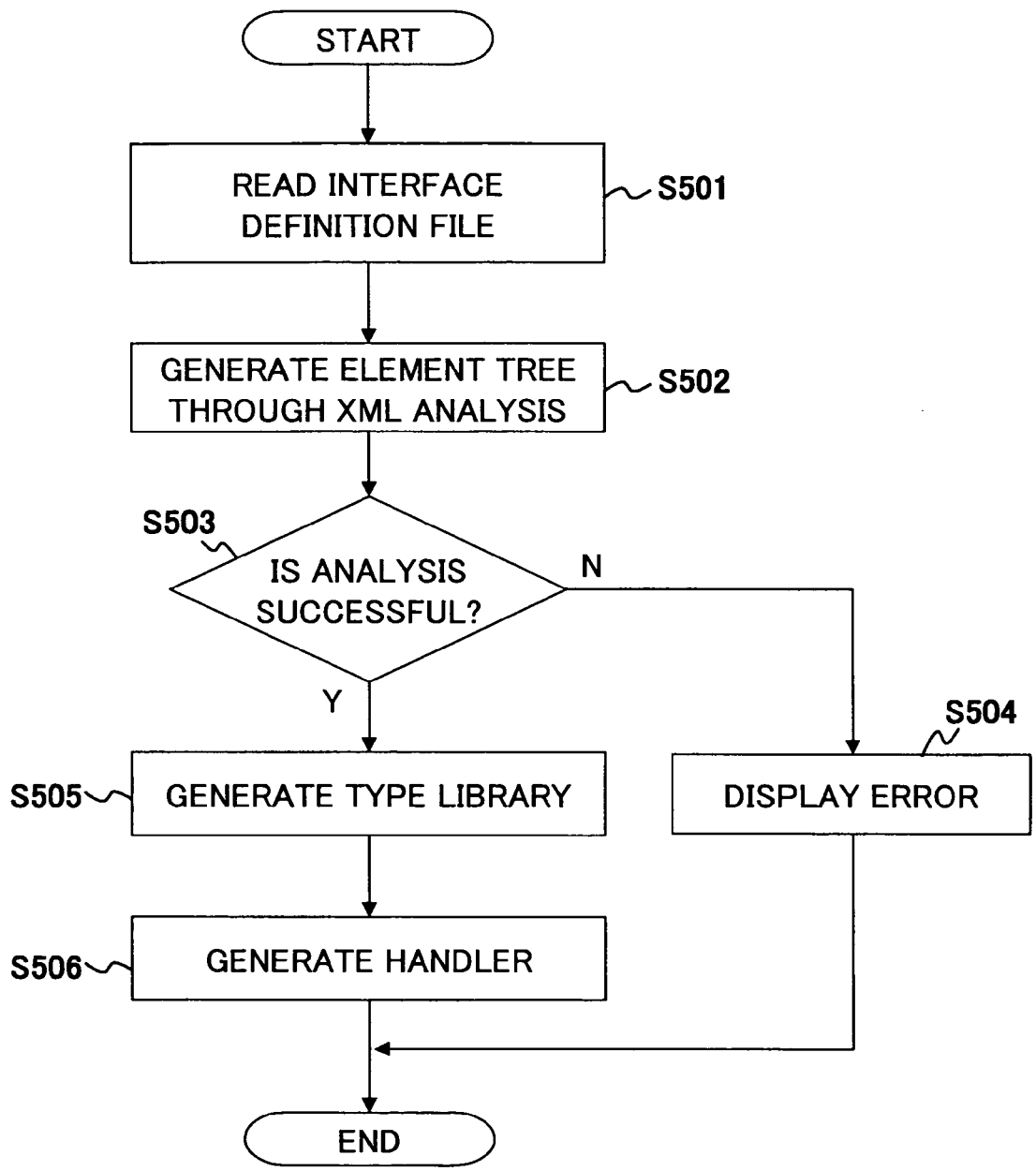
FIG. 19 is a flowchart to explain an outline of a handler automatic generation process.

A description is given of an outline of a handler automatic generation process executed by the handler automatic generation part 510. FIG. 19 is a flowchart to explain the outline of the handler automatic generation process. Referring to FIG. 19, the file input part 520 reads the interface definition file 521 (step S501), and the XML analysis part 511 generates an element tree through analysis of an XML description (step S502).

The handler automatic generation part 510 determines whether the analysis is successful (step S503). If the analysis fails, an error is displayed on the display unit 553 (step S504) and the handler generation process is terminated. If the analysis is successful, the type library generation part 512 generates a type library (step S505). Also, the handler source code generation part 513 generates a handler source code (step S506), and the handler generation process is terminated.

Figure 20:
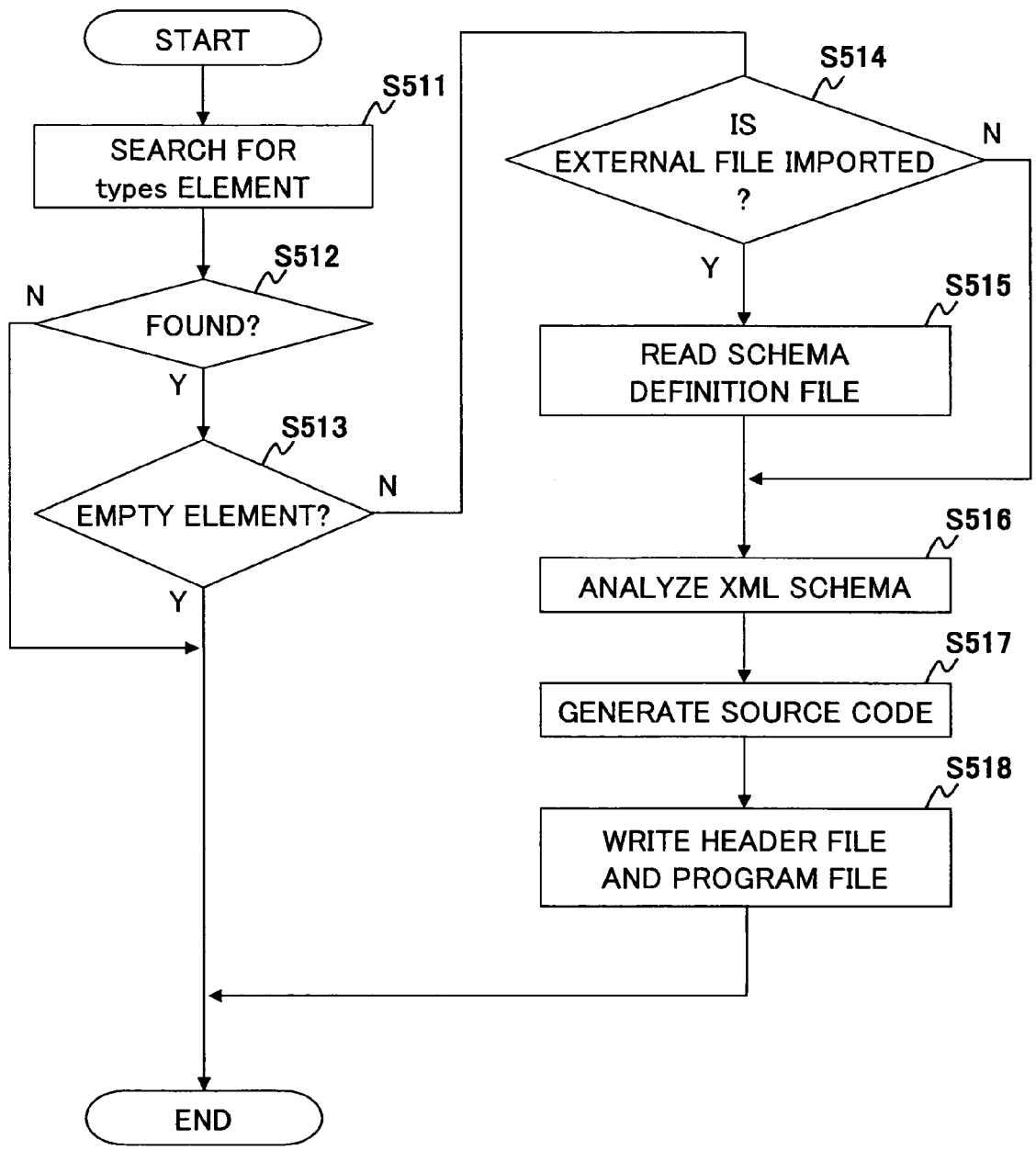
FIG. 20 is a flowchart to explain a type library generation process.

A detailed description is given of a type library generation process (step S505) performed by the type library generation part 512. FIG. 20 is a flowchart to explain a type library generation process. Referring to FIG. 20, the type element analysis part 515 detects a types element from an element tree reported from the XML analysis part 511 (step S511).

The type element analysis part 515 determines whether a types element has been detected (step S512). If no types element is detected, the type library generation process is terminated. On the other hand, if a types element is detected, it is determined whether the types element is an empty element (step S513). If the detected types element is an empty element, the type library generation process is terminated. On the other hand, if the detected types is not an empty element, it is determined whether an external file has been imported (step S514). In other words, it is determined whether the interface definition file 522 imports the type definition file 523 in FIG. 17. If no external file (type definition file 523) is imported, the process control proceeds to step S516. On the other hand, if an external file (type definition file 523) is imported, a schema definition file (type definition file 523) is read (step S515).

The XML schema analysis part 514 analyzes XML schema of the interface definition file 522 (step S516) and generates a source code (step S517). Then, the file output part 530 outputs a type library 533 having a header file and a program file.

A description is given, with reference to FIG. 21 through FIG. 27, of the source code generation process at step S517. First, a case where the data type in a types element is defined as an enumeration type is described. FIG. 21 is a diagram to explain an enumeration type definition generation process in the source code generation process.

Referring to FIG. 21, an XML schema 601 is an exemplary XML description of which data type is defined as an enumeration type. In a tag simpleType description 602, the XML schema 601 is defined as a simple data type having the name "SomeValueEnum". Furthermore, in a tag restriction description 603, a description 604 is limited such that the base type thereof is a string by "string" designated in base. In the description 604, for example, three values "VALUE1", "VALUE2" and "VALUE3" are listed as the string by an enumeration tag. In this case, it is defined that the data type of the name "SomeValueEnum" has the three strings.

A C code 701 is a C language source code generated from the XML schema 601 to define a data type in the enumeration type. In the C code 701, a description 702 defines that "_SomeValueEnum" belongs to the enumeration type based on the description 602, and a description 704 is generated based on the descriptions 603 and 604. A description 704, in which "SomeValueEnum_VALUE1", "SomeValueEnum_VALUE2" and "SomeValueEnum_VALUE3" are listed, defines that the three strings are included. Then, a description 705 defines that "SomeValueEnum" has the same data type as "enum_SomeValueEnum".

In this fashion, the C code 701 can be generated from the XML schema 601 in which the enumeration type is described in a types element.

Next, a case where the data type in a types element is defined as a structure is described. FIG. 22 is a diagram to explain a structure type definition generation process in a source code generation process.

Referring to FIG. 22, the XML schema 611 is an exemplary XML description whose data type is defined in a structure. The XML schema 611 is defined to be a compound data type having the name "SomeStruct" in a tag complexType description 612. In a tag sequence description 613, the order of data is prescribed. A tag element description 614 defines that the structure member "strParam" is a string, and a tag element description 615 defines that the structure member "intParam" is an integer.

A C code 711 is a C language source code generated from the XML schema 611 in which the data type is defined in form of structure. In the C code 711, a description 712 defines that "_SomeStruct" is a structure based on the description 612, and "char *strparam" in a description 714 and "int intParam" in a description 715 are generated based on the descriptions 614 and 615. Then, a description 715 indicates that "SomeStruct" defines the same data type as "struc_SomeStruct".

In this fashion, the C code 711 is generated from the XML schema 611 in which the structure is described in a types element.

Next, a case where the data type in a types element is defined in an array is described. FIG. 23 is a diagram to explain an array type definition generation process in a source code generation process.

Referring to FIG. 23, an XML schema 621 is an exemplary XML description whose data type is defined in an array form. According to a description 622 defined by a tag "complexType", the XML schema 621 is defined as a compound data type having the name "ArrayOfString". Furthermore, according to a description 624 defined by a tag "restriction", "soapEnc:Array" designated in base limits the array to an array in accordance with SOAP encoding. Also, according to a description 625 defined by a tag "sequence", the order of data in the description 626 is prescribed. According to a description defined by a tag "element", it is defined that "item" is a string, can be omitted and has no upper bound of the number of occurrence times. According to a description 627 defined by a tag "attribute", "soapEnv:arrayType" is referred to, and an attribute is defined such that the array type is an array of strings according to "wsdl:arrayType="xs:string[ ]".

A C code 721 is a C language source code generated from the XML schema 621 whose data type is defined in an array form. In the C code 721, a description 722 defines that "_ArrayOfString" is a structure based on the description 622, and "int length;" indicative of the number of elements in the descriptions 723 and 724 and "char **array;" being the pointer of the array of "char*" in the description 715 are generated. Then, a description 725 indicates that "ArrayOfString" defines the same data type as "struct_ArrayOfString".

A description is given, with reference to FIG. 24 through FIG. 26, of examples in which C language function declarations are generated based on definitions of "simpleType" and "complexType" of a types element. In FIG. 24 through FIG. 26, "Document" and "Element" in C language codes are configured by mapping types defined in DOM (Document Object Model) to C language structures. In FIG. 24 through FIG. 26, a serializer and a deserializer are programs executed for conversion between an element tree and structure data corresponding to each type. The serializer is a program to convert structure data into an element tree, and the deserializer is a program to convert an element tree into structure data. Also, a constructor and a destructor are programs executed for generation of structure data, and the destructor is a program to release structure data.

FIG. 24 is a diagram to explain an enumeration type function declaration process in a source code generation process. Referring to FIG. 24, a serializer 801, which is indicated as "Element *SomeValueEnum_serialize(Document *doc, char *tagName, SomeValueEnum value);", receives an enumeration value "SomeValueEnum value" as an input and generates and outputs an element (Element) whose tag name is "tagname" in "char *tagname". Also, a deserializer 811, which is indicated as "SomeValueEnum SomeValueEnum_deserialize(Element *element);", receives an element (Element), analyzes the element, and outputs an enumeration value.

The serializer 801 and the deserializer 811 are generated from the XML schema 601.

FIG. 25 is a diagram to explain a structure function declaration process in a source code generation process. Referring to FIG. 25, a constructor 821, which is represented as "SomeStruct *SomeStruct_create(char *strparam, int intParam);" receives a structure member value as an input and generates and outputs a structure. A destructor 831, which is represented as "viod SomeStruct_free(SomeStruct *st);", receives a structure as an input and releases the used memory area. Also, the destructor 831 recursively releases a memory area used by a structure member. A serializer, which is represented as "Element *SomeStruct_serialize(Document *doc, char *tagName, SomeStruct *st);", receives a structure through "SomeStruct *st" as an input and generates and outputs an element (Element) whose tag name is "tagname" through "char *tagname". Also, a deserializer 851, which is represented as "SomeStruct *SomeStruct_deserialize(Element *element);", receives an element (Element) as an input, analyzes the element, and generates and outputs a structure.

As a result, it is possible to set an input value in a structure that a Web service function can process by using the deserializer 851 and the constructor 821 on an element indicative of the input value described in XML. Also, it is possible to set a process result corresponding to an element described in XML by using the serializer 841 on a return value from a Web service function (an output value as a process result).

The constructor 821, the destructor 831, the serializer 841 and the deserializer 851 are generated from the XML schema 611.

FIG. 26 is a diagram to explain an array function declaration process in a source code generation process. Referring to FIG. 26, a constructor 861, which is represented as "ArrayOfString *ArrayOfString_create(int length, char **array);", receives an array and the size of the array as inputs and generates and outputs a structure holding the array. A destructor 871, which is represented as "void ArrayOfString_free (ArrayOfString *st);", receives a structure holding an array as an input and releases the used memory area. Also, the destructor 871 recursively releases a memory area that an array member uses. A serializer 881, which is represented as "Element *ArrayOfString_serialize(Document *doc, char *tagName, ArrayOfString *st);", receives a structure holding an array through "ArrayOfString *st" as an input and generates and outputs an element (Element) whose tag name is "tagname" through "char *tagname". Also, a deserializer 891, which is represented as "SomeStruct *SomeStruct_deserialize(Element *element);", receives an element (Element) as an input, analyzes the element, generates and outputs a structure holding an array.

Thus, it is possible to set an input value in an array that a Web service function can process by using the deserializer 891 and the constructor 861 on an element indicative of an input value described in XML. Also, it is possible to set a process result corresponding to an element described in XML by using the serializer 881 on a return value from a Web service function (an output value as a process result).

The constructor 861, the destructor 871, the serializer 881 and the deserializer 891 are generated from the XML schema 621.

Such a generated C language function declaration is supplied to a header file of the type library 533. Also, each function process is output to a program file.

Figure 27:
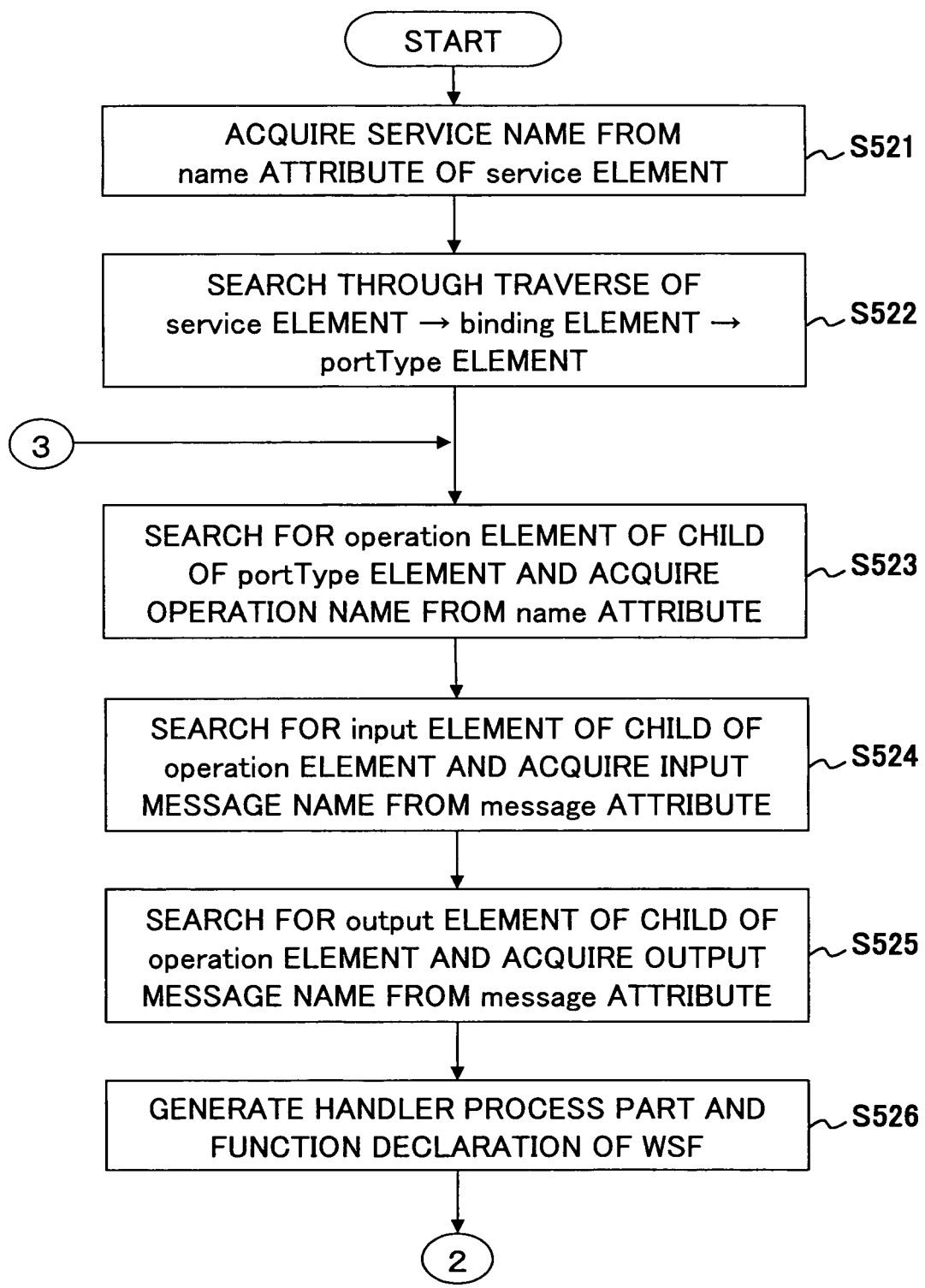
FIG. 27 is a flowchart to explain a handler generation process.
Figure 28:
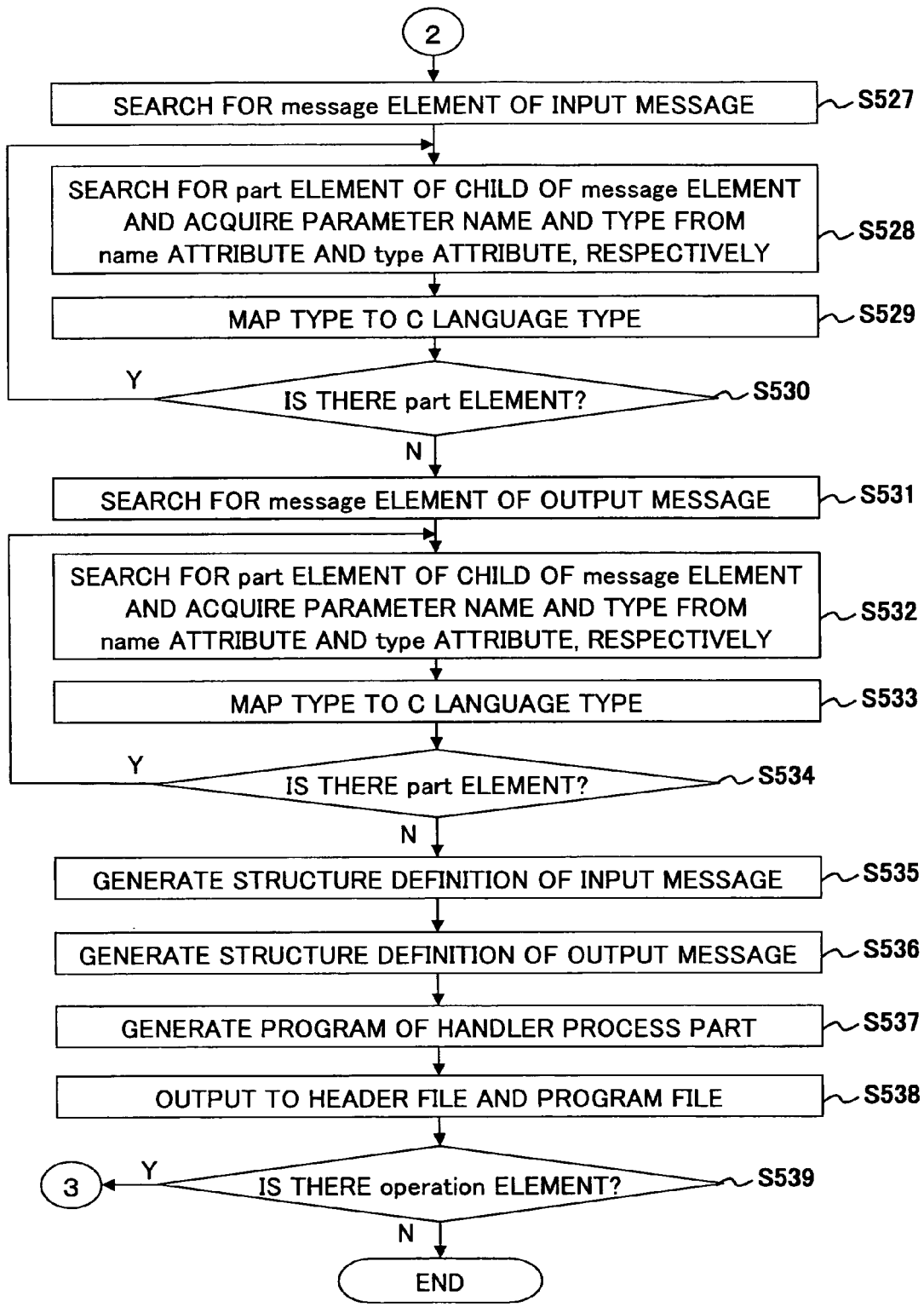
FIG. 28 is a flowchart to explain a handler generation process.

A description is given, with reference to FIG. 27 and FIG. 28, of a handler generation process of the handler automatic generation part 510. FIG. 27 and FIG. 28 are flowcharts to explain a handler generation process. Referring to FIG. 27, the handler automatic generation part 510 obtains a service name from a name attribute of a service element (step S521). Then, a service element, a binding element and a porttype element are accessed in that order to detect respective element (step S522).

An operation element, which is a child of the porttype element, is searched for, and an operation name is obtained from the name attribute (step S523). An input element, which is a child of the operation element, is searched for, and an input message name is obtained from the name attribute (step S524). An output element, which is a child of the operation element, is searched for, and an output message name is obtained from the name attribute (step S525). Then, a function declaration of the handler process part and a Web service function (WSF) is generated (step S526).

A message element of an input message is searched for (step S527). A part element, which is a child of the message element, is searched for, and a parameter name and a type are obtained from the name attribute and the type attribute, respectively (step S528). Then, the type is mapped to a C language type (step S529). It is determined whether there is another part element (step S530). If there is another part element, the process control returns to step S528, and the above process is repeated. On the other hand, if there is no part element, the mapping of the input message to a C language type is finished and an output message is mapped to a C language type.

A message element of the output message is searched for (step S531). A part element, which is a child of the message element, is searched for, and a parameter name and a type are obtained from the name attribute and the types attribute, respectively (step S532). Then, the type is mapped to a C language type (step S533). It is determined whether there is another part element (step S534). If there is another part element, the process control proceeds to step S532 and the above process is repeated. On the other hand, if there is no more part element, the mapping of an output message to a C language type is finished.

Then, a structure definition of an input message is generated (step S535). Also, a structure definition of an output message is generated (step S536). A program of the handler process part is generated (step S537). The structure definitions of the input message and the output message are output to a header file, and the program of the handler process part is output to a program file (step S538). Then, it is determined whether there is another operation element (step S539). If there is another operation element, the process control proceeds to step S523, and the above process is repeated. If there is no more operation element, the handler generation process is terminated.

A description is given, with reference to FIG. 29 and FIG. 30, of exemplary descriptions of an interface definition file supplied to the handler automatic generation part 510. FIG. 29 and FIG. 30 are diagrams illustrating exemplary descriptions of an interface definition in WSDL. Referring to FIG. 29 and FIG. 30, it is assumed that the data type definition normally described by <type> tag is determined by the type definition file 523 specified by "foo.bar.com/types.xsd". In this exemplary description, a data type to describe a message is defined, and the <type> tag to set a schema definition is omitted. In return, import from "foo.bar.com/types.xsd" is conducted through a description 40.

In definition information 42 defined by a <message> tag 41 (description <message name="printInput">) to define a message format, the description <part name="fileId" type="xs:unsignedInt"/> and the description <part name="count" type="xs:unsignedInt"/> define that an input parameter (printInput) for a print request is configured from "fileId" of an unsigned integer (unsignedInt) and "count" of an unsigned integer (unsignedInt). Also, in definition information 44 defined by a <message> tag 43 (description <message name="printOutput">) to define a message format, the description <part name="requestId" type="xs:unsignedInt"/> defines that an output parameter for a print request (printOutput) is configured from "requestId" of an unsigned integer (unsignedInt).

In definition information 46 defined by a <portType> tag 45 (description <portType name="netdocPortType">) to define a set of operations ("operation"), an input message and an output message are defined for each operation. For example, in definition information 48 defined by an <operation> tag 47 (description <operation name="print">), the description <input message="tns:printInput"/> defines that the input message is "printInput". Also, the description <output message="tns:printOutput"/> defines that the output message is "printOutput". In this case, only print is defined.

In definition information 50 defined by a <binding> tag 49 (description <binding name="netdocHTTPBinding" type="tns:netdocPortType">) to map an operation and a message defined by a <portType> tag 45 to specific protocol and data format, the operation and message are mapped to the protocol and data format for a porttype defined by "netdocPortType".

In the definition information 50, a <sb:binding> tag 51 (description <sb:binding transport="http://schemas.xmlsoap.org/soap/http" style="rpc"/>) defines use of RPC (Remote Procedure Call) by SOAP HTTP binding. An <operation> tag 52 (description <operation name="print">) defines a SOAP message on print as follows.

First, the <sb:operation> tag 53 (description <sb:operation soapAction="http://foo.bar.com/netdoc/print"/>) is used to define that the SOAPAction header value is "http://foo.bar.com/netdoc/print" at the print request time.

Then, in definition information 55 defined by an <input> tag 54, the description <sb:body encodingStyle="http://schemas.xmlsoap.org/soap/encoding/" use="literal" namespace="http://foo.bar.com/netdoc/"/> is used to define the encoding format at input time, and in definition information 57 defined by an <output> tag 56, the description <sb:body encodingStyle="http://schemas.xmlsoap.org/soap/encoding/" use="literal" namespace="http://foo.bar.com/netdoc/"/> is used to define the encoding format at output time.

Then, in definition information 59 defined by a <service> tag 58 (description <service name="netdoc">) to define a collection of network end points, a <port> tag 60 (description <port name="netdocPort" binding="tns:netdocHttpBinding">) is used to define "netdocport" being one of the network end points, and furthermore, the description <sb:address location="http://printer.foo.bar.com/netdoc"/> is used to define the address location of the network end point. In other words, it is defined that binding of the service name "netdoc" is "netdocHttpBinding", and the service URL (Uniform Resource Locator) is "http://printer.foo.bar.com/netdoc".

According to the interface definition file 522 and type definition file 523 defined in WSDL in this fashion, it is possible to determine not only the data type and the operation but also URL and the SOAPAction header.

A description is given of, in a case where an interface definition has been input, function declaration of a handler process part and a Web service function and structure definitions of an input message and an output message. First, the function declaration of the handler process part and the Web service function generated at step S526 in FIG. 27 is described with reference to FIG. 31 and FIG. 32.

Figure 31:
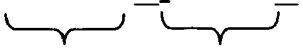
FIG. 31 is a diagram to explain function declaration of a handler process part.

FIG. 31 is a diagram to explain function declaration of the handler process part. Referring to FIG. 31, in the function declaration of the handler process part, for example, "netdoc_print_handler" configured from "netdoc" indicative of a service name, "print" indicative of an operation name, and "handler" indicative of the handler process part is used as the function name, and the function is declared as a function of the handler process part. In this example, "netdoc_print_handler" is used to indicate a handler process part corresponding to the service to perform a print operation. The function declaration of the handler process part is output to a header file of the handler source code 532.

FIG. 32 is a diagram to explain the function declaration of a Web service function. Referring to FIG. 32, in the function declaration of a Web service function, for example, "netdoc_print" configuring from "netdoc" indicative of a service name and "print" indicative of an operation name is used as a function name, and the function name is declared as a function of the Web service function. Also, an argument of the function of the Web service function designates a structure of an input message by "Netdoc_printInput" configuring from "Netdoc" indicative of a service name and "printInput" indicative of the name of the input message. Also, a structure of an output message is designated by "Netdoc_printOutput" configuring from "Netdoc" indicative of a service name and "printOutput" indicative of the name of the output message. The function declaration of the Web service function is output to a header file of the handler source code 532.

A description is given, with reference to FIG. 33, of a structure definition of an input message generated at step S535 in FIG. 28. FIG. 33 is a diagram to explain a structure definition of an input message. Referring to FIG. 33, a structure of an input message defines, for example, "_Netdoc_printInput" configuring from "netdoc" indicative of a service name and "printInput" indicative of an input message as a structure. Also, the structure "_Netdoc_printInput" is configured from the parameter name "fileId" whose parameter type is set as an unsigned integer by using "unsigned int" and the parameter name "count" whose parameter type is set as an unsigned integer by using "unsigned int". The structure of an input message is output to a header file of the handler source code 532.

A description is given, with reference to FIG. 34, of a structure definition of an output message generated at step S536 in FIG. 28. FIG. 34 is a diagram to explain a structure definition of an output message. Referring to FIG. 34, a structure of an output message is defined as "_Netdoc_print-Output" configured from "netdoc" indicative of a service name and "printOutput" indicative of an output message. Also, the structure "_Netdoc_printOutput" is configured from a parameter name "requested" whose parameter type is set as an unsigned integer by using "unsigned int". The structure of an output message is output to a header file of the handler source code 532.

A description is given, with reference to FIG. 35, of an exemplary program of the handler source code 532 that is automatically generated based on the interface definition shown in FIG. 29 and FIG. 30. FIG. 35 is a diagram illustrating an exemplary automatically generated handler source code. Referring to FIG. 35, a process outline of individual steps is shown instead of an actual source code.

As shown in a description 901, a declared function name, as illustrated in FIG. 31, of the handler process part is first described in the handler source code as illustrated in FIG. 35. This handler process part is a handler for a print function as a Web service function. Hereinafter, a print handler is referred to. The codes between steps S120 and S131 are for analyzing a SOAP envelope indicative of a process request based on an element tree. Also, the codes between steps S140 and S148 are for generating an element tree to generate a SOAP envelope indicative of a process response.

After a description of a variable defined in the print handler locally, step S120 for the print handler to obtain a route element is described. As an execution result of step S120, a root element (Envelope element) is obtained. Step S121 to obtain a child node list is described. As an execution result of step S121, the print handler can obtain "Header" and "Body" from an element tree.

Step S122 to obtain an element whose tag name is "Body" from the child node list is described. Step S123 to obtain a first child node of the Body element is described. As an execution result of step S123, the print handler obtains a print element indicative of an operation name. Step S124 to obtain a child node list of the print element is described. Step S125 to obtain tag names from the obtained child node list sequentially (iterative determination is set as step S132) is described.

Step S126 to determine whether a tag name is "fileID" is described. If a tag name is "fileID", step S127 to obtain a first child node having the tag name "fileID" is described. As an execution result of step S127, the print handler obtains a text node. Step S128 to extract text data from the obtained text node and convert the text data into an integer is described. As an execution result of step S128, the print handler sets the value in a predefined structure as a file ID parameter.

Step S129 to determine whether the tag name is "count" is described. If the tag name is "count", step S130 to obtain the first child node having the tag name "count" is described. As an execution result of step S130, the print handler obtains a text node. Step S131 to extract the obtained text node and convert the text node into an integer is described. As an execution result of step S131, the print handler sets the value as a print quantity parameter in a predefined structure.

A description 902 between steps S126 and S131 is an example of the print handler. However, in other handlers, the determination for each tag name and the process for tag names are different depending on parameter definitions of an input message.

Step S133 to generate each parameter value obtained through execution of the description 902 as structure data of an input message and set the parameter value in the data name "in" is described.

Step S134 to call a function "netdoc_print(in, out), as illustrated in FIG. 32, of a Web service function declared, whose argument is the structure data of an input message, is described.

In execution of step S134, it is determined whether the return value is erroneous. If the return value is erroneous, step S135 to set "SOAPFault" in "responseDocument" is described.

In the following steps S140 through S148, steps to generate an element tree to generate a process response in a case where no error occurs in the execution of the function "netdoc_print (in, out)" of the Web service function are described.

Step S140 to generate an Envelope element is described. Step S141 to generate a Body element is described. Step S142 to connect the Body element to the Envelope element is described. Step S143 to generate a printResponse element is described. Step S145 to generate a requested element is described. Step S146 to connect the printResponse element to the Body element is described.

Step S147 to generate a text node by using a request ID obtained as an execution result of step S134 is described. Step S148 to connect the text node to the requested element is described.

Step S149 to use "responseDocument" indicative of a process result of the print handler as a return value is described.

The handler source code 532 described in this manner is not limited to the print handler, and can be generated by associating the same steps to other operations. Thus, the operation name "print" in the handler source code can be changed depending on definitions.

In this fashion, since automatic generation of the handler source code 532 makes it possible to generate a large number of simple and similar codes, it is possible to eliminate a problem that bugs may be included due to simple mistakes of developers. In addition, since it takes fewer hours to generate the handler source code 532, it is possible to reduce workloads on developers. Furthermore, developers can develop a Web service function without consciousness of differences between a data format of an XML message and a data format that can be processed in a program language in the Web service function.

As mentioned above, by using the handler automatic generation part 510, the handler source code 532 and the type library 533 automatically generated corresponding to each function of Web service functions together with source codes configuring necessary process parts as well as functions of Web service functions are compiled based on the interface definition 521.

As described above in the third embodiment, according to the present invention, a program to convert a data format of a message in accordance with a message communication protocol between devices is automatically generated. Thus, it is possible to eliminate the problem that bugs may be included due to simple mistakes of developers. In addition, implementation of such an automatically generated program in an image forming apparatus makes it possible to process the message even if the Web service function is developed in a conventional method. Thus, it is possible to easily develop a Web service function in an image forming apparatus. Also, it is possible to widen cooperation with other systems connectable to the image forming apparatus.

According to a program generation method of the present invention, a computer can be configured to execute an element tree generation step of analyzing an interface definition to define an interface of a Web service and generating a first element tree indicative of association between a plurality of elements configuring the interface definition and a conversion program generation step of generating a conversion program to perform a conversion process on request and response messages on the Web service described in an input and output data format processable by a Web service function to execute the Web service and a predefined description format.

Also, the conversion program generation step can be configured to have a first program generation step of generating a data type conversion program to perform conversion between the input and output data format processable by the Web service function and an input and output message set in the request and response message described in the predefined description format and a second program generation step of generating a second program to analyzing the request message described in the predefined description format and generating the response message.

According to a recording medium for storing a computer readable program of the present invention, a recording medium for storing a computer readable program to cause a computer to execute an element tree generation step of analyzing an interface definition to define an interface of a Web service and generating a first element tree indicative of association between a plurality of elements configuring the interface definition and a conversion program generation step of generating a conversion program to perform a conversion process between an input and output data format processable by a Web service function to execute the Web service and request and response messages on the Web service described in a predefined description format based on the first element tree.

Also, a recording medium as claimed in claim 11, characterized in that the conversion program generation step has a first program generation step of generating a data type conversion program to perform conversion between the input and output data format processable by the Web service function and an input and output message set in the request and response messages described in the predefined description format and a second program generation step of generating a second program to analyze the request message described in the predefined description format and generate the response message.

Fourth Embodiment

In the following, a description is given of an embodiment of the multifunctional product 1200 as an image forming apparatus in which the automatically generated handler process part explained in the third embodiment is incorporated.

In a fourth embodiment, the multifunctional product 1200 has the same functional structure and the same hardware structure as those of the first embodiment, and the description thereof is omitted.

Then, a detailed description is given of a structure that can provide a Web service in accordance with SOAP (Simple Object Access Protocol) in XML (extensible Markup Language) in the multifunctional product 1200. The Web service function is, for example, a software product (application) described in a program language such as C language. A process part (handler) for handling between XML and a program language having different syntaxes is required so that the Web service function can understand XML process contents described in SOAP as a message. In the following, a print Web service for printing, a document list acquisition Web service to acquire a document list, and a document information acquisition Web service to acquire document information are exemplified with reference to FIG. 36.

Figure 36:
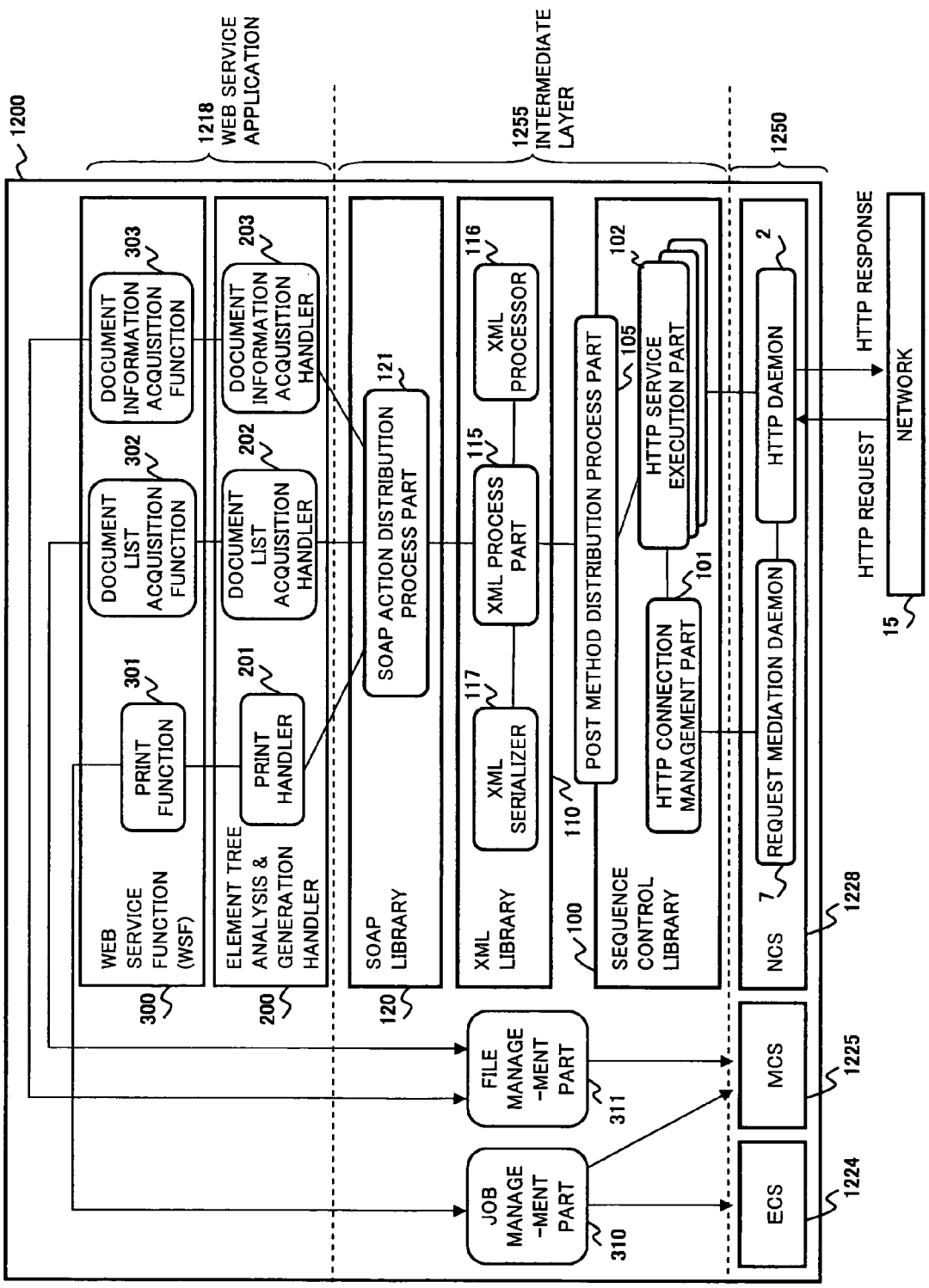
FIG. 36 is a diagram illustrating an exemplary structure to implement a Web service.
Figure 37:
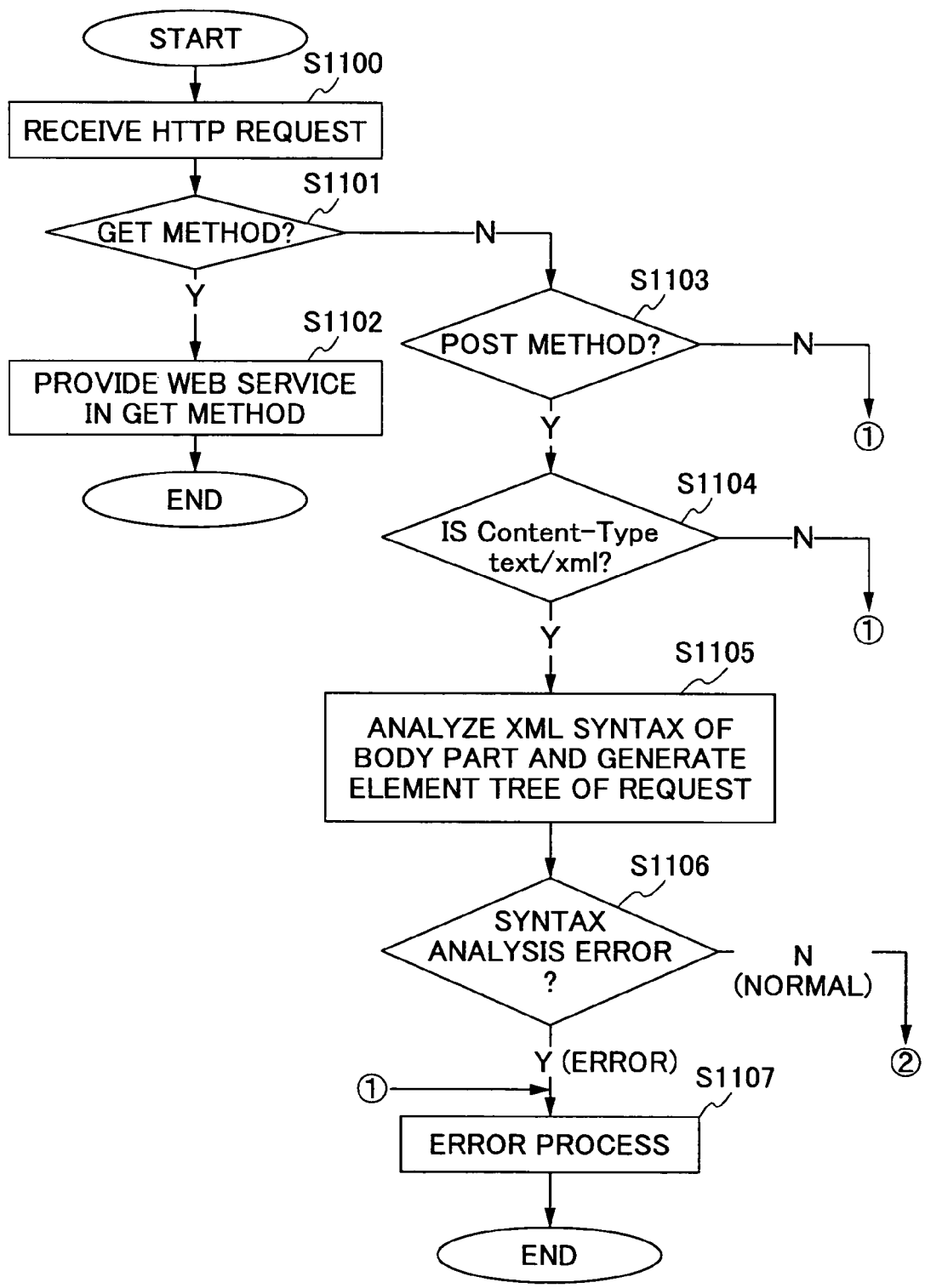
FIG. 37 is a flowchart to explain a Web service providing process in accordance with SOAP.

FIG. 36 is a diagram illustrating an exemplary structure to implement a Web service. Referring to FIG. 37, a print Web service, a document list acquisition Web service and a document information acquisition Web service are provided in the Web service application 1218. These services may be independent of the Web service application 1218 as other functions of the application 1230. In FIG. 36, only main functional components of the multifunctional product 1200 are illustrated, and the description thereof is omitted.

Referring to FIG. 36, for the purpose of implementation of a Web service, an intermediate layer for controlling transmission and receipt of data between connected devices is provided between the control service 1250 and the Web service application 1218.

The control service 1250 has ECS 1224, MCS 1225 and NCS 1228 as components to implement a Web service provided by the Web service application 1218. NCS 1228 has an HTTP daemon 2 to control HTTP and a request mediation daemon 7 to mediate a connection process between the HTTP daemon 2 and the Web service application 1218.

Also, the intermediate layer 1255, which is a component to absorb transmission and receipt control of data between connected devices, has a sequence control library 100, an XML library 110, a SOAP library 120, a job management part 310 and a file management part 311. The sequence control library 100 further has an HTTP connection management part 101, an HTTP service execution part 102 and a POST method distribution process part 105. The XML library 110 has an XML process part 115, an XML processor 116 and an XML serializer 117. The SOAP library 120 has a SOAP action distribution process part 121.

Furthermore, the Web service application 1218, which is a component to implement a Web service, has an element tree analysis and generation handler 200 and a Web service function (WSF) 300. The element tree analysis and generation handler 200, which is a process part to analyze a syntax in accordance with a data format of a message in compliance with SOAP between devices and perform conversion into a data format processable in the Web service function 300, has a plurality of element tree analysis and generation handlers such as a print handler 201, a document list acquisition handler 202 and a document information acquisition handler 203. It is noted that each of the print handler 201, the document list acquisition handler 202 and the document information acquisition handler 203 is a handler process part based on a handler source code 532 and a type library 533 of a source code 531 automatically generated by the handler automatic generation part 510 shown in FIG. 17 according to the third embodiment.

The Web service function 300 has a plurality of Web service functions such as a print function 301, a document list acquisition function 302 and a document information acquisition function 303. In this case, the print handler 201 performs syntax analysis on a data format of a SOAP message indicative of process contents for the print function 301, converts the data format into another data format processable by the print function 301, and requests the print function 301 to perform a process. Also, the print handler 201 generates a response as a message in the data format in accordance with SOAP. The document list acquisition handler 202 and the document information acquisition handler 203 perform similar processes on the document list acquisition function 302 and the document information acquisition function 303, respectively.

The print function 301 receives a file ID and a print quantity as input parameters, designates the job management part file ID and the print quantity, and issues a print request to the job management part 310. The print function 301 returns a request ID received from the job management part 310 as an output parameter. The document list acquisition function 302 requests the file management part 311 a file list and returns an ID list received from the file management part 311 as an output parameter. The document information acquisition function 303 receives a file ID as an input parameter, designates the file ID in the file management part 311 and requests file information. The document information acquisition function 303 returns the file information received from the file management part 311 as an output parameter.

The job management part 310 manages a queue and execution results of jobs. Also, the management part 310 communicates with ECS 1224 and MCS 1125 to perform print processes on stored documents. The file management part 311 communicates with MCS 1225 to obtain file information.

Figure 38:
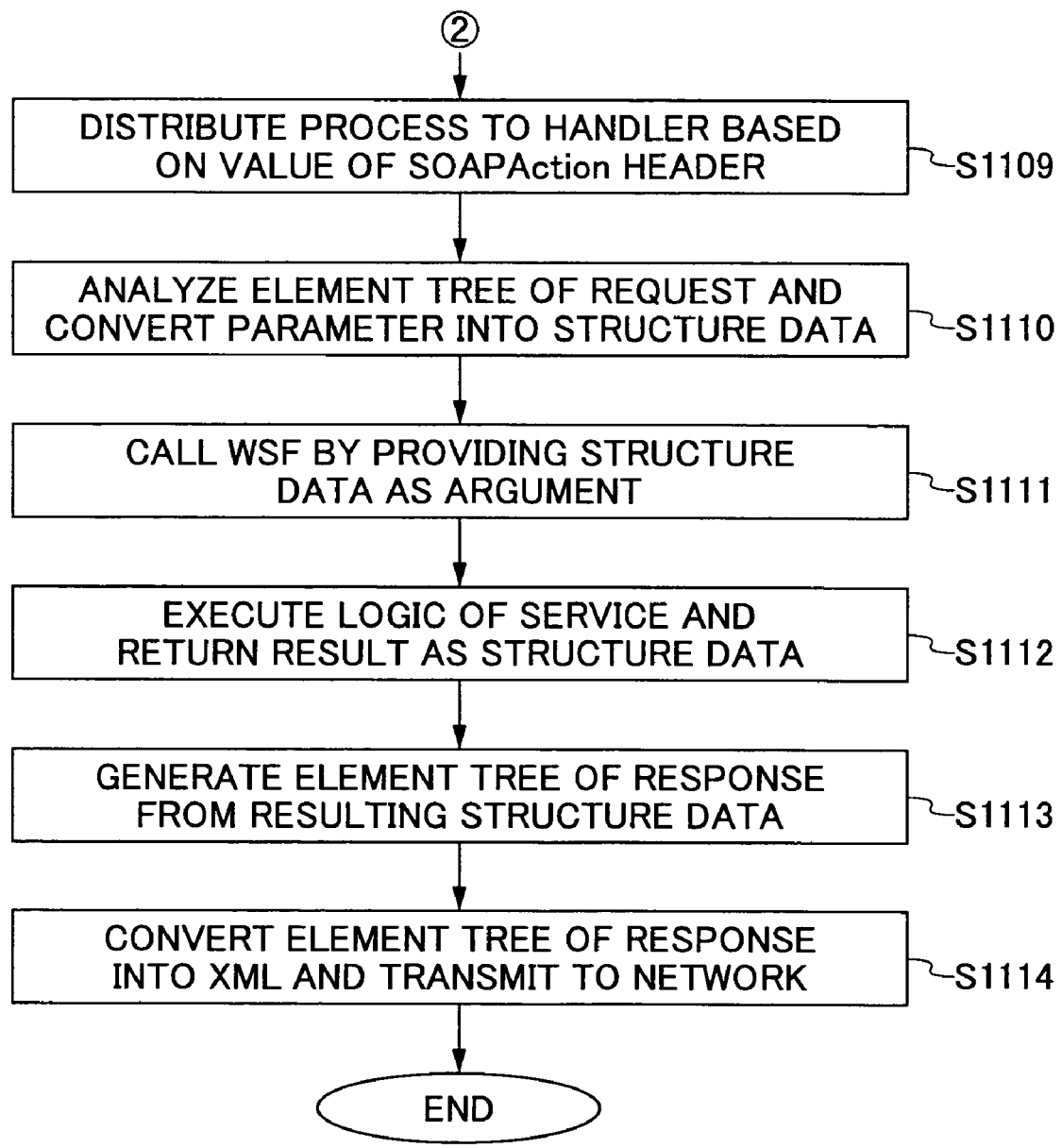
FIG. 38 is a flowchart to explain a Web service providing process in accordance with SOAP.

A description is given, with reference to FIG. 37 and FIG. 38, of a process from receipt of an HTTP request to transmission of an HTTP response. FIG. 37 and FIG. 38 are a flowchart to explain a process to provide a Web service in SOAP.

The HTTP daemon 2 of NCS 1228 receives a connection request from the network 15 (step S1100). The connection request is reported to the HTTP connection management part 101 of the Web service application 1218 via the request mediation daemon 7. Then, the HTTP connection management part 101 reports the connection request to the HTTP service execution part 102 to provide a service in accordance with HTTP. In response to the report, the HTTP service execution part 102 establishes connection with the HTTP daemon 2 and acquires an HTTP request. Such control by NCS 1228 makes it possible to control HTTP communication only as needed. Thus, it is possible to utilize resources required for communication control more effectively compared to a case where the HTTP communication is under full-time control.

The HTTP service execution part 102 analyses an HTTP method indicative of a data transmission method based on the HTTP request received via the network 15 and checks whether the HTTP method is for a GET method (step S1101). If the HTTP method is for a GET method, the HTTP service execution part 102 provides a Web service in accordance with the GET method (step S1102). In other words, the HTTP service execution part 102 is used to provide Web services other than Web services in accordance with SOAP.

On the other hand, if the HTTP method is not for the GET method, the HTTP service execution part 102 checks whether the HTTP method is for a POST method (step S1103). If the HTTP method is not for a POST method, the process control proceeds to step S1107 for an error process and the process to provide a Web service in accordance with SOAP is terminated. If the HTTP method is for a POST method, the POST method distribution process part 105 is called. The POST method distribution process part 105 analyzes HTTP request header information and checks whether the description format of the HTTP body follows XML (S1104). In other words, the POST method distribution process part 105 determines whether "text/xml" is designated in "Content-Type" of the HTTP response header. If the description format is not XML, the process control proceeds to step S1107 for an error process. On the other hand, if the description format is XML, an XML content handler 111 is called.

The XML process part 115, which serves as a POST method handler, uses an XML processor 116 to analyze an XML syntax of the HTTP body and generate a request element tree to represent a relation of tags described in XML as a tree structure (step S1105). The XML process part 115 determines whether a result of the syntax analysis includes an error (step S1106). If the syntax analysis result includes an error, the process control proceeds to step S1107 for an error process. On the other hand, if the syntax analysis result has no error, the process control proceeds to step S1109 in FIG. 38.

The SOAP action distribution process part 121 analyzes a SOAPAction header of the HTTP request and distributes the HTTP request to a different element tree analysis and generation handler 200 by means of URI (Uniform Resource Indicator) (step S1109). In this case, the HTTP request and the element tree are distributed to the print handler 201 by designating URI to specify a print Web service, the document list acquisition handler 202 by designating URI to specify a document list acquisition Web service and the document information acquisition handler 203 by designating URI to specify a document information acquisition Web service.

Each element tree analysis and generation handler 200 analyzes an element tree of the request and converts the element tree into C language structure data (step S1110). Then, the element tree analysis and generation handler 200 calls a Web service function 300 corresponding to URI designated in the HTTP request by providing the converted structure data as an argument to the Web service function 300 (step S1111). In this case, the print handler 201, the document list acquisition handler 202 and the document information acquisition handler 203 call the print function 301, the document list acquisition function 302 and the document information acquisition function 303, respectively.

The Web service function 300 executes logic of a predefined Web service and returns a result as structure data (step S1112). In this case, the print function 301, the document list acquisition function 302 and the document information acquisition function 303 execute logic of respective Web services and return results. The results are in data formats processable in a program language (such as structures in C language).

Each element tree analysis and generation handler 200 generates an element tree of a response from the resulting structure data (step S1113). Such an element tree generated by each element tree analysis and generation handler 200 represents a data structure in which a relation between XML tags is described through links using pointers from a tag to another tag. After that, the XML serializer 117 converts the response element tree into XML through the SOAP action distribution process part 121. The XML serializer 117 converts the element tree into text-based XML. The converted XML is configured in the HTTP body in accordance with SOAP, and after attachment of a predefined HTTP header, the resulting XML is transmitted as an HTTP response (step S1114).

As mentioned above, the element tree analysis and generation handler 200 performs data conversion corresponding to C language structures on element trees. In addition, the element tree analysis and generation handler 200 converts C language structure data into element trees. A developer can develop a Web service in a program language without knowledge of SOAP and XML.

In an initialization process performed by the Web service function 300 at activation time thereof, modules are connected (as illustrated in solid lines), and a configuration as illustrated in FIG. 36 is formed. In the initialization process, the POST method distribution process part 105 is activated by being connected to the sequence control library 100 as a POST method handler, and the XML process part 115, the SOAP action distribution process part 121 and the element tree analysis and generation handler 200 are registered to the POST method distribution process part 105, the XML process part 115 and the SOAP action distribution process part 121, respectively.

Figure 40:
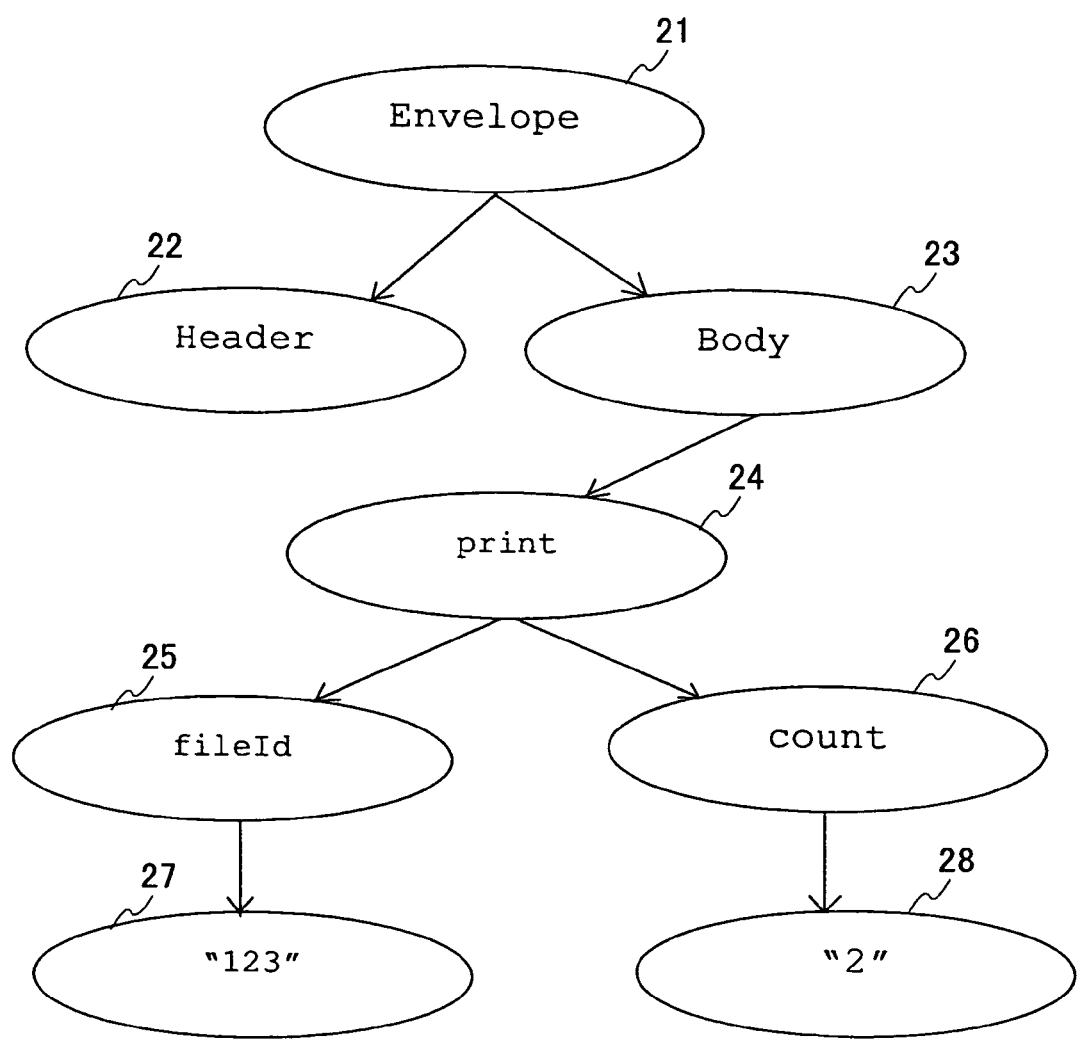
FIG. 40 is a diagram illustrating an exemplary element tree converted by an XML processor.
Figure 41:
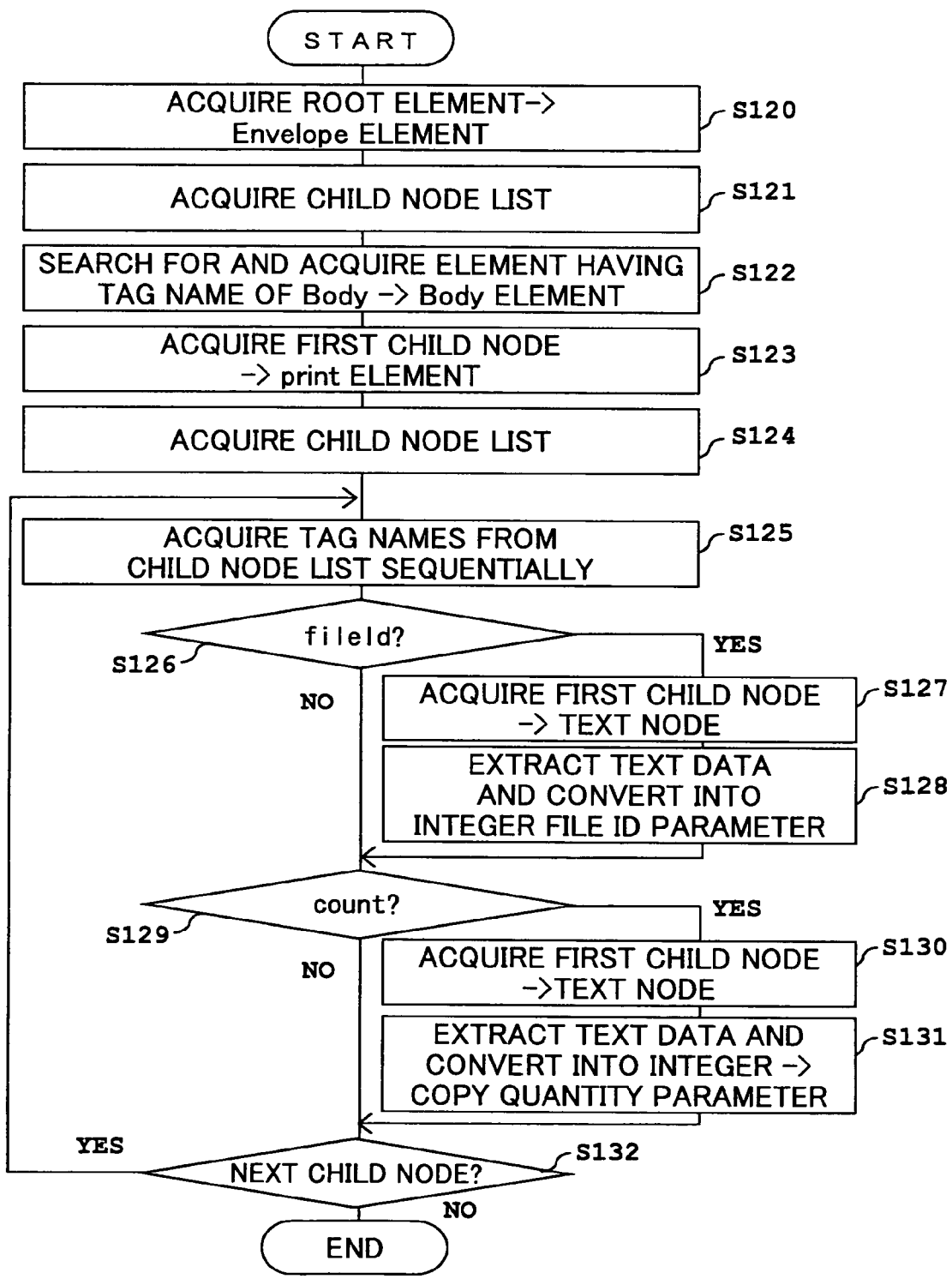
FIG. 41 is a flowchart to explain an element tree analysis process performed by a print handler.

A description is given, with reference to FIG. 39 through FIG. 41, of an analysis process of an element tree in the print handler 201 of the element tree analysis and generation handler 200 as an example. FIG. 39 is a diagram illustrating an exemplary description of an HTTP request in accordance with SOAP using XML. FIG. 40 is a diagram illustrating an exemplary description of an element tree converted by the XML processor. FIG. 41 is a flowchart to explain an element tree analysis process by the print handler.

In a case of an HTTP request, as illustrated in FIG. 39, for a print Web service, the XML processor 112 converts an HTTP body starting with <SOAP-ENV:Envelope> into an element tree. A tag name 21 "Envelope" is set as a root element, and a tag name 22 "Header" and a tag name "Body" are associated as child nodes of the root node with the tag name 21 "Envelope". Furthermore, a child node of the tag name "Body" is named as a tag name 24 "print", and in addition, a tag name 25 "fileId" and a tag name 26 "count" are associated as child nodes of the tag name 24 "print" with the tag name 24 "print". Then, the tag name 25 "fileId" and the tag name 26 "count" are associated with text data 27 "123" and text data 28 "2", respectively. The structure of an element tree associated in this manner is formed, for example, as a data structure as illustrated in FIG. 40. In FIG. 40, the tag names 21 through 26 and the text data 27 and 28 are represented as ellipses, and the association is represented by arrows.

For an element tree having a data structure as illustrated in FIG. 40, the print handler 201 generates structure data in a program language processable by the print function 301 in accordance with the flowchart shown in FIG. 41. In FIG. 41, step numbers correspond to step numbers in FIG. 35. Referring to FIG. 41, the print handler 201 obtains a root element (step S120). In this case, the root element becomes an Envelope element. The print handler 201 obtains a child node list (step S121). In other words, the tag name 22 "Header" and the tag name 23 "Body" are obtained. The print handler 201 searches the child node list for an element having the tag name "Body" and obtains a Body element (step S122). The print handler 201 obtains a first child node of the Body element (step S123). In this case, the print handler 201 obtains a print element. The print handler 201 obtains a child node list of the print element (step S124). The print handler 201 obtains tag names from the child node list sequentially (step S125).

The print handler 201 determines whether a tag name is "fileID" (step S126). If the tag name is not "fileID", the process control proceeds to step S129. On the other hand, if the tag name is "fileID", the print handler 201 obtains a first child node having the tag name "fileID" (step S127). In other words, a text node is obtained. The print handler 201 extracts the obtained text node and converts the text node into an integer (step S128). In other words, the value "123" is set as a file ID parameter in a predefined structure. In addition, the print handler determines whether the tag name is "count" (step S129). If the tag name is not "count", the process control proceeds to step S132. On the other hand, if the tag name is "count", the print handler 201 obtains a first child node having the tag name "count" (step S130). In other words, a text node is obtained. The print handler 201 extracts the obtained text node and converts the text node into an integer (step S131). In other words, the value "2" is set as a print quantity in a predefined structure.

The print handler 201 determines whether the next child node is included in the child node list obtained at step S125 (step S132). If the next child node is included, the process control returns to step S125 to obtain the next child node, and the same process is performed on the next child node. If the next child is not included, the analysis process on the element tree is terminated.

Figure 42:
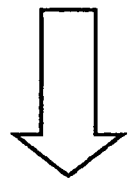
FIG. 42 is a diagram illustrating an exemplary setting of an argument of a function of a Web service function.

In such an element tree analyzed in this manner, the print handler 201 sets a value in a parameter of a structure in a program language, as illustrated in FIG. 42. FIG. 42 is a diagram illustrating an exemplary argument setting to a function of a Web service function. Referring to FIG. 42, the value "123" is set in the parameter "unsigned int fileId" of a structure 29 ("struct Netdoc_printInput") at step S128. Also, the value "2" is set to the parameter "unsigned int count" at step S131.

Since the print function 301 of the Web service function 300 is a "netdoc_print" function declared as a function of a Web service function by the handler automatic generation part 510 (see FIG. 32), the structure name "struct Netdoc_printInput" of the structure 29 defined as a structure of an input message by the handler automatic generation part 510 and the pointer "in" to the structure 29 are set in the argument 30, as "struct Netdoc_printInput *in". When the print function 301 ("netdoc_print" function) is called, a process result of the print function 301 is returned, for example, as an argument 31 such as "struct Netdoc_printOutput *out" indicative of the pointer "out" to the structure name "struct Netdoc_printOutput".

Figure 43:
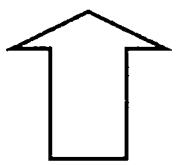
FIG. 43 is a diagram illustrating an exemplary setting of a process result by the print handler.

FIG. 43 is a diagram illustrating an exemplary setting of a process result by the print handler. Referring to FIG. 43, the print handler 201 obtains a structure 39, to which the process result is to be set, through the pointer "out" of the argument 31. The structure 39 is a structure defined as a structure of an output message by the handler automatic generation part 510 (see FIG. 34). In the structure 39, for example, the value "100" is set to the parameter "unsigned int requested" as a process result.

Figure 44:
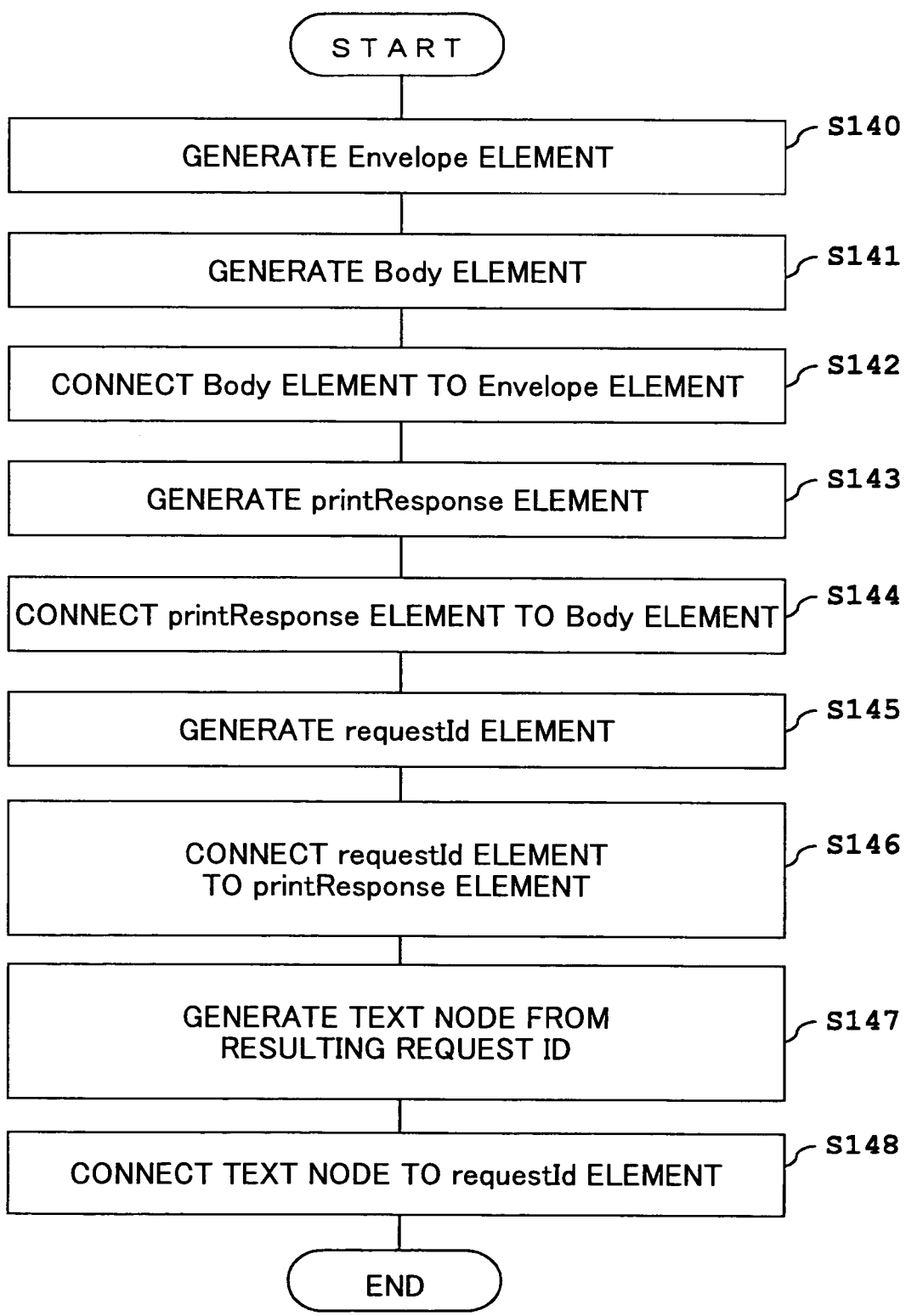
FIG. 44 is a flowchart to explain an element tree generation process performed by the print handler.
Figure 45:
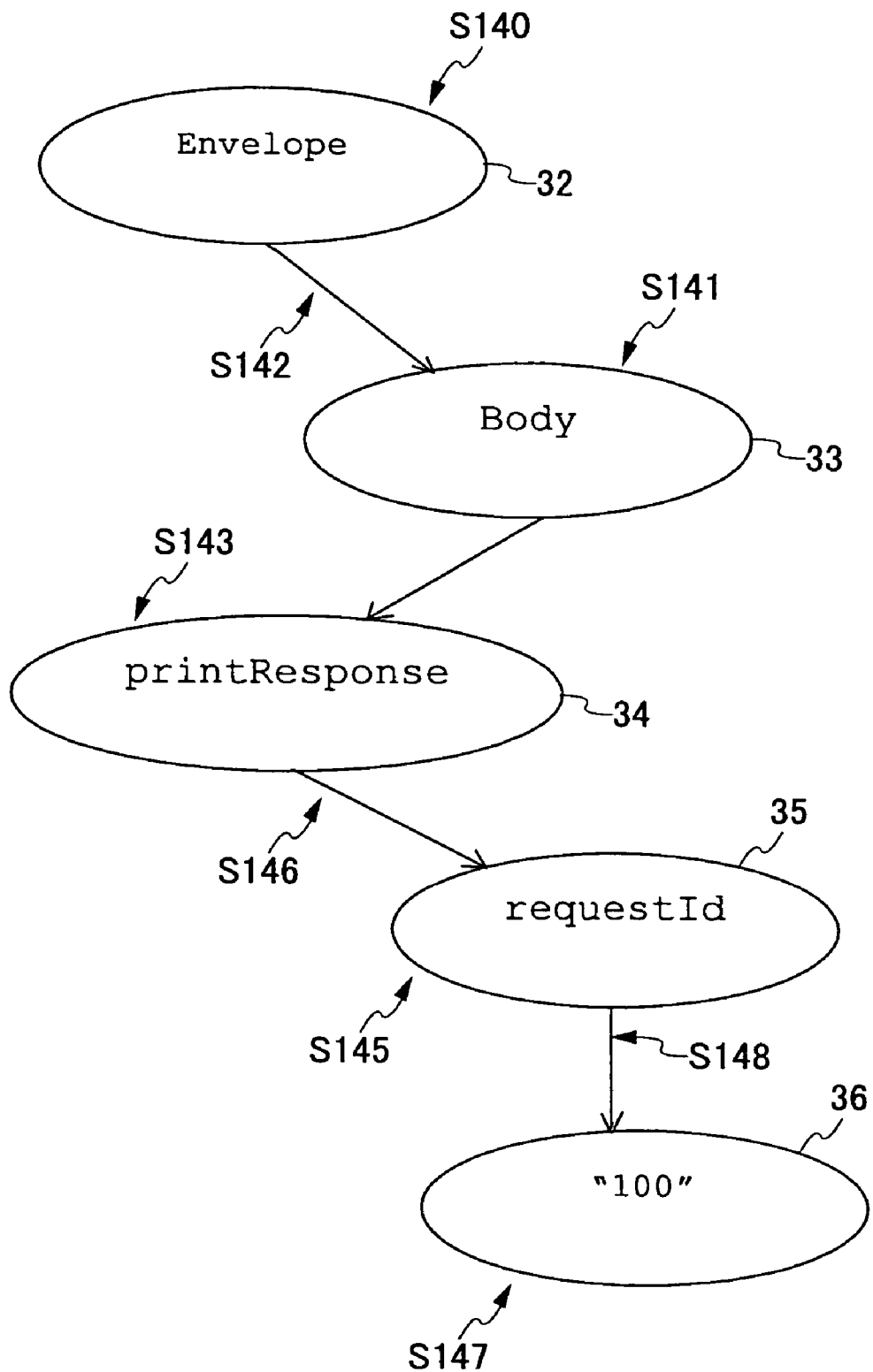
FIG. 45 is a diagram illustrating an exemplary generated element tree.

A description is given, with reference to FIG. 44 and FIG. 45, of a element tree generation process to generate an element tree from the structure 39 indicative of a process result. In FIG. 44, step numbers correspond to step numbers in FIG. 35. FIG. 44 is a flowchart to explain an element tree generation process by the print handler. FIG. 45 is a diagram illustrating an exemplary generated element tree.

An element tree generation process by a print handler is described with reference to FIG. 45. Referring to FIG. 44, the print handler 201 generates an Envelope element 32 (step S140). The print handler 201 generates a Body element 33 (step S141). Then, the Body element 33 is connected to the Envelope element 32 (step S142). Through these steps S140 through S142, an HTTP body of an HTTP response in accordance with SOAP is set.

Then, the print handler 201 generates a printResponse element 34 (step S143), and the printReponse element 34 is connected to the Body element 33 (step S144). Furthermore, the print handler 201 generates a requested element 35 (step S145), and the requested element 35 is connected to the printResponse element 34 (step S146).

The print handler 201 generates a text node 36 from the obtained request ID (step S147), and the text node is connected to the requested element 35 (step S148). In this case, the value "100" is set in the text node 36.

For such an element tree generated in this manner, the XML process part 115 and the XML serializer 112 is used to generate an HTTP body 32 as illustrated in FIG. 46. FIG. 46 is a diagram illustrating an exemplary description of an HTTP response in accordance with SOAP using XML converted from the element tree. Referring to FIG. 46, the individual elements 32 through 36 are described within tags delimited by < >, and predefined information is described in XML in accordance with a predefined procedure in compliance with SOAP. The multifunctional product 1200 transmits the HTTP response to a device transmitting the corresponding HTTP request by means of the HTTP daemon 2 via the network 15. In this fashion, the multifunctional product 1200 provides a Web service to a device connected via the network 15.

According to the above embodiment, a source code 531 to convert an element tree indicative of a relation between elements in XML into input data in a program language processable by a Web service function and convert output data in a program language into an element tree in a predefined description format is automatically generated. As a result, since a large number of simple and similar codes can be generated, it is possible to eliminate the problem that bugs may be included due to simple mistakes of developers. In addition, since the handler source code 532 can be generated fewer hours, it is possible to reduce workloads on developers.

In addition, through incorporation of the element tree analysis and generation handler 200 of the automatically generated source code 531 into the multifunctional product 1200, developers can develop an application as a Web service function in a conventional development method, such as in a development method using C language. In addition, it is possible to easily improve an installed application such that the application can correspond to a Web service.

In addition, in the multifunctional product 1200 having the element tree analysis and generation handler 200, since the Web service function 300 developed as a program can interpret an XML message in accordance with SOAP, it is possible to provide the Web service function 300 to other systems. As a result, since systems or computer terminals connected to the multifunctional product 1200 are not limited, it is possible to considerably widen availability of the multifunctional product 1200.

As described above with respect to the fourth embodiment, according to the present invention, since a process part to convert the data format of a message in accordance with a message communication protocol between devices is provided, the message can be processed even by a Web service function developed in a conventional method. Thus, it is possible to easily develop a Web service function for an image forming apparatus without dependence on the description format of a message. Also, an installed application can be modified to correspond to a Web service. Furthermore, it is possible to widen cooperation with other systems connectable to the image forming apparatus.

Although the preferred embodiments of the present invention have been described above, the present invention is not limited to the embodiments. Various variations and modifications can be made within the scope of features of the present invention.

The multifunctional product 1200 according to the present invention can be configured to have a plurality of conversion means for converting a request message received in accordance with a predefined message communication protocol corresponding to respective Web service process means into a process request processable by the Web service process means and converting the process result produced by the Web service process means into a response message in accordance with the message communication protocol.

Also, the multifunctional product 1200 according to the present invention can be configured to describe a request message and a response message in an Extensible Markup Language in accordance with Simple Object Access Protocol.

Furthermore, a second data format processable in a program language and a third data format indicative of a process result output by the Web service process means can be configured to represent a structure processable in C language.

Also, the multifunctional product 1200 according to the present invention can be configured to have connection control means for, by informing communication control means for controlling communication in accordance with a redefined communication protocol and connection management means via the network that a process request has been received, controlling connection between the communication control means and the service providing means for causing the Web service process means to execute a process in the predefined communication protocol based on the process request and to provide the process result as a process response to the device.

In addition, the predefined communication protocol can be configured to be Hypertext Transfer Protocol.

Also, the multifunctional product 1200 according to the present invention can be configured to have an application having the plurality of Web service process means, a control service to manage a plurality of hardware resources used in the image forming apparatus and control use of the plurality of hardware resources corresponding to a use request from the application and an operating system to control the application and the control service.

The multifunctional product 1200 according to the present invention has a first message conversion step of converting the request message into a first data format indicative of the structure of the request message, and the conversion step has a first data format conversion step of corresponding the first data format to a second data format processable in a program language whereby the Web service process step is developed.

In a Web service providing method executed in the multifunctional product 1200 according to the present invention, a first message conversion step of converting a request message into a first data format indicative of the structure of the request message can be configured to generate an element tree based on an element forming the request message from the request message and a value set for the element and set the element tree as the first data format.

Also, in such a Web service providing method, the first data format conversion step can be configured to set a value to an element of the second data format processable in the Web service process step by traversing a link between the elements of the element tree.

Furthermore, the Web service providing method can be configured to have a second data format conversion step of converting a third data format indicative of a process result of a Web service, which is processable in the predefined program language, produced by the Web service step and a second message conversion step of describing the response message in a description format receivable by the device based on a structure of the response message represented in the fourth data format.

Also, in the Web service providing method, the second data format conversion step can be configured to generate an element tree based on a value set to an element of the third data format as the process result and a plurality of elements configuring the response message and set the element tree as the fourth data format.

Although the preferred embodiments of the present invention have been described above, the present invention is not limited to the embodiments, and various variations and modifications can be made within the scope of features of the present invention.

The invention claimed is:

1. An image forming apparatus, comprising:
    an application executing a process related to image formation;
    a plurality of communication protocol daemons transmitting and receiving data in accordance with respective different communication protocols; and
    connection request mediation means for, in response to a connection notice from each of the communication protocol daemons, mediating connection instead of the communication protocol daemon by informing the application that a connection request is provided to the communication protocol daemon, wherein
    the connection request mediation means includes registration means for, in response to a registration request from the application, registering a communication protocol for the application;
    the communication protocol daemons include reporting means for, in response to receipt of a connection notice, reporting the connection notice to the connection request mediation means;
    the connection request mediation means includes protocol reporting means for, in response to receipt of the connection notice from the communication protocol daemon, reporting the communication protocol registered by the registration means to the application;
    the application includes connection permission reporting means for, in response to receipt of the registered communication protocol, reporting a connection permission and connection reporting means for reporting a connection notice to the communication protocol daemon after reporting the connection permission;
    the communication protocol daemon, in response to receipt of the connection notice from the application, initiates transmission to a connection destination; and
    a shared memory being shared by the application and the communication protocol daemons, said shared memory storing received data and transmitted data, and being used for delivery of the received data and the transmitted data between the application and the plurality of communication protocol daemons.

2. The image forming apparatus as claimed in claim 1, wherein the connection request mediation means comprises:
    registration means for, in response to a registration request from the application, registering the application; and
    buffer registration means for, in response to a registration request of a transmission and receipt buffer from the application, registering a receipt buffer and a transmission buffer used exclusively for the application, thereby making the receipt buffer and the transmission buffer available.

3. The image forming apparatus as claimed in claim 1, wherein the connection request mediation means comprises:
    transmission and receipt buffer allocation means for, in response to a connection notice from each of the communication protocol daemons, allocating a receipt buffer and a transmission buffer used in the shared memory during the connection and informing the communication protocol daemon.

4. The image forming apparatus as claimed in claim 1, wherein the application comprises:
    connection process means for, in response to receipt of a connection notice from the connection request mediation means, reporting a connection permission to the connection request mediation means and performing connection on the communication protocol daemon; and
    data receipt start request means for requesting the communication protocol daemon to start data receipt.

5. The image forming apparatus as claimed in claim 3, wherein each of the communication protocol daemons comprises:
    received data write means for writing received data in the receipt buffer allocated to the communication protocol daemon by the transmission and receipt buffer allocation means and shifting a write start position by a length of the received data; and
    receipt write report means for informing the application that the received data are written in the receipt buffer and issuing a write report in which a write start position and a write end position of the received data are designated.

6. The image forming apparatus as claimed in claim 5, wherein the application comprises:
    received data read means for, in response to receipt of the write report of the received data from the communication protocol daemon, reading the received data ranging between the write start position and the write end position designated in the write report from the receipt buffer; and
    receipt read report means for informing the communication protocol daemon that the received data are read from the receipt buffer.

7. The image forming apparatus as claimed in claim 3, wherein the application comprises:
    transmitted data write means for writing transmitted data in the transmission buffer registered by the buffer registration means and shifting a write start position by a length of the transmitted data; and
    transmission write report means for informing the communication protocol daemon that the transmitted data are written in the transmission buffer and issuing a write report in which a write start position and a write end position of the transmitted data are designated.

8. The image forming apparatus as claimed in claim 7, wherein each of the communication protocol daemons comprises:
    transmitted data read means for, in response to receipt of the write report of the transmitted data from the application, reading the transmitted data ranging between the write start position and the write end position designated in the write report from the transmission buffer and causing the communication protocol daemon connected to the application to transmit the transmitted data;
    read start position shift means for shifting the read start position to the write end position; and
    transmission read report means for informing the application that the transmitted data are read from the transmission buffer.

9. A data transmission and receipt control method of controlling data transmission and receipt between a plurality of communication protocol daemons and a plurality of applications performed by a computer in accordance with respective different communication protocols, the method comprising the steps of:
    in response to a connection notice from each of the communication protocol daemons, mediating connection instead of the communication protocol daemon by informing the application that a connection request is provided to the communication protocol daemon; and
    controlling delivery of received data and transmitted data to the application via a shared memory shared by the communication protocol daemons; and in response to a registration request from the application, registering a communication protocol for the application;

in response to receipt of a connection notice, using the communication protocol daemons to report the connection notice;

in response to receipt of the connection notice from the communication protocol daemon, reporting the registered communication protocol to the application;

in response to receipt of the registered communication protocol, reporting a connection notice to the communication protocol daemon after reporting a connection permission; and in response to receipt of a connection notice from the application, using the communication protocol daemon to initiate transmission to a connection destination.

* * * * *